(12) United States Patent
Jiang

(10) Patent No.: US 8,374,602 B2
(45) Date of Patent: Feb. 12, 2013

(54) METHOD AND SYSTEM FOR PROVIDING ROAMING SERVICES TO PREPAID ROAMERS OF A HOME NETWORK

(75) Inventor: John Jiang, Danville, CA (US)

(73) Assignee: Roamware, Inc., San Jose, CA (US)

( * ) Notice: Subject to any disclaimer, the term of this patent is extended or adjusted under 35 U.S.C. 154(b) by 221 days.

(21) Appl. No.: 12/523,828

(22) PCT Filed: Jan. 22, 2008

(86) PCT No.: PCT/US2008/000765
§ 371 (c)(1),
(2), (4) Date: Mar. 18, 2010

(87) PCT Pub. No.: WO2008/088913
PCT Pub. Date: Jul. 24, 2008

(65) Prior Publication Data
US 2010/0190492 A1 Jul. 29, 2010

Related U.S. Application Data

(60) Provisional application No. 60/881,136, filed on Jan. 19, 2007.

(51) Int. Cl.
*H04W 4/00* (2009.01)
(52) U.S. Cl. ............... 455/432.1; 455/406; 455/418; 455/422.1; 455/432.2; 455/432.3; 455/433; 455/435.1; 455/435.2; 455/436; 370/310.2; 370/328; 370/331; 370/338
(58) Field of Classification Search ........... 455/406, 455/418, 422.1, 432.1, 432.2, 432.3, 433, 455/435.1, 435.2, 436; 370/310.2, 328, 331, 370/338
See application file for complete search history.

(56) References Cited

U.S. PATENT DOCUMENTS 5,862,481 A * 1/1999 Kulkarni et al. ........... 455/432.2
6,697,620 B1 * 2/2004 Lamb et al. ............... 455/432.1
(Continued)

FOREIGN PATENT DOCUMENTS

EP       1 662 831 A      5/2006
WO     WO 95/27382 A    10/1995
(Continued)

OTHER PUBLICATIONS

GSM 902 on MAP Specification Digital Cellular Telecommunications (Phase 2+); Mobile Application Part (MAP) Specification (3GPP TS 09.02 version 7.9.0 Release 1998), Sep. 2001.

(Continued)

*Primary Examiner* — Steve D Agosta
(74) *Attorney, Agent, or Firm* — Arent Fox LLP

(57) ABSTRACT

The present invention provides a method for providing roaming services to an HPMN's prepaid subscriber. The method includes facilitating the prepaid subscriber's registration at a VPMN by an SG, despite absence of the prepaid subscriber's roaming profile at an HPMN HLR. The HPMN and the VPMN are part of one or more partner networks and are unable to support IN protocol/agreement. The SG is deployed at either the HPMN, or an HPMN's MVNO, or a hub operator. The method further includes enabling mobile communication of the prepaid subscriber in the VPMN by the SG that converts protocol of all signaling messages, corresponding to the prepaid subscriber, into a format compatible with the HPMN. The method further includes billing the prepaid subscriber based on pre-defined criteria by using the SG that interfaces with an HPMN PPS via either: an HPMN SCP, or an HPMN service node, or an HPMN SMSC.

23 Claims, 25 Drawing Sheets

U.S. PATENT DOCUMENTS

| | | | |
|---|---|---|---|
| 6,975,852 | B1 | 12/2005 | Sofer et al. |
| 2004/0087305 | A1 | 5/2004 | Jiang |
| 2005/0059394 | A1 | 3/2005 | Easley |
| 2007/0087746 | A1 | 4/2007 | Adamany |

FOREIGN PATENT DOCUMENTS

| | | |
|---|---|---|
| WO | WO 00/10352 A | 2/2000 |
| WO | WO 2004/084526 A | 9/2004 |
| WO | WO 2006/099388 A | 9/2006 |
| WO | WO 2008/013964 A | 1/2008 |
| WO | WO 2008/013965 A | 1/2008 |
| WO | WO 2008/017951 | 2/2008 |
| WO | WO 2008/027660 A | 3/2008 |

OTHER PUBLICATIONS

GSM 378 on CAMEL Digital Cellular telecommunications system (Phase 2+);Customized Applications for Mobile network Enhanced Logic (CAMEL) Phase 2; Stage 2 (GSM 03.78 version 7.2.0 Release 1998), Nov. 1999.

GSM 978 on CAMEL Application protocol Digital cellular telecommunications system (Phase 2+); Customized Applications for Mobile network Enhanced Logic (CAMEL); CAMEL Application Part (CAP) specification (GSM 09.78 version 7.1.0 Release 1998), Jul. 2000.

GSM 03.79 on CAMEL Support of Optimal Routing (SOR), Jun. 2000.

GSM 318 Basic Call Handling, May 2000.

Q762 (General Functions of CCITT Signaling System No. 7 ISDN User Part Messages and parameters). 1999, Dec. 1999.

Q 764 (1999), Signaling System No. 7—ISDN User Part signaling procedures, Dec. 1999.

Q765 (Application Transport Mechanism, CCITT Signaling System No. 7 ISDN User Part) (May 1998).

Q766 (Performance Objectives in the Integrated Services Digital Network Application, CCITT Signaling System No. 7 ISDN User Part) (Mar. 1993).

Q769.1 (ITU-T—ISDN User Part Enhancements for the Support of Number Portability) (Dec. 1999).

Q1214, ITU-T Intelligent Network Distributed Functional Plane for Intelligent Network CS-1. 1995, Oct. 1995.

Q1218 ITU-T Interface Recommendation for Intelligent Network CS-1. 1995, Oct. 1995.

* cited by examiner

METHOD AND SYSTEM FOR PROVIDING ROAMING SERVICES TO PREPAID ROAMERS OF A HOME NETWORK

CROSS-REFERENCE TO RELATED APPLICATION

This application is a National Stage entry of International Application No. PCT/US2008/000765 having international filing date of Jan. 22, 2008, which claims priority to U.S. Provisional Application Ser. No. 60/881,136 filed Jan. 19, 2007, the disclosure of each of which is hereby incorporated in its entirety by reference.

RELATED APPLICATIONS

This application claims the benefit of U.S. Provisional Patent Application No. 60/881,136 entitled "Non-Standard Prepaid Outbound Roaming and Its Transparent Solutions to Charge MT Call Routing to Outbound Roamers and to Charge MO-SMS From Outbound Roamers" filed on Jan. 19, 2007. The aforementioned provisional patent application is incorporated herein by this reference in its entirety.

FIELD OF THE INVENTION

The present invention generally relates to mobile communication of roamers. More specifically, the invention relates to providing roaming services to prepaid outbound roamers of a home network and handling their billing, when they are roaming in any visited network that is otherwise unable to provide the roaming services to these prepaid roamers.

BACKGROUND OF THE INVENTION

Mobile services are becoming increasingly popular, leading to competition between different network operators to increase their roaming revenues. Mobile subscribers, who frequently roam in different countries (or across different networks within the same country), are major contributors of this roaming revenue. Network operators across the world tend to earn maximum revenues from these roaming subscribers. Thus many of these network operators offer international or national roaming to their outbound and inbound roamers.

Primarily, outbound roamers are major contributors of roaming revenue for most of the network operators. Moreover, since they do not require credit worthiness, prepaid services are available to a greater number of subscribers than post-paid service. With the growing prevalence of pre-paid service, an increasing number of pre-paid subscribers are also becoming interested in using their mobile service while traveling outside of their networks, representing an increasingly important revenue opportunity for their home operators. In order to provide roaming services to its prepaid outbound roamers, a home network operator requires a roaming agreement, or special amendments to their existing roaming agreements, with its roamers' visited network(s). Prepaid roaming services allow the prepaid roamers to make and receive calls, send and receive Short Message Service (SMS) and other Value Added Services (VASs), just like any other postpaid roamer.

In the state of the art, one technique of providing prepaid outbound roaming, the home network operator uses an Unstructured Supplementary Service Data (USSD) call back service. When a prepaid subscriber of the home network roaming in the visited network makes a call to a called party number, the visited network relays an USSD command to an USSD call back server (located in the home network), which triggers a call back towards the calling number (i.e., prepaid subscriber's number) and the called party number as defined in the USSD command. In this way, the visited network operator passes all MO call control of prepaid roamers coming from the home network back to the home network. However, the USSD call back service represents a poor user experience, since it needs a two way call to be established, invokes poor call quality, less flexibility, and does not support SMS roaming. In the face of those and other limitations, that type of USSD-based service is not widely adopted.

In another technique to provide prepaid outbound roaming, some network operators use Customized Application for Mobile Enhanced Logic (CAMEL) service, where the visited network operator passes all MO call control of prepaid roamers coming from the home network back to the home network. However, the CAMEL service requires the visited network operators to first support CAMEL protocol, then upgrade to a CAMEL phase similar to that of the home network (if both networks have different CAMEL phase support), and establish CAMEL agreement with the home network, in order to provide roaming services. Although some European networks generally support CAMEL protocol, most of these networks are yet to establish CAMEL agreements with each other and various other networks in different countries. Usually, in many other regions, such as Asia, Middle East and Africa, network operators do not even support CAMEL protocol for prepaid roaming. Those infrastructure changes, new roaming agreements, and rigorous testing and billing processes present formidable barriers to any diffusion of CAMEL-based prepaid roaming.

In accordance with the foregoing, there is a need in the art of a system, a method, and a computer program product, which allows prepaid subscribers of a home network to roam in visited networks even when either the home network or visited networks do not support CAMEL (or IN) protocol or they do not have a CAMEL (or IN) agreement with each other.

SUMMARY OF THE INVENTION

The present invention is directed towards a method for providing roaming services to a HPMN's prepaid subscriber that is registered with a VPMN. The method includes facilitating by an SG, associated with the HPMN, the prepaid subscriber's registration at the VPMN even if that prepaid subscriber's roaming profile is absent at an HLR associated with the HPMN to roam in the VPMN. The HPMN and the VPMN are part of one or more partner networks. The SG is deployed at either the HPMN, or an MVNO associated with the HPMN, or a hub operator. Moreover, either the HPMN or the VPMN or both may be unable to support CAMEL (or IN) protocol; or both the HPMN and the VPMN may not have a CAMEL (or IN) agreement. The method further includes enabling mobile communication of the prepaid subscriber in the VPMN by the SG to provide the roaming services to the prepaid subscriber in the VPMN. The SG converts the protocol of all signaling messages, corresponding to the prepaid subscriber in the VPMN, into a format compatible with the HPMN, where the SG performs the protocol conversion when the HPMN and the VPMN support different protocols. The method further includes billing the prepaid subscriber based on pre-defined criteria by using the SG that interfaces with a PPS associated with the HPMN via either: an SCP, or a service node, or an SMSC; all three being associated with the HPMN.

Another aspect of the present invention presents a system for providing roaming services to a HPMN's prepaid subscriber that is registered with a VPMN. The system includes an SG deployed at either the HPMN, or an MVNO associated with the HPMN, or a hub operator. The SG facilitates the prepaid subscriber's registration at the VPMN even if that prepaid subscriber's roaming profile is absent at an HLR associated with the HPMN to roam in the VPMN. The HPMN and the VPMN are part of one or more partner networks. Moreover, either the HPMN or the VPMN or both may be unable to support CAMEL (or IN) protocol; or both the HPMN and the VPMN may not have a CAMEL (or IN) agreement. Further, the SG enables mobile communication of the prepaid subscriber in the VPMN to provide the roaming services to the prepaid subscriber in the VPMN. The SG converts the protocol of all signaling messages, corresponding to the prepaid subscriber in the VPMN, into a format compatible with the HPMN, where the SG performs the protocol conversion when the HPMN and the VPMN support different protocols. Further, the HPMN bills the prepaid subscriber based on pre-defined criteria by using the SG that interfaces with a PPS associated with the HPMN via either: an SCP, or a service node, or an SMSC; all three being associated with the HPMN.

Yet another aspect of the present invention provides a computer program product including a computer usable program code for providing roaming services to a HPMN's prepaid subscriber that is registered with a VPMN by facilitating using an SG associated with the HPMN, the prepaid subscriber's registration at the VPMN even if that prepaid subscriber's roaming profile is absent at an HLR associated with the HPMN to roam in the VPMN. The HPMN and the VPMN are part of one or more partner networks. The SG is deployed at either the HPMN, or an MVNO associated with the HPMN, or a hub operator. Moreover, either the HPMN or the VPMN or both may be unable to support CAMEL (or IN) protocol; or both the HPMN and the VPMN may not have a CAMEL (or IN) agreement. Further, the computer program product enables mobile communication of the prepaid subscriber in the VPMN by the SG so as to provide the roaming services to the prepaid subscriber in the VPMN. The SG converts protocol of all signaling messages, corresponding to the prepaid subscriber in the VPMN, into a format compatible with the HPMN, where the protocol conversion is performed when the HPMN and the VPMN support different protocols. Further, the computer program product bills the prepaid subscriber based on pre-defined criteria by using the SG that interfaces with a PPS associated with the HPMN via either: an SCP, or a service node, or an SMSC; all three being associated with the HPMN.

BRIEF DESCRIPTION OF THE DRAWINGS

In the drawings, the same or similar reference numbers identify similar elements or acts.

DETAILED DESCRIPTION

Figure 1:
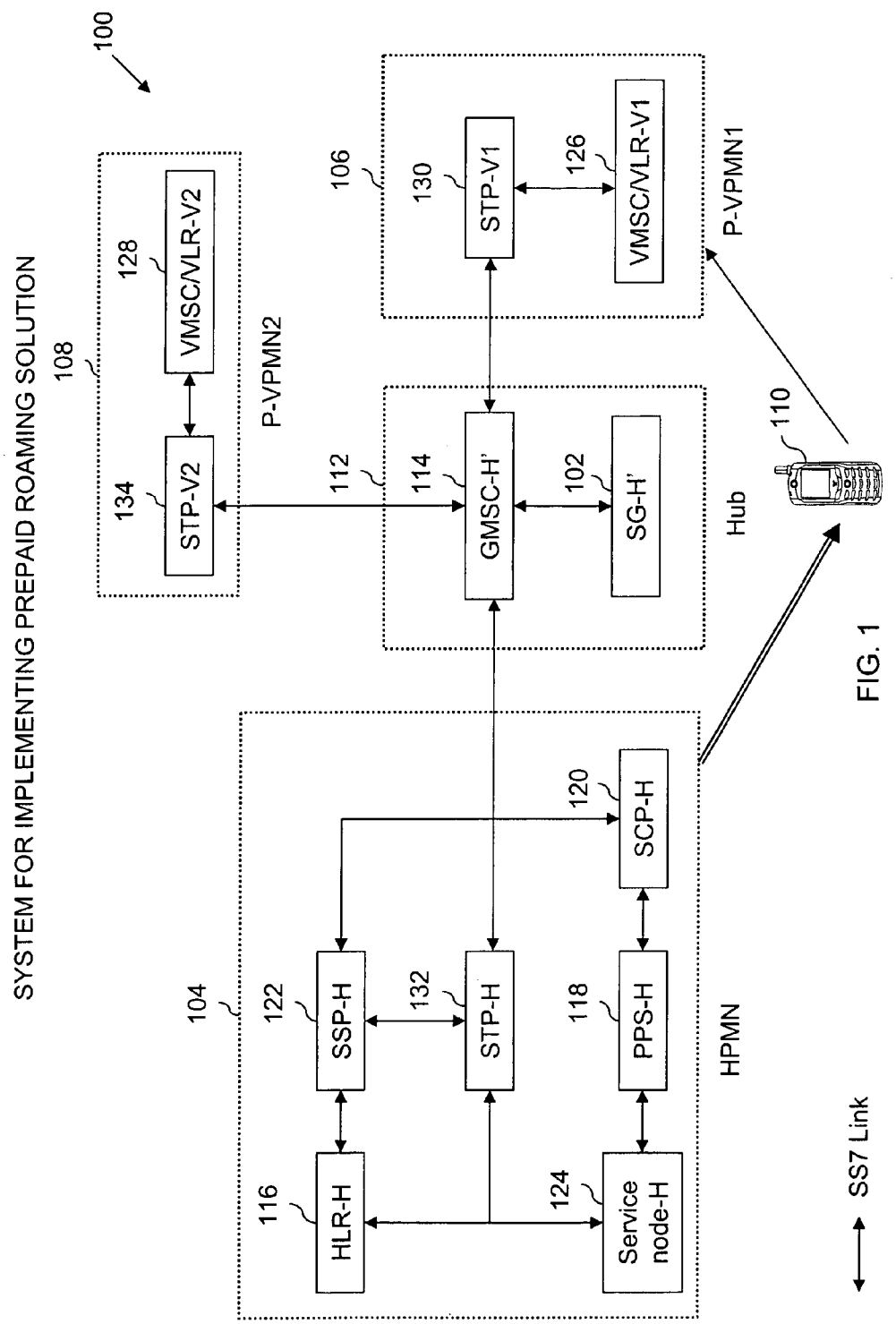
FIG. 1 illustrates a system for providing roaming services to prepaid subscribers of a Home Public Mobile Network (HPMN), in accordance with an embodiment of the present invention.

In the following description, for purposes of explanation, specific numbers, materials and configurations are set forth in order to provide a thorough understanding of the present invention. It will be apparent, however, to one having ordinary skill in the art that the present invention may be practiced without these specific details. In some instances, well-known features may be omitted or simplified, so as not to obscure the present invention. Furthermore, reference in the specification to "one embodiment" or "an embodiment" means that a particular feature, structure or characteristic, described in connection with the embodiment, is included in at least one embodiment of the present invention. The appearance of the phrase "in an embodiment", in various places in the specification, does not necessarily refer to the same embodiment.

The present invention provides a system, a method, and a computer program product that allows a home network's prepaid subscriber to roam in one or more special partner visited networks (hereinafter interchangeably referred to as one or more partner networks) with one or more of the following conditions:
1. The home network does not support Customized Application for Mobile Enhanced Logic (CAMEL) or Intelligent Network (IN) protocol;
2. The partner visited networks do not support CAMEL (or IN) protocol;
3. Both the home network and partner visited networks do not support CAMEL (or IN) protocol; or
4. The home network has no CAMEL (or IN) agreement with these partner visited networks.

It will be apparent to a person skilled in the art that the last condition includes the case where both the home network and the partner visited networks support CAMEL (or IN) protocol (either same or different CAMEL (or IN) versions/phases); however, they do not possess any CAMEL (or IN) agreement with each other. The present invention also provides roaming services to CAMEL prepaid outbound roamers (i.e., prepaid roamers who have CAMEL protocol support in their home network) at partner visited networks that do not either support CAMEL protocol, or have a CAMEL agreement with the home network. For convenient reference, all the above mentioned conditions of CAMEL (or IN) support, or agreement, or a combination thereof are hereinafter interchangeably referred to as CAMEL (or IN) support/agreement. The home network operator offers its prepaid outbound subscribers various roaming services in any of the partner visited networks. Hence the present invention can provide an ecosystem formed by a group of network operators (including the home network and the partner visited networks), that are otherwise unable to support prepaid outbound roaming of their respective subscribers. In order to allow the group of network operators to support prepaid outbound roaming of their respective subscribers within the ecosystem, these network operators require special agreements with each other. These special agreements include routing (i.e., roaming agreement etc.) and billing agreements, which are described later in the context of the present invention. It will be apparent to a person skilled in the art that roaming services include standard call and non-call related activities such as, but not limited to, Mobile Originated (MO) call, Mobile Terminated (MT) call, Short Message Service (SMS), Packet Data Network (PDN), and other Value Added Services (VASs) such as, SMS forwarding and SMS filtering. In accordance with various embodiments of the present invention, a prepaid subscriber of the home network can roam in the partner visited network (e.g., in a visiting country) even without having a roaming profile at a Home Location Register (HLR) in the prepaid subscriber's home network. This reduces logistic requirements and controls fraud while prepaid subscribers are outbound roaming.

The member networks of the ecosystem allow their respective prepaid subscribers to roam within the ecosystem by deploying a Signal Gateway (SG), either at a centralized location or in any of the partner networks of the ecosystem. FIG. 1 illustrates a system 100 that provides roaming services to prepaid subscribers of the home network, in accordance with an embodiment of the present invention. The system includes an SG 102 in a Home Public Mobile Network (HPMN) 104 (i.e., the home network). Various members (i.e., network operators) of the ecosystem, which are otherwise unable to support prepaid roaming of their respective prepaid subscribers, share SG 102 to provide roaming services to these roamers who are roaming in other members of the ecosystem. System 100 further includes a first partner Visited Public Mobile Network (P-VPMN1) 106 (i.e., the partner visited network), and a second partner VPMN (P-VPMN2) 108. HPMN 104, P-VPMN1 106 and P-VPMN2 108 together form the ecosystem, in accordance with an embodiment of the present invention. In another embodiment of the present invention, HPMN 104 and P-VPMN1 106 form the ecosystem. It will be apparent to a person skilled in the art that system 100 may include various other members (i.e., other partner networks) that are a part of the ecosystem, and serve their respective prepaid subscribers while roaming within the ecosystem. However, for the sake of convenience, this embodiment considers only three networks in the ecosystem. Different members of the ecosystem may reside in the same country or in different countries.

As described earlier, every member of the ecosystem needs to have a special agreement with the selected members of the ecosystem to allow their prepaid outbound subscribers to roam in the member networks. In one embodiment of the present invention, HPMN 104 operator allows its prepaid outbound roamers to roam in P-VPMN1 106 and P-VPMN2 108 using SG 102. In another embodiment of the present invention, HPMN 104 allows its prepaid subscribers to roam in P-VPMN1 106; but may restrict roaming in P-VPMN2 108. This may be the case when a large number of prepaid subscribers of HPMN 104 prefer roaming in P-VPMN1 106; and a less number of HPMN 104's prepaid subscribers roam in P-VPMN2 108. In this case, HPMN 104 establishes special agreement with P-VPMN1 106; however, no such agreement is established with P-VPMN2 108. In an embodiment of the present invention, a prepaid subscriber 110 of HPMN 104 makes a registration attempt at P-VPMN1 106 that has no CAMEL (or IN) support/agreement with HPMN 104. In other words, HPMN 104 and P-VPMN1 106 are unable to support either IN protocol or an IN agreement or both. According to the special agreement between HPMN 104 and P-VPMN1 106, P-VPMN1 106 directs all originating Signaling Connection Control Part (SCCP) and call control messages, corresponding to prepaid subscriber 110, to SG 102. Originating SCCP messages are the messages corresponding to prepaid subscriber 110 that originate from P-VPMN1 106 such as, but not limited to, a Location Update (LUP), an ISDN User Part (ISUP) Initial Address Message (IAM) or an Initial Detection Point (IDP) IN/CAP message (i.e., in case of MO call), and an MO-FWD-SM (i.e., in case of MO SMS). Also, call control messages include signaling messages such as, but not limited to, ISUP (i.e., for service node based solution), IN (i.e., for SCP based solution), and CAP (i.e., for CAMEL roaming prepaid subscribers). Various techniques deployed by P-VPMN1 106 operator to route these messages to SG 102 are described later in the context of the present invention. In an embodiment of the present invention, the special agreement also entails a mutual understanding between HPMN 104 and P-VPMN1 106 operator to bill prepaid outbound roamers of HPMN 104 while they are roaming in P-VPMN1 106.

In an embodiment of the present invention, based on mutual understanding between members of the ecosystem, SG 102 is deployed either at a hub 112 (i.e., a centralized location) operator, or at a Mobile Virtual Network Operator (MVNO) associated with HPMN 104, or in HPMN 104 itself. In the embodiment representing system 100, SG 102 is deployed at hub 112 operator (e.g., a Camel/IN gateway hub), and thus SG 102 is hereinafter interchangeably referred to as SG-H' 102. SG-H' 102 also helps HPMN 104 operator to handle billing of its prepaid subscriber 110 while roaming in P-VPMN1 106. Hub 112 further includes a Gateway Mobile Switching Center (GMSC-H') 114. It will be apparent to a person skilled in the art that in case SG-H' 102 is deployed in HPMN 104, GMSC-H' 114 is replaced with a GMSC associated with HPMN 104 (not shown in FIG. 1). System 100 further includes in HPMN 104 an HLR 116 and a PrePaid System (PPS) 118. Since HLR 116 and PPS 118 reside in HPMN 104, they are hereinafter referred to as HLR-H 116 and PPS-H 118, respectively. It will be apparent to a person skilled in the art that PPS is used for charging any ongoing call such that the call is disconnected when account limit is determined to be insufficient to continue the call. The PPS system has various advanced functionalities such as, but not limited to, Wireless Access Protocol (WAP), first generation of PrePaid GPRS, real time content charging, Family & Friends, and real time charging of SMS and Multimedia Messaging Service (MMS) as well as roaming based on CAMEL or USSD callback. In one embodiment of the present invention, when HPMN 104 supports IN protocol, HPMN 104 includes a Signaling Control Point (SCP-H) 120 and a Service Switch Point (SSP-H) 122. The case of HPMN 104 supporting IN protocol is hereinafter interchangeably referred to as SCP based prepaid solution. In another embodiment of the present invention, when HPMN 104 does not support IN protocol, HPMN 104 includes a service node-H 124, instead of SCP-H 120 and SSP-H 122. The case of HPMN 104 not supporting IN protocol is hereinafter interchangeably referred to as service node based prepaid solution.

System 100 further includes in P-VPMN1 106, a Visited Location Register (VLR-V1) 126 that is integrated with a Visited Mobile Switching Center (VMSC). Since VLR-V1 126 communicates with its integrated VMSC using an internal communication interface (called B-interface) and a Sub System Number (SSN), and they collectively reside in P-VPMN1 106, they are hereinafter interchangeably referred to as VMSC/VLR-V1 126. However both VLR and VMSC may have different logical addresses. Similarly, P-VPMN2 108 includes a VMSC/VLR-V2 128.

Prepaid subscriber 110's signaling in P-VPMN1 106 is routed to hub 112 via a roaming Signaling Transfer Point (STP-V1) 130. Hub 112 further routes the signaling to HPMN 104 via an STP-H' (not shown in FIG. 1) in hub 112. Similarly, prepaid subscriber 110's signaling in HPMN 104 is routed to P-VPMN1 106 via an STP-H 132. Furthermore, in case prepaid subscriber 110 moves to P-VPMN2 108, prepaid subscriber 110's signaling is routed to hub 112 via an STP-V2 134. It will be apparent to a person skilled in the art that any network element in HPMN 104, P-VPMN1 106, and P-VPMN2 108 may communicate with each via Signaling System #7 (SS7) links. It will also be apparent to a person skilled in the art that HPMN 104, P-VPMN1 106, and P-VPMN2 108 may also include various other network components (not shown in FIG. 1), depending on the architecture under consideration.

Figure 2:
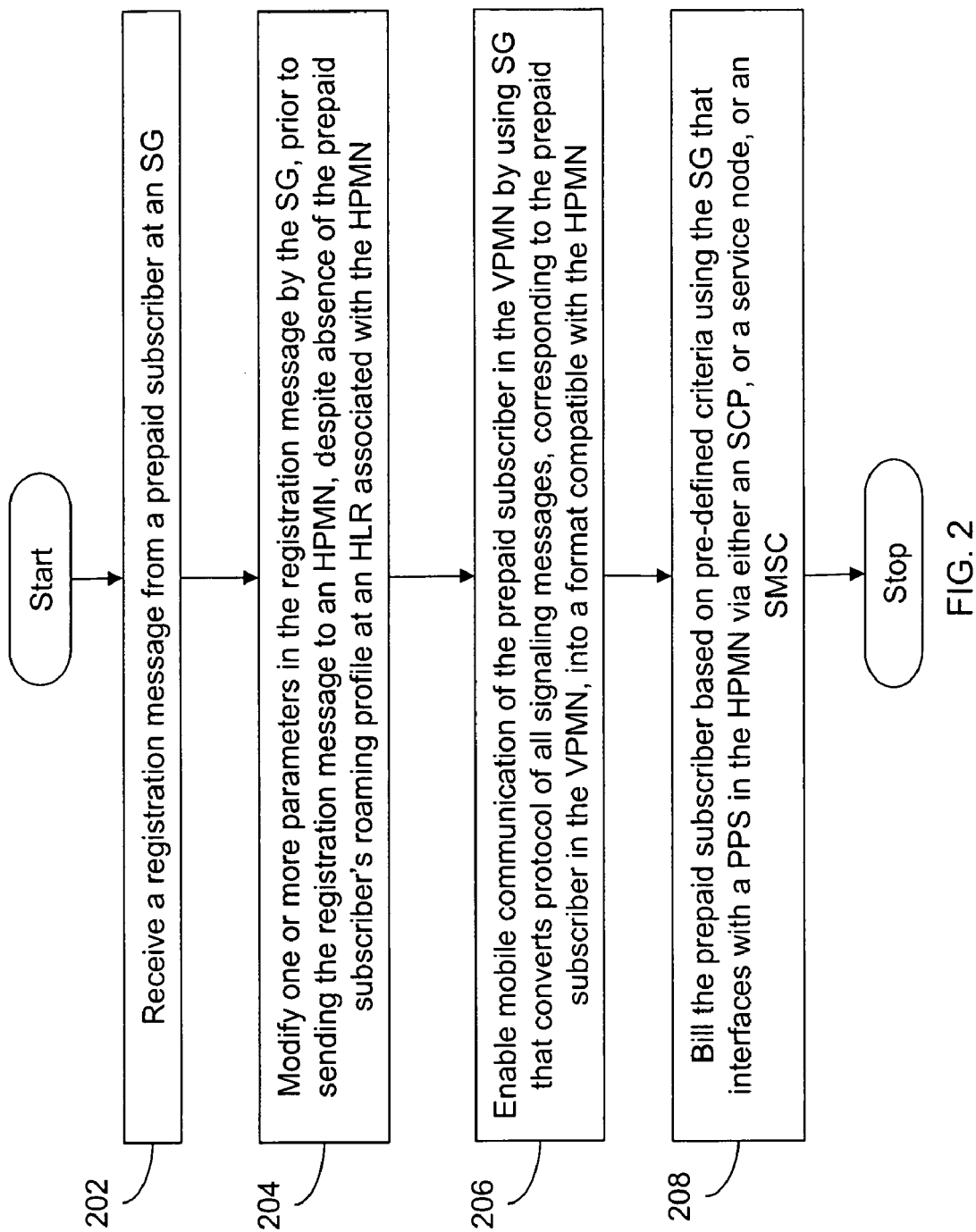
FIG. 2 represents a flowchart for providing roaming services to a prepaid subscriber of the HPMN that is roaming in a Visited Public Mobile Network (VPMN), in accordance with an embodiment of the present invention.

FIG. 2 represents a flowchart for providing roaming services to prepaid subscriber 110 of HPMN 104, in accordance with an embodiment of the present invention. At step 202, SG 102 receives a registration message from prepaid subscriber 110. In one embodiment of the present invention, SG 102 receives the registration message when prepaid subscriber 110 attempts to register at P-VPMN 1 106. In one embodiment of the present invention, P-VPMN1 106 is present in a country different from HPMN 104. In another embodiment of the present invention, P-VPMN1 106 is present in same country as HPMN 104. When prepaid subscriber 110 attempts to register at P-VPMN1 106, VMSC/VLR-V1 126 sends the registration message, such as LUP message, to SG-H' 102. As mentioned earlier, P-VPMN1 106 operator needs to direct all originating SCCP and call control messages to SG-H' 102. In a first embodiment of the present invention, SG-H' 102 receives these messages via a dedicated connection (e.g., a leased line connection) between GMSC-H' 114 and VMSC/VLR-V1 126. The use of leased line connection can help P-VPMN1 106 operator reduce ISUP International Direct Dial (IDD) cost (due to simplified ISUP routing) and simplify SCCP routing by directly routing the SCCP messages to a Destination Point Code (DPC) of SG-H' 102, without changing an SCCP Called Party Address (CdPA) in the SCCP messages.

In a second embodiment of the present invention, in order to avoid the use of leased line connection, P-VPMN1 106 operator without CAMEL (or IN) support configures its STP-V1 130 to add a prefix corresponding to SG-H' 102, to either prepaid subscriber 110's number (i.e., an MSISDN used by prepaid subscriber 110 while roaming in P-VPMN1 106) or a called party number (i.e., an MSISDN to which a call is made or SMS is sent by prepaid subscriber 110), in order to direct the originating call control messages to SG-H' 102. The prefix is added depending upon capabilities of P-VPMN1 106's switch (i.e., VMSC/VLR-V1 126), or hub 112's switch (i.e., GMSC-H' 114 or SG-H' 102 in case it supports switching capabilities to handle MO and MT calls) or HPMN 104's switch (i.e., GMSC associated with HPMN 104). In an embodiment of the present invention, for SCCP messages, P-VPMN1 106 operator routes the originating SCCP messages to SG-H' 102 by configuring STP-V1 130 to add the prefix to the SCCP messages (i.e. SCCP CdPA). In another embodiment of the present invention, for SCCP messages, P-VPMN1 106 operator configures VLR-V1 126 to perform International Mobile Subscriber Identity (IMSI) analysis and thus directs the SCCP messages to SG-H' 102. It will be apparent to a person skilled in the art that IMSI analysis is the process of examining a subscriber's IMSI by a network 'X' in order to identify a network 'Y' to which the IMSI belongs, and whether subscribers from network 'Y' are allowed to roam in the network 'X'.

In a third embodiment of the present invention, when HPMN 104 or P-VPMN1 106 do not support CAMEL (or IN) protocol, and P-VPMN1 106 operator does not wish to establish an ISUP routing to SG-H' 102 (or GMSC-H' 114) due to cost associated with it, then P-VPMN1 106 operator can deploy an ISUP-IN converter at VMSC/VLR-V1 126. This ISUP-IN converter can exchange all call control messages with SG-H' 102 via IN protocol, and exchanges the call control messages with HPMN 104 and P-VPMN1 106 via ISUP protocol so as to avoid using the ISUP routing from SG-H' 102 to HPMN 104 and P-VPMN1 106.

Since prepaid subscriber 110 does not have roaming profile at HLR-H 116, he may not be allowed to roam in P-VPMN1 106. Hence SG 102, at step 204, modifies one or more parameters in the registration message, prior to sending the registration message to HPMN 104. In an embodiment of the present invention when SG-H' 102 receives LUP message from VMSC/VLR-V1 126, SG-H' 102 modifies Calling Party Address (CgPA) from VLR-V1 to SG-H'-VLR. SG-H' 102 further changes VMSC/VLR-V1 address of prepaid subscriber 110 to an SG-H' HPMN Global Title (GT) (hereinafter interchangeably referred to as SG-H' GT) in the LUP message, prior to sending the LUP message to HLR-H 116. By doing so, SG-H' 102 fakes at HLR-H 116 that prepaid subscriber 110 is present in HPMN 104, when actually prepaid subscriber 110 is roaming in P-VPMN1 106. Thus prepaid subscriber 110 is able to register at P-VPMN1 106 even though he does not have roaming profile at HLR-H 116. The detailed explanation of prepaid subscriber 110's registration process at P-VPMN1 106 will be explained later in conjunction with FIGS. 3A and 3B.

Once prepaid subscriber 110 has successfully registered with P-VPMN1 106, since P-VPMN1 106 operator has no CAMEL (or IN) support/agreement with HPMN 104 operator, HPMN 104 operator needs to handle prepaid subscriber 110's mobile communication in P-VPMN1 106. Therefore, at step 206, SG 102 enables mobile communication of prepaid subscriber 110 in P-VPMN1 106. To do so, in accordance with an embodiment of the present invention, SG 102 converts protocol of all signaling messages, corresponding to prepaid subscriber 110 in P-VPMN1 106, into a format compatible with HPMN 104. SG 102 performs the protocol conversion only when HPMN 104 and P-VPMN1 106 support different protocols or support different versions of the same protocol. Hence prepaid subscriber 110 is allowed to perform MO and MT activities such as, initiate/receive calls and send/receive SMS while roaming in P-VPMN1 106. In one embodiment of the present invention, when HPMN 104 supports CAMEL (or IN) protocol and P-VPMN1 106 may or may not support CAMEL (or IN) protocol, then SG-H' 102 converts protocol of all received signaling messages. For example, SG-H' 102 converts an ISUP IAM message to an IN IDP message. SG-H' 102 has the capability to perform conversions between various protocols, and also between different versions of the same protocol such as, but not limited to, different ISUP versions (e.g., different versions in different countries like China, Brazil, Singapore, etc.), an ISUP version and an IN variant (e.g., different versions/variants by different service providers like Siemens, Alcatel, Ericsson, Nortel, etc.), a CAMEL version (e.g., phase I, II, III or IV) and a non-CAMEL version (e.g., ISUP), and different IN variants. In case protocol of the signaling messages received at SG-H' 102 is compatible with HPMN 104, SG-H' 102 does not perform any protocol conversion, in accordance with an embodiment of the present invention.

Furthermore, the fact that MT calls (including late call forwarding) in some countries do not involve PPS-H 118 for prepaid subscribers in HPMN 104, can complicate charging of MT calls to prepaid outbound roamers. This is because HLR-H 116 understands that prepaid subscriber 110 is in HPMN 104, while actually he is roaming in P-VPMN1 106. This may result in incorrect (or erroneous) billing of prepaid subscriber 110's MT call in P-VPMN1 106. Similarly, since MO calls in some countries do not involve location based charging for prepaid subscribers at HPMN 104, HPMN 104 operator may incorrectly bill for MO calls by prepaid outbound roamers in P-VPMN1 106. In addition, MO SMS in many countries do not support location based SMS charging even though SCCP CgPA contains the VMSC location information.

In order to bill prepaid subscriber 110 in P-VPMN1 106 properly, at step 208, an operator of HPMN 104 can use SG 102 to bill prepaid subscriber 110 based on pre-defined criteria. SG 102 interfaces with PPS-H 118 via either SCP-H 120, or service node-H 124, or a Short Message Service Center (SMSC), where all three nodes are present in HPMN 104. In an embodiment of the present invention, for enabling and handling MO and MT call/SMS, and late call forwarding, when HPMN 104 supports IN protocol (i.e., the SCP based solution), SG-H' 102 can interface indirectly with PPS-H 118 via SCP-H 120. In another embodiment of the present invention, for enabling and handling MO and MT call/SMS, and late call forwarding, when HPMN 104 does not support IN protocol (i.e., the service node based solution), SG-H' 102 can interface indirectly with PPS-H 118 via service node-H 124. In yet another embodiment of the present invention, for enabling and handling MO SMS, SG-H' 102 can interface indirectly with PPS-H 118, via the SMSC associated with HPMN 104. Following are the pre-defined criteria for billing prepaid subscriber 110:
1. Whether charging is handled by SCP-H 120, or service node-H 124, or the SMSC in HPMN 104; and
2. Whether HPMN 104 supports location based charging.

Detailed explanation of various implementations for enablement of calls and SMS, and management of billing of prepaid subscriber 110 using SG-H' 102, based on these pre-defined criteria is given later in the context of the present invention.

Figure 3A:
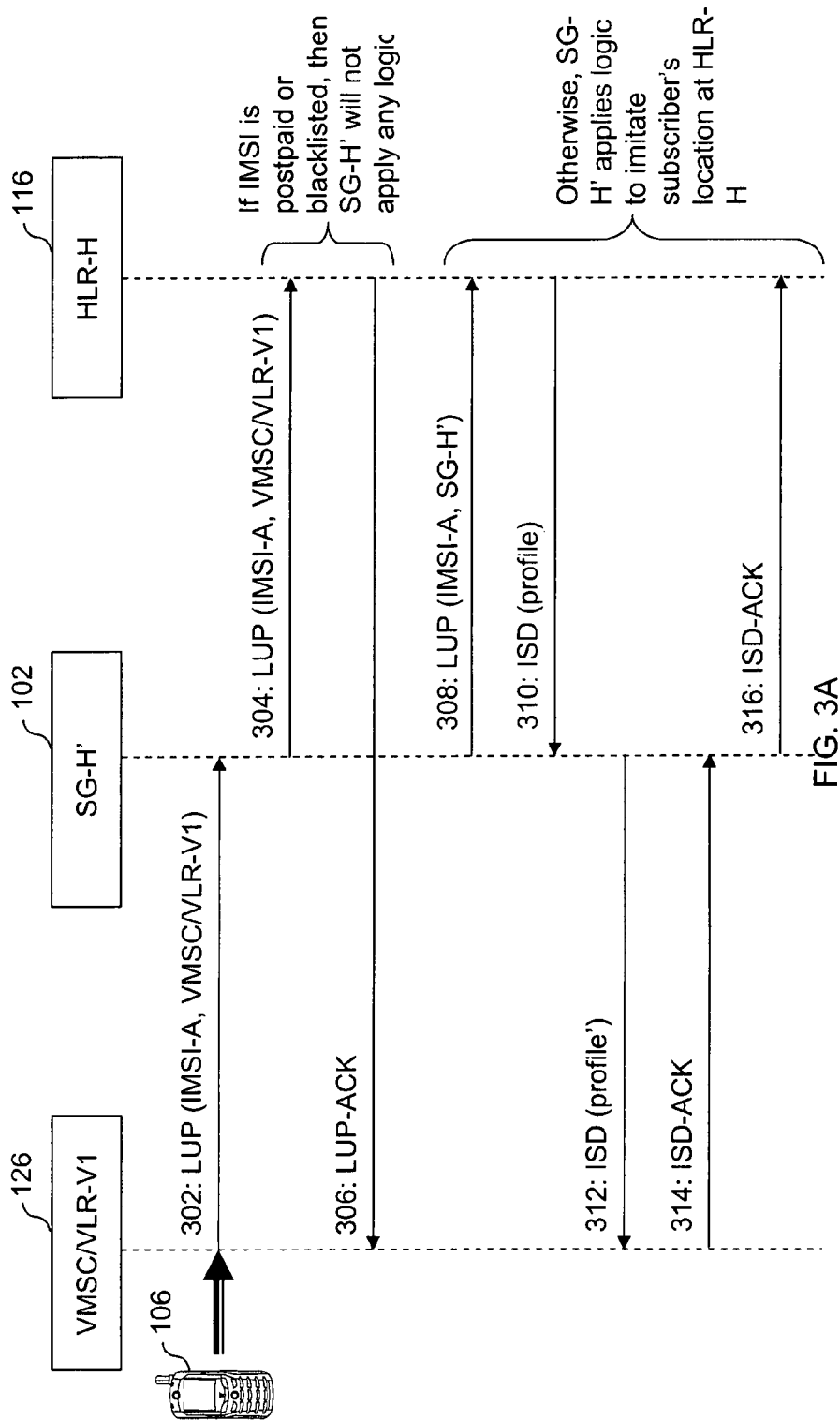
FIGS. 3A and 3B represent a flow diagram for facilitating the prepaid subscriber's registration attempt at the VPMN using a Signal Gateway (SG), in accordance with an embodiment of the present invention.
Figure 3B:
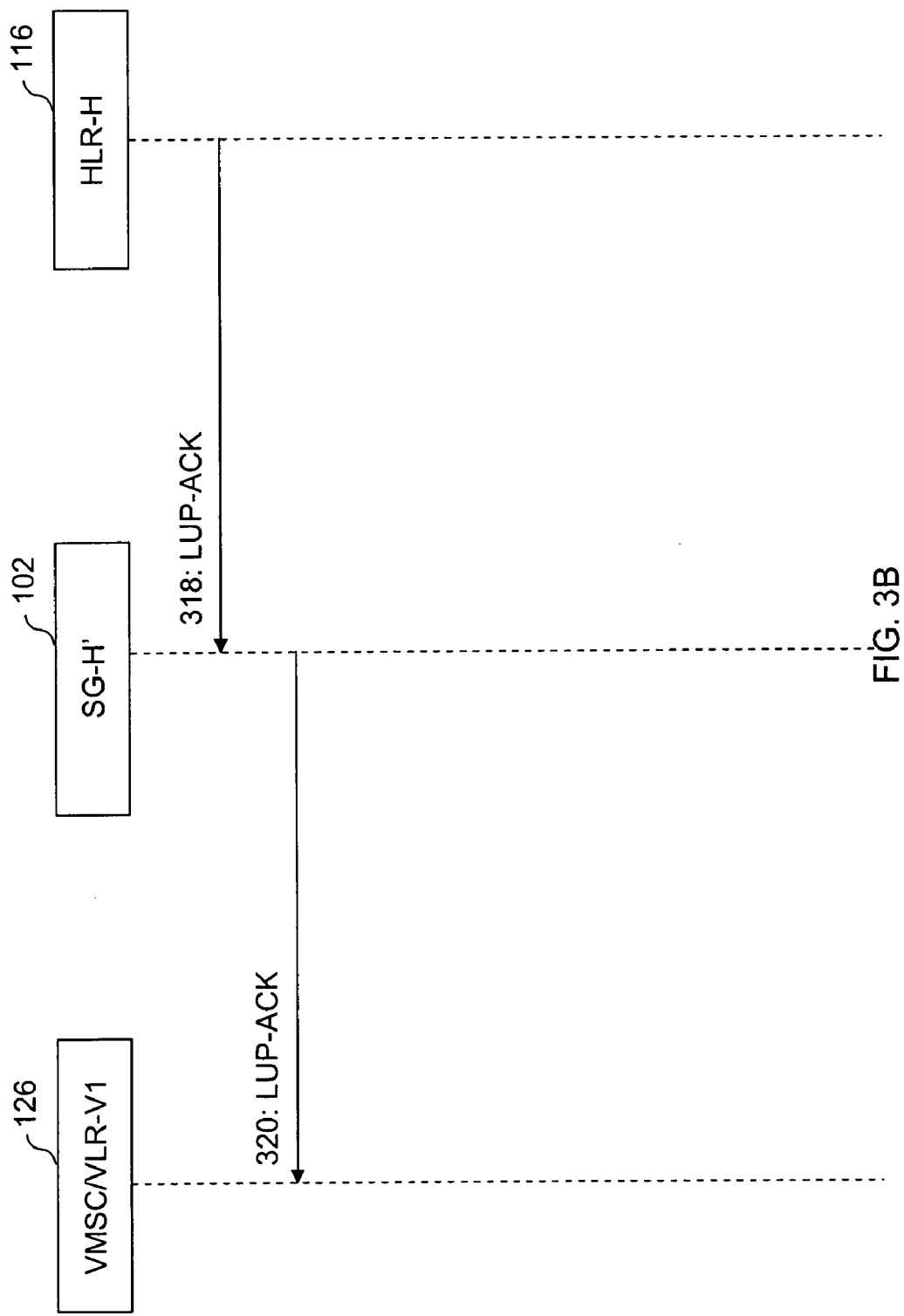

As mentioned earlier, prepaid subscriber 110 needs first to successfully register with P-VPMN1 106 in order to enjoy prepaid roaming services. FIGS. 3A and 3B represent a flow diagram for facilitating prepaid subscriber 110's registration attempt at P-VPMN1 106 using SG-H' 102, in accordance with an embodiment of the present invention. Prepaid subscriber 110 makes a registration attempt at VMSC/VLR-V1 126 and thus at step 302, VMSC/VLR-V1 126 sends LUP message with a real VMSC/VLR-V1 address and an IMSI of prepaid subscriber 110 (hereinafter referred to as IMSI-A) to SG-H' 102. In an embodiment of the present invention, SG-H' 102 compares IMSI-A with blacklist IMSIs, white list IMSIs, and a set of IMSI ranges, upon detecting prepaid subscriber 110's registration attempt at P-VPMN1 106. In another embodiment of the present invention, SG-H' 102 performs this check only when P-VPMN1 106 operator (i.e., using VMSC/VLR-V1 126) is unable to determine whether inbound roamers from HPMN 104 are prepaid or postpaid. It will be apparent to a person skilled in the art that a network element (i.e., SG-H' 102 in this case) normally checks whether subscriber 110 is prepaid or postpaid by analyzing subscriber 110's identity, e.g., a Mobile Station International Subscriber Directory Number (MSISDN) of subscriber 110 (hereinafter referred to as MSISDN-A), and CAMEL Subscription Information (CSI) of IMSI-A. In an embodiment of the present invention, SG-H' 102 can obtain the MSISDN-A and CSI of IMSI-A by sending either a MAP SendParameters message or a RestoreData message on the IMSI-A to HLR-H 116. In an embodiment of the present invention, SG-H' 102 stores prepaid subscriber 110's profile information, such as, MSISDN-A, IMSI-A, real VLR-V1 address, real VMSC-V1 address, SG-H'-VLR location, SG-H'-VMSC address, and an SG-H'-HLR address. In addition, SG-H' 102 stores call status, SMS status, late call forwarding status, a late call forwarding number, an SMS forwarding number, and CSI of prepaid subscriber 110. In such a case, the IMSI-A is determined to be postpaid or blacklisted or both, SG-H' 102 relays the LUP message to HLR-H 116 without any modification, at step 304. Thereafter, at step 306, HLR-H 116 returns a LUP-ACK message directly to VMSC/VLR-V1 126.

Alternatively, in case the IMSI-A is determined to be prepaid and white listed, then, at step 308 SG-H' 102 modifies CgPA as VLR-V1 to SG-H'-VLR, and VMSC/VLR-V1 address of prepaid subscriber 110 to SG-H' GT, in the LUP message, prior to sending the LUP message to HLR-H 116. This result in faking at HLR-H 116 that prepaid subscriber 110 is still in HPMN 104. In another embodiment of the present invention, when HPMN 104 supports IN protocol, while P-VPMN1 106 has no IN support/agreement with HPMN 104; or when P-VPMN1 106 supports IN protocol version that is different from IN protocol version supported by HPMN 104, SG-H' 102 also fakes P-VPMN1 106's IN support at HPMN 104 (in addition to faking/imitating prepaid subscriber 110's location at HPMN 104), prior to sending the LUP message to HLR-H 116. For example, when HPMN 104 supports CAMEL phase II, whereas P-VPMN1 106 either does not support CAMEL protocol or supports a lower CAMEL protocol version (like CAMEL phase I), then SG-H' 102 imitates P-VPMN1 106's CAMEL phase II support at HLR-H 116. In an embodiment of the present invention, when SG-H' 102 imitates P-VPMN1 106's CAMEL support at HPMN 104, HLR-H 116 returns CSI for prepaid subscriber 110 to SG-H' 102. In this case SG-H' 102 stores CSI of prepaid subscriber 110. It will be apparent to a person skilled in the art that CSI indicates the service to which the subscriber has subscribed such as, but not limited to, prepaid service, Virtual Private Network (VPN), and an SCP that is responsible for service control. Hence SG-H' 102 may use this CSI to inform VMSC/VLR-V1 126 that prepaid subscriber 110, registering with P-VPMN1 106, is a prepaid roamer.

Thereafter, at step 310, HLR-H 116 returns an ISD message with prepaid subscriber 110's profile information to SG-H' 102. At step 312, SG-H' 102 relays the ISD message to VMSC/VLR-V1 126 with SCCP CgPA changed to SG-H'-HLR and SCCP CdPA changed to real VLR-V1. In an embodiment of the present invention, HPMN 104 operator can configure SG-H' 102 to modify prepaid subscriber 110's profile information in the ISD message, prior to relaying the ISD message to VMSC/VLR-V1 126, in order to enable prepaid subscriber 110's mobile communication in P-VPMN1 106. SG-H' 102 can modify the profile information (the modified profile is represented as profile' in FIGS. 3A and 3B) in following ways:
1. Removing a call barring parameter from the ISD message (e.g., removing Operator Determined Barring (ODB) or Call Barring (CB) for USSD prepaid/prepaid roamers with premium numbers, so that they can initiate MO calls (without USSD callback) and send SMS, which are otherwise not possible),
2. Removing CSI,
3. Adding a service key, and
4. Adding a late call forwarding parameter to enable late call forwarding for prepaid subscriber 110 in P-VPMN1 106.

As described earlier, HLR-H 116 returns CSI to SG-H' 102 when SG-H' 102 imitates P-VPMN1 106's CAMEL support at HPMN 104. However, since the present invention provides roaming services to prepaid outbound roamers without requiring any roaming profile for these roamers, SG-H' 102, in one embodiment of the present invention, removes CSI (i.e., roaming profile) from the ISD message, prior to relaying the ISD message to VMSC/VLR-V1 126. Additionally, adding the service key in the ISD message for HPMN 104's outbound prepaid roamers indicates P-VPMN1 106 operator that it needs to route the originating SCCP and call control messages of only those selected prepaid roamers (i.e. those subscribers with the service key marker) via SG-H' 102. Further, at step 314, VMSC/VLR-V1 126 returns an ISD-ACK message to SG-H' 102. Thereafter, at step 316, SG-H' 102 relays the ISD-ACK message to HLR-H 116 after changing the SCCP CgPA to SG-H'-VLR and the SCCP CdPA to HLR-H 116. At step 318, HLR-H 116 then sends LUP-ACK with CgPA as HLR-H 116 to SG-H' 102. Finally, at step 320, SG-H' 102 can relay the LUP-ACK message with CgPA changed to SG-H'-HLR and CdPA changed to real VLR-V1, to real VMSC/VLR-V1 126. Hence this whole process from steps 302 to 320 can allow prepaid subscriber 110 to register with P-VPMN1 106.

As mentioned earlier, HPMN 104 operator needs to ensure that prepaid subscriber 110 is billed correctly while roaming in P-VPMN1 106. In some countries, e.g., Taiwan, there is no distinction of location based charging for MO calls. This means that irrespective of where prepaid subscriber 110 is in HPMN 104 (assuming HPMN 104 is in Taiwan for this case), the charge for the MO call will remain same everywhere within HPMN 104. However for outbound prepaid roaming subscribers, HPMN 104 operator needs to charge differently for MO calls by outbound roamers depending on their actual calling location. In other countries, like China there is a distinction in charging of MO calls based on location of the subscribers. However, since HPMN 104 operator understands that prepaid subscriber 110 is in HPMN 104 (while actually prepaid subscriber 110 is roaming in P-VPMN1 106), an indication to charge prepaid subscriber 110's MO calls at the correct roaming rate is essential.

Also, as mentioned earlier, some networks (such as HPMNs and VPMNs) support CAMEL (or IN) protocol, some only ISUP protocol, and some both. As a result, for handling MO call prepaid charging, there can be many variations of MO call implementation depending on the capabilities of P-VPMN1 106 and HPMN 104. SG-H' 102 acts as a master protocol converter to deal with these different interface conversions. Furthermore, prepaid subscribers of HPMN 104 can use service node based solution, or SCP based solution, or both. SCP based and service node based solutions are used to charge MO calls by prepaid subscriber 110 based on their roaming location. These solutions are totally transparent to PPS-H 118, i.e., there is neither any direct interface with PPS-H 118 nor any changes are required in PPS-H 118 other than configuration changes in tariff tables of PPS-H 118.

Figure 4A:
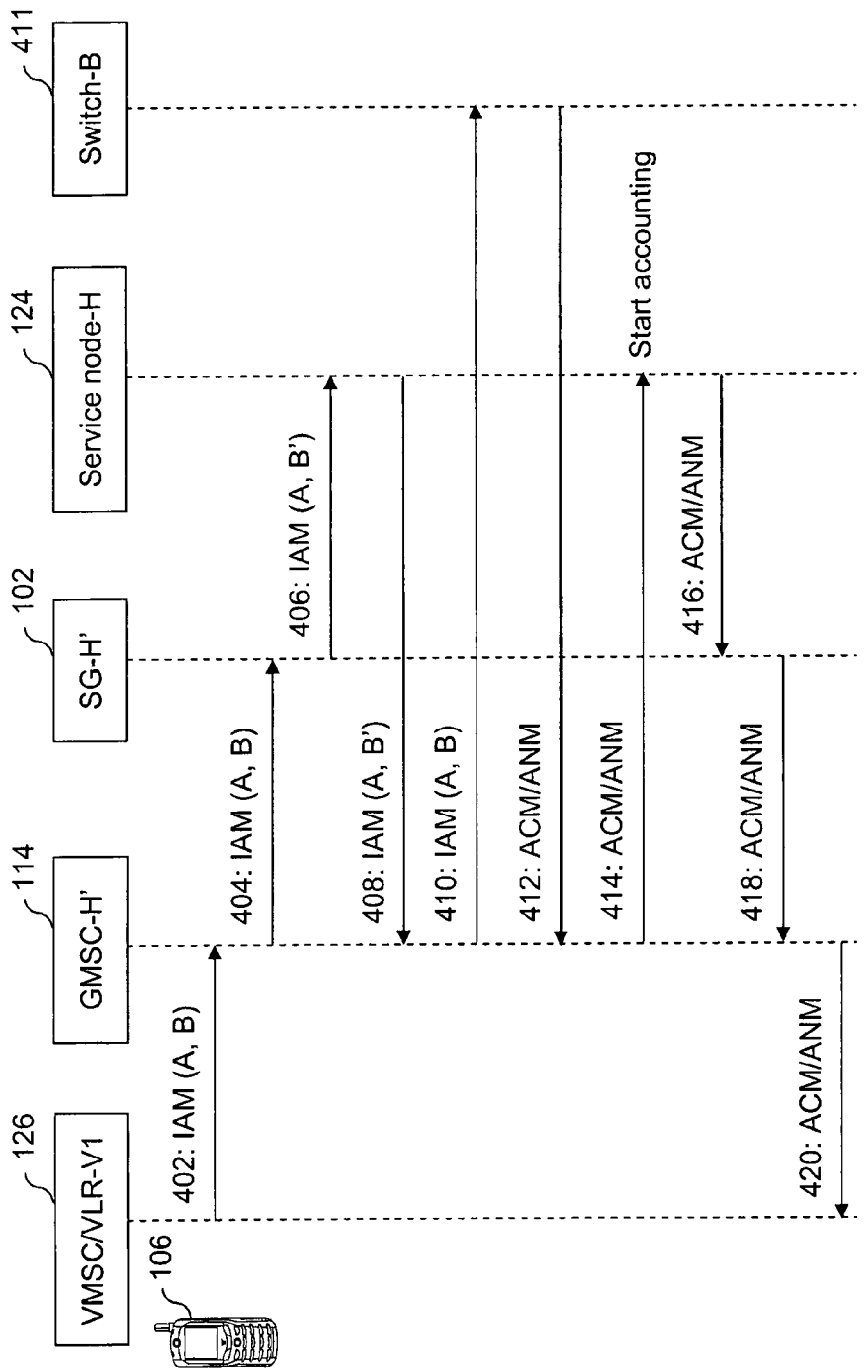
FIGS. 4A and 4B represent a flow diagram for enabling Mobile Originated (MO) call of the prepaid subscriber in the VPMN in case of service node based solution and without location based charging, in accordance with a first embodiment of the present invention.
Figure 4B:
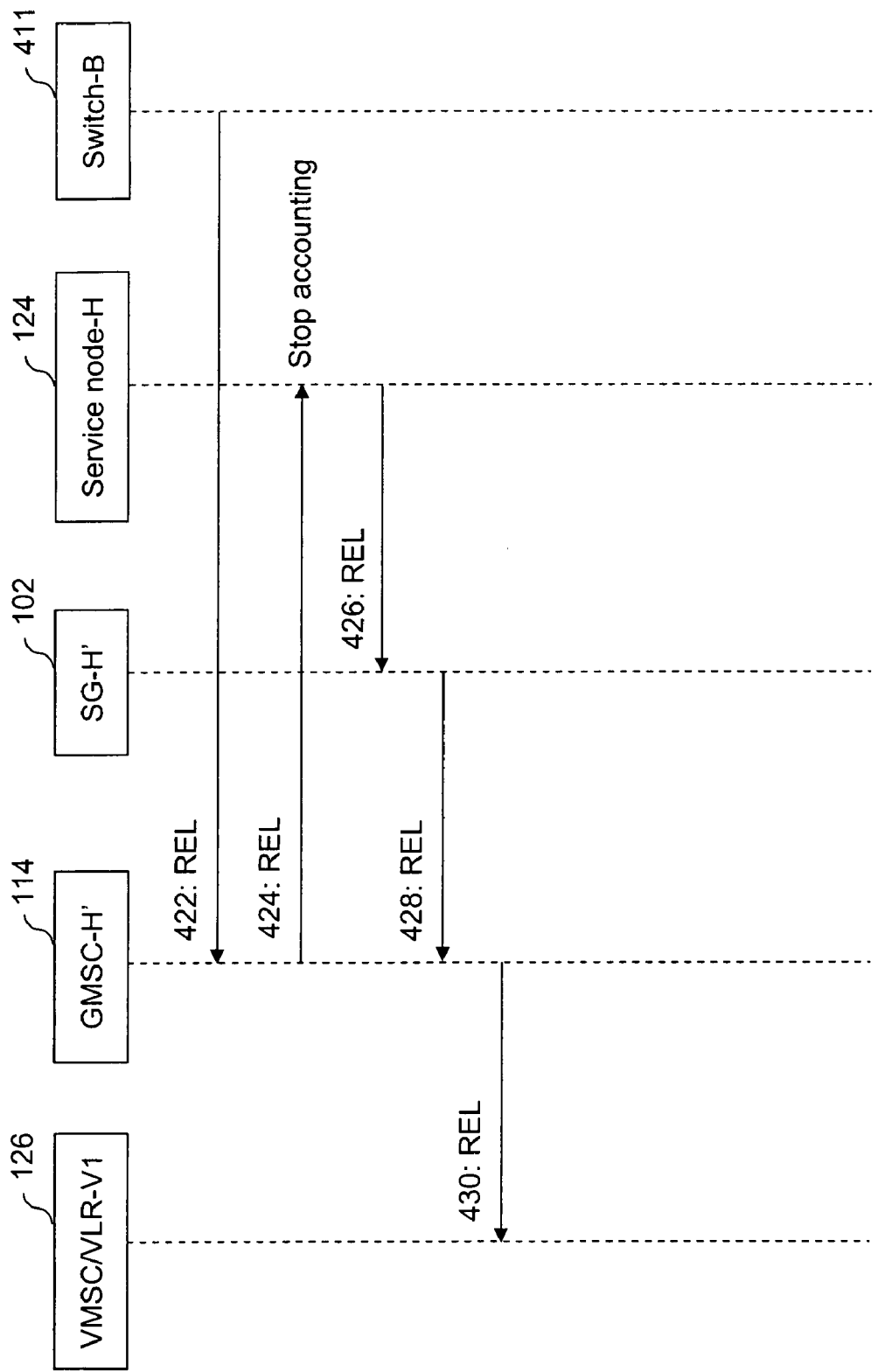

Now, we will consider various possible scenarios for MO call by prepaid subscriber 110 in P-VPMN1 106. FIGS. 4A and 4B represent a flow diagram for enabling MO call of prepaid subscriber 110 in P-VPMN1 106 in case of service node based solution and without location based charging, in accordance with a first embodiment of the present invention. Prepaid subscriber 110 (hereinafter interchangeably referred to as prepaid subscriber 'A') makes a call to a called party number (hereinafter interchangeably referred to as 'B' for MO calls) at VMSC/VLR-V1 126. Thus at step 402, VMSC/VLR-V 126 sends a call control signal, such as an ISUP IAM (A, B) to GMSC-H' 114. GMSC-H' 114 then routes the ISUP IAM (A, B) to SG-H' 102, at step 404. In an embodiment of the present invention, ISUP IAM (A, B) can be a loopback signaling. In another embodiment of the present invention, ISUP IAM (A, B) can be an ISUP trunk, in case SG-H' 102 has switching capability. Since in the first embodiment, both HPMN 104 and P-VPMN 1 106 support ISUP protocol, SG-H' 102 will not perform any protocol conversion. However, since in this case HPMN 104 does not support location-based charging, thus at step 406, SG-H' 102 modifies the format of the received ISUP signaling to an ISUP IAM (A, B'), and sends this modified ISUP signaling to service node-H 124 corresponding to calling prepaid subscriber A's number. B' corresponds to a first special number, in accordance with an embodiment of the present invention. HPMN 104 operator configures its service node-H 124 to define a tariff for prepaid subscriber 110's MO calls from P-VPMN1 106 by adding tariff for B'. In an embodiment of the present invention, when prepaid subscriber A calls B, service node-H 124 can check the tariff defined for B' and accordingly charges prepaid subscriber A. This allows HPMN 104 operator to charge prepaid subscriber A for MO calls at the actual roaming tariff SG-H' 102 uses different special numbers for different roaming networks or zones with corresponding tariff tables defined. In an embodiment of the present invention, SG-H' 102 can send the modified ISUP signaling to service node-H 124 with DPC as service node-H 124, using ISUP loopback via GMSC-H' 114.

Further at step 408, service node-H 124 routes the call IAM (A, B') back to GMSC-H' 114. In order to establish call from A to B (instead of B'), HPMN 104 operator (or hub 112 operator) configures GMSC-H' 114 to modify the received call IAM (A, B') to IAM (A, B). In an embodiment of the present invention, GMSC-H' 114 maintains a mapping between B and B'. Hence at step 410, GMSC-H' 114 establishes a call from A to B by sending call IAM (A, B) to a switch 411 associated with the called party number (hereinafter referred to as switch-B 411). Thereafter at steps 412 and 414, switch-B 411 sends an Address Completion Message (ACM)/Answer Message (ANM) signaling to service node-H 124 via GMSC-H' 114. Service node-H 124 starts deducting balance from prepaid subscriber A's prepaid account based on tariff table defined for B'. Further, at step 416, service node-H 124 relays the ACM/ANM signaling to SG-H' 102 for Call Detail Record (CDR) reconciliation purpose. This reconciliation allows HPMN 104 operator to compare the billing at SG-H' 102 with billing at service node-H 124, and hence determine any mismatch in charging prepaid subscriber 110. Thereafter, at steps 418 and 420, SG-H' 102 relays the ACM/ANM signaling to VMSC/VLR-V1 126 via GMSC-H' 114.

Once the call is established between A and B, the following are three cases for releasing the ongoing MO call:
1. Switch-B 411 releases the ongoing call, due to call disconnect by called party number 'B'.
2. GMSC-H' 114 (or SSP-H 122 or SG-H' 102 or VMSC/VLR-V1 126 or service node-H 124) releases the ongoing call due to call disconnect by prepaid subscriber A.
3. Service node-H 124 (or SCP-H 120) releases the ongoing call because balance of prepaid subscriber A is insufficient to continue the ongoing call.

At steps 422 and 424, switch-B 411 sends a Release (REL) message to service node-H 124 via GMSC-H' 114. This causes service node-H 124 to stop the deduction of balance from prepaid subscriber A's prepaid account. Thereafter, at step 426, service node-H 124 relays the REL message to SG-H' 102, which stops accounting for CDR reconciliation purpose. Finally, at steps 428 and 430, SG-H' 102 relays the REL message to VMSC/VLR-V1 126 via GMSC-H' 114.

Alternatively, in case HPMN 104 does support location-based charging, service node-H 124 performs the MO call charging based on tariff table defined for an Origination Point Code (OPC) of SG-H' 102 (instead of changing B to B') at service node-H 124. In this case, service node-H 124 uses SG-H' 102 point code to define roaming tariff for MO calls and thus no additional modification is required at SG-H' 102 for handling the billing of prepaid subscriber A. SG-H' 102 OPC corresponds to an address of SG-H' 102 being imitated at HPMN 104 as prepaid subscriber 110's current location. HPMN 104 operator defines a tariff at service node-H 124 for all SG-H' 102 point codes. These point codes can be defined for different roaming networks or zones. Moreover, in this case service node-H 124 (instead of GMSC-H' 114) communicates directly with switch-B 411 to establish and release the ongoing call from A to B. The rest of the call flow for prepaid subscriber A's MO call at VMSC/VLR-V1 126 is same as that explained earlier in conjunction with FIGS. 4A and 4B.

Figure 5A:
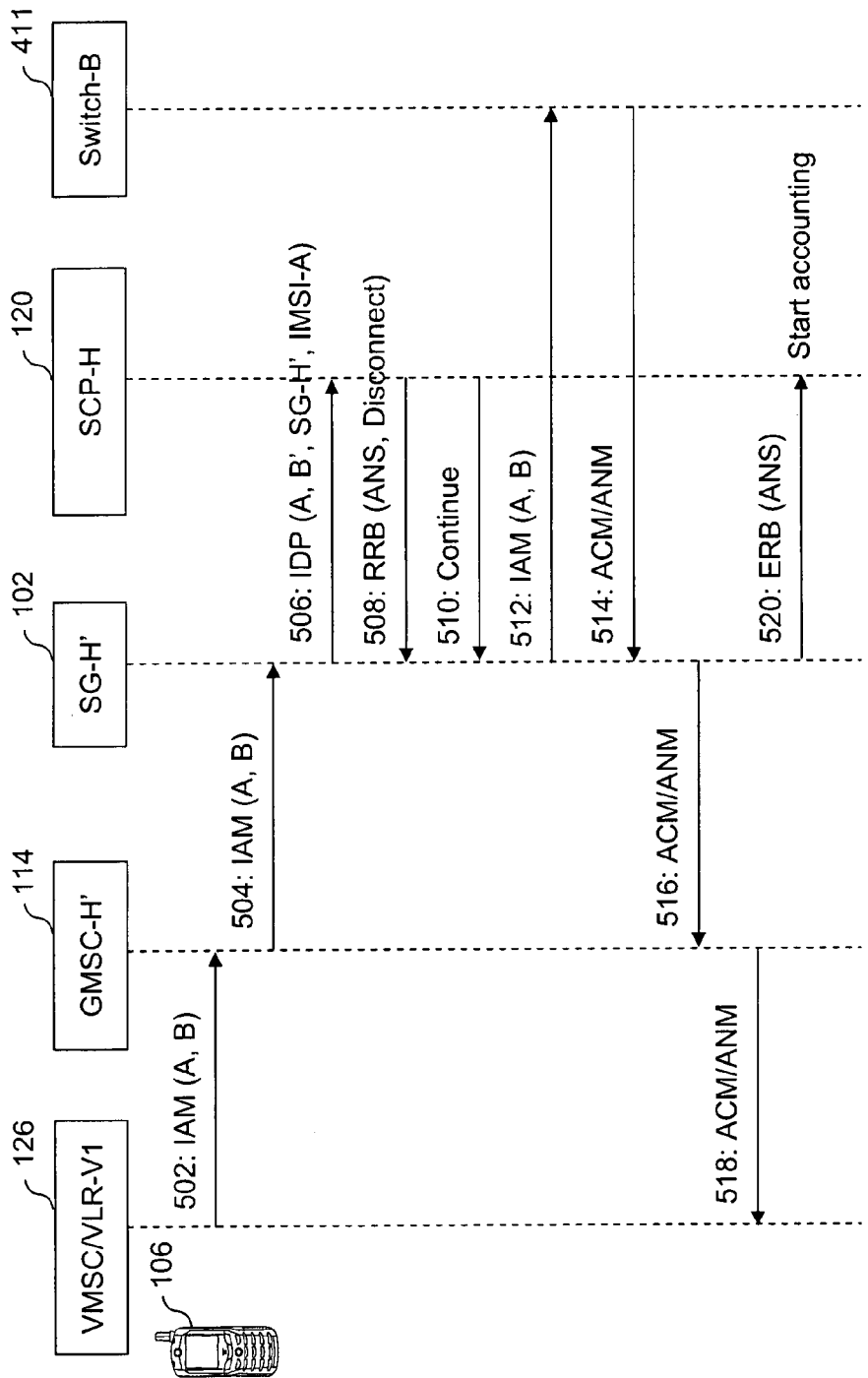
FIGS. 5A and 5B represent a flow diagram for enabling MO call of the prepaid subscriber in the VPMN in case of Signaling Control Point (SCP) based solution and without location based charging, in accordance with a second embodiment of the present invention.
Figure 5B:
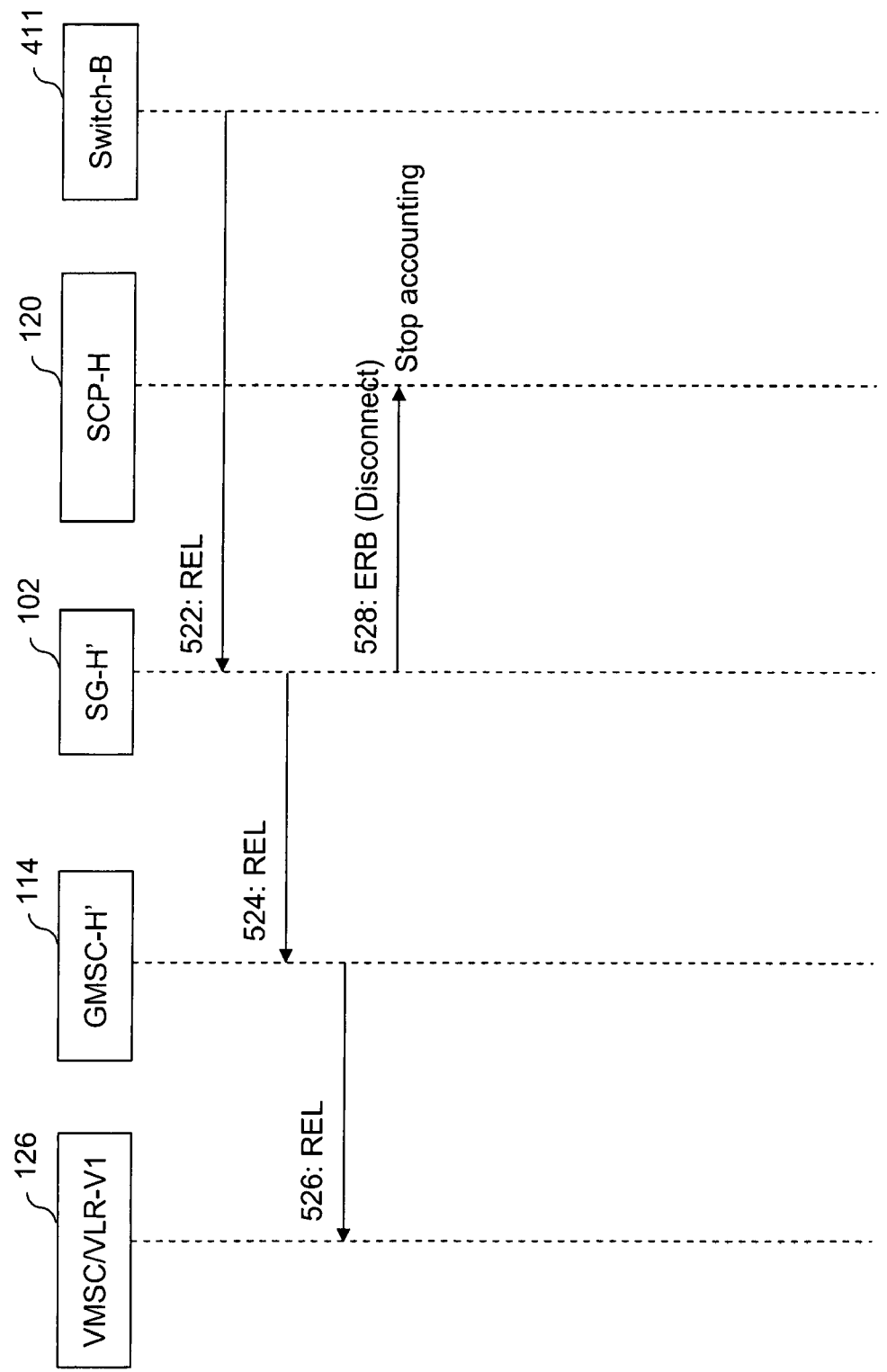

FIGS. 5A and 5B represent a flow diagram for enabling MO call of prepaid subscriber 110 in P-VPMN1 106 under an SCP-based solution and without location-based charging, in accordance with a further embodiment of the present invention. Prepaid subscriber A makes a call to B, at VMSC/VLR-V1 126, and at step 502, VMSC/VLR-V 126 sends ISUP IAM (A, B) to GMSC-H' 114. GMSC-H' 114 then routes the ISUP IAM (A, B) to SG-H' 102, at step 504. Since in this further embodiment, HPMN 104 supports CAMEL (or IN) protocol, whereas P-VPMN1 106 does not support CAMEL (or IN), SG-H' 102 needs to convert the protocol of received signaling messages into the format compatible with HPMN 104. Also, since in this case HPMN 104 does not support location-based charging, thus at step 506, SG-H' 102 converts the protocol of the received ISUP signaling to an IN IDP (A, B', SG-H', IMSI-A), and sends this modified IN signaling to SCP-H 120 corresponding to MSISDN-A or IMSI-A. HPMN 104 operator configures its SCP-H 120 to define a tariff for prepaid subscriber 110's MO calls from P-VPMN1 106 based on B', as done earlier in conjunction with FIGS. 4A and 4B at service node-H 124.

Further at step 508, SCP-H 120 sends a Request Report Basic call state model (RRB) request on answer and disconnect to SG-H' 102, in order to establish call from A to B'. In addition, at step 510, SCP-H 120 sends a Continue message to SG-H' 102 that indicates SG-H' 102 to continue with processing of the ongoing call. SG-H' 102 maps B' with B, and also converts the protocol of received signaling message (i.e., IN Continue signaling) into a format (i.e., ISUP since it is B's protocol) compatible with B's network. So at step 512, SG-H' 102 establishes a call from A to B by sending call IAM (A, B) to switch-B 411. Next, at step 514, switch-B 411 sends the ACM/ANM signaling message to SG-H' 102. SG-H' 102 can then start accounting for CDR reconciliation. SG-H' 102 then relays the ACM/ANM message to VMSC/VLR-V1 126, via GMSC-H' 114 at steps 516 and 518. When the ACM/ANM message is received by SG-H' 102, it issues an Event Report Basic call state model (ERB) on answer event to SCP-H 120, at step 520. SCP-H 120 starts deducting balance from prepaid subscriber A's prepaid account, based on tariff table defined for B'.

Once the call is established between A and B, one of the three cases where the switch in P-VPMN1 106, HPMN 104, or hub 112 disconnects the ongoing MO call (as explained earlier in conjunction with FIGS. 4A and 4B) will follow even in this case. Thereafter, at step 522, switch-B 411 sends the REL message to SG-H' 102. This causes SG-H' 102 to stop accounting for CDR reconciliation. Thereafter, at steps 524 and 526, SG-H' 102 relays the REL message to VMSC/VLR-V1 126 via GMSC-H' 114. Finally at step 528, SG-H' 102 issues ERB on disconnect event to SCP-H 120. This causes SCP-H 120 to stop the deduction of balance from prepaid subscriber A's prepaid account.

Alternatively, in case HPMN 104 supports location-based charging, SCP-H 120 performs the MO call charging based on tariff table defined for SG-H' GT (instead of changing B to B'). Protocol conversion performed at step 506 (i.e., when there is no location based charging) remains the same even in this case of location based charging. However in the present case, SCP-H 120 uses SG-H' GT to define roaming tariff for MO calls and thus no additional modification is required at SG-H' 102 for handling the billing of prepaid subscriber A. SG-H' GT corresponds to the address of SG-H' 102 being imitated at HPMN 104 as prepaid subscriber 110's current location. HPMN 104 operator defines a tariff at SCP-H 120 for all SG-H' 102 GTs. These GTs can be defined for different roaming networks or zones. The rest of the call flow in the present case of location-based charging follows steps 508 to 528, where call is established from SG-H' 102 to switch-B 411, SCP-H 120 bills prepaid subscriber 110, SG-H' 102 accounts for CDR reconciliation, and finally the ongoing call is released based on disconnect by switch-B 411.

Figure 6A:
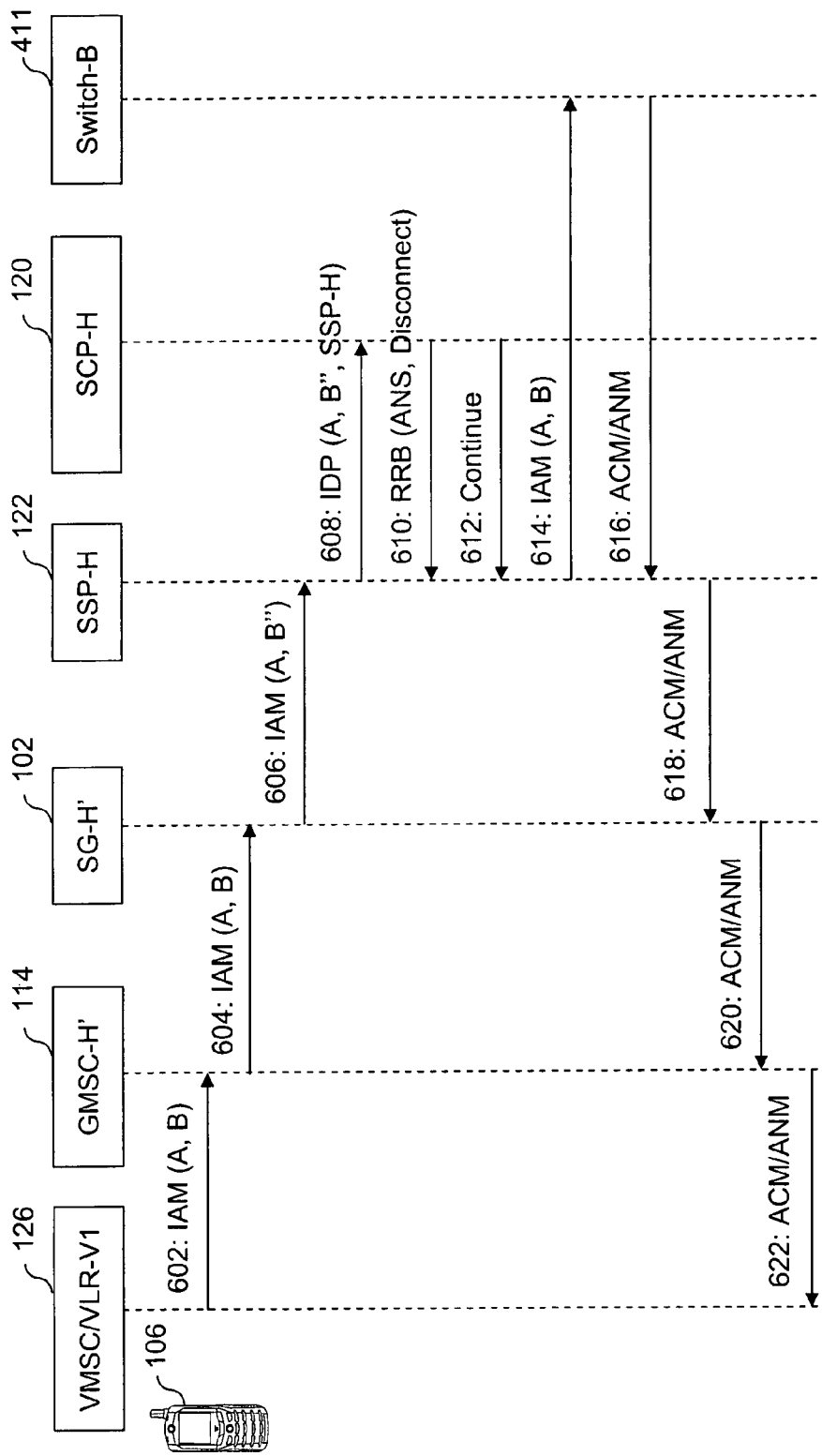
FIGS. 6A and 6B represent a flow diagram for enabling MO call of the prepaid subscriber in the VPMN in case of Service Switching Point (SSP)/SCP based solution, in accordance with a third embodiment of the present invention.
Figure 6B:
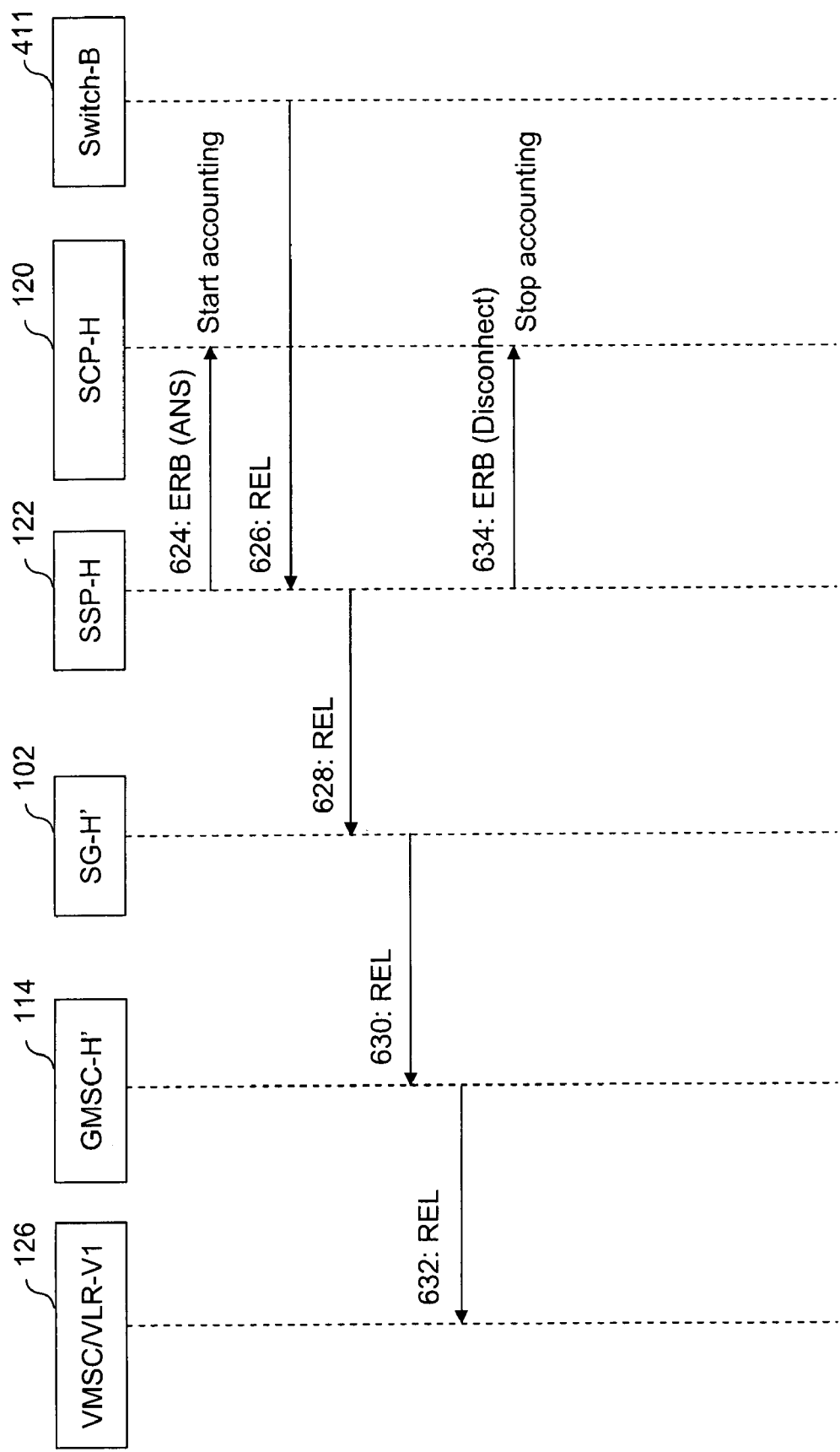

FIGS. 6A and 6B represent a flow diagram for enabling MO call of prepaid subscriber 110 in P-VPMN1 106 in case of SSP/SCP based solution, in accordance with yet a further embodiment of the present invention. In this embodiment, SSP-H 122 handles billing and enables mobile communication of prepaid subscriber 110 in P-VPMN1 106 when HPMN 104 supports IN protocol, however, P-VPMN1 106 does not support either IN protocol or IN agreement with HPMN 104. The prepaid subscriber A makes a call to B, and the call request ISUP IAM (A, B) reaches VMSC/VLR-V1 126. Thus at step 602, VMSC/VLR-V 126 sends ISUP IAM (A, B) to GMSC-H' 114. GMSC-H' 114 then routes the ISUP IAM (A, B) to SG-H' 102, at step 604. At step 606, SG-H' 102 converts the format of the received ISUP signaling to an ISUP IAM (A, B"), and sends this modified ISUP signaling to SSP-H 122 corresponding to MSISDN-A or IMSI-A. B" corresponds to a prefixed number (e.g., B is prefixed with some special number to make it B"), in accordance with an embodiment of the present invention. HPMN 104 operator configures its SCP-H 120 to define a tariff for prepaid subscriber 110's MO calls from P-VPMN1 106, based on B".

In an embodiment of the present invention, when prepaid subscriber A calls B, SCP-H 120 checks tariff defined for B" and accordingly charges prepaid subscriber 110. This allows HPMN 104 operator to charge prepaid subscriber 110 for the MO call at the actual roaming tariff. SG-H' 102 uses different prefixes for different roaming networks or zones with corresponding tariff tables defined. SSP-H 122 (instead of SG-H' 102) enables prepaid subscriber A's MO call in P-VPMN1 106 and bills prepaid subscriber A for same, when HPMN 104 supports CAMEL (or IN) protocol, while P-VPMN1 106 has no CAMEL (or IN) support/agreement with HPMN 104. Enabling mobile communication requires SSP-H 122 to convert the protocol of received signaling messages into the format compatible with HPMN 104, whereas managing billing of prepaid subscriber A in P-VPMN1 106 requires SSP-H 122 to indirectly interface with PPS-H 118 via SCP-H 120.

Hence, at step 608, SSP-H 122 converts the protocol of the received ISUP signaling (i.e., IAM (A, B")) to an IN IDP (A, B", SSP-H) signaling, and sends this modified signaling to SCP-H 120 corresponding to calling prepaid subscriber A's number (or MSISDN-A). In an embodiment of the present invention, SSP-H 122 performs this protocol conversion using an ISUP-IN converter coupled to SSP-H 122. Further at step 610, SCP-H 120 sends RRB request on answer and disconnect to SSP-H 122, in order to establish call from A to B". At step 612, SCP-H 120 sends the Continue message to SSP-H 122 that indicates SSP-H 122 to continue with the processing of the ongoing call. SSP-H 122 maps B" with B, and converts the protocol of received signaling message (i.e., IN Continue signaling) into a format (ISUP since it is B's protocol) compatible with B's network. Hence upon receiving the Continue message, SSP-H 122 routes ISUP IAM (A, B) towards switch-B 411, at step 614. In an embodiment of the present invention, HPMN 104 operator configures SSP-H 122 to remove the prefix from B" to obtain B (or maps B" with B).

Thereafter, at steps 616 and 618, switch-B 411 sends the ACM/ANM signaling message to SG-H' 102 via SSP-H 122. SG-H' 102 can then start accounting for CDR reconciliation purpose. SG-H' 102 then relays the ACM/ANM message to VMSC/VLR-V1 126, via GMSC-H' 114 at steps 620 and 622. In addition, when SSP-H 122 receives the ACM/ANM message, it issues the ERB on answer event to SCP-H 120, at step 624. SCP-H 120 starts deducting balance from prepaid subscriber A's prepaid account, based on tariff table defined for B".

Once the call is established between A and B, one of the three cases where the switch in P-VPMN1 106, HPMN 104, or hub 112 disconnects the ongoing MO call will follow even in this case. At steps 626 and 628, switch-B 411 sends the REL message to SG-H' 102 via SSP-H 122. This causes SG-H' 102 to stop accounting for CDR reconciliation purpose. Thereafter, at steps 630 and 632, SG-H' 102 relays the REL message to VMSC/VLR-V1 126 via GMSC-H' 114. Finally at step 634, SSP-H 122 issues ERB on disconnect event to SCP-H 120. This causes SCP-H 120 to stop the deduction of balance from prepaid subscriber A's prepaid account.

Figure 7A:
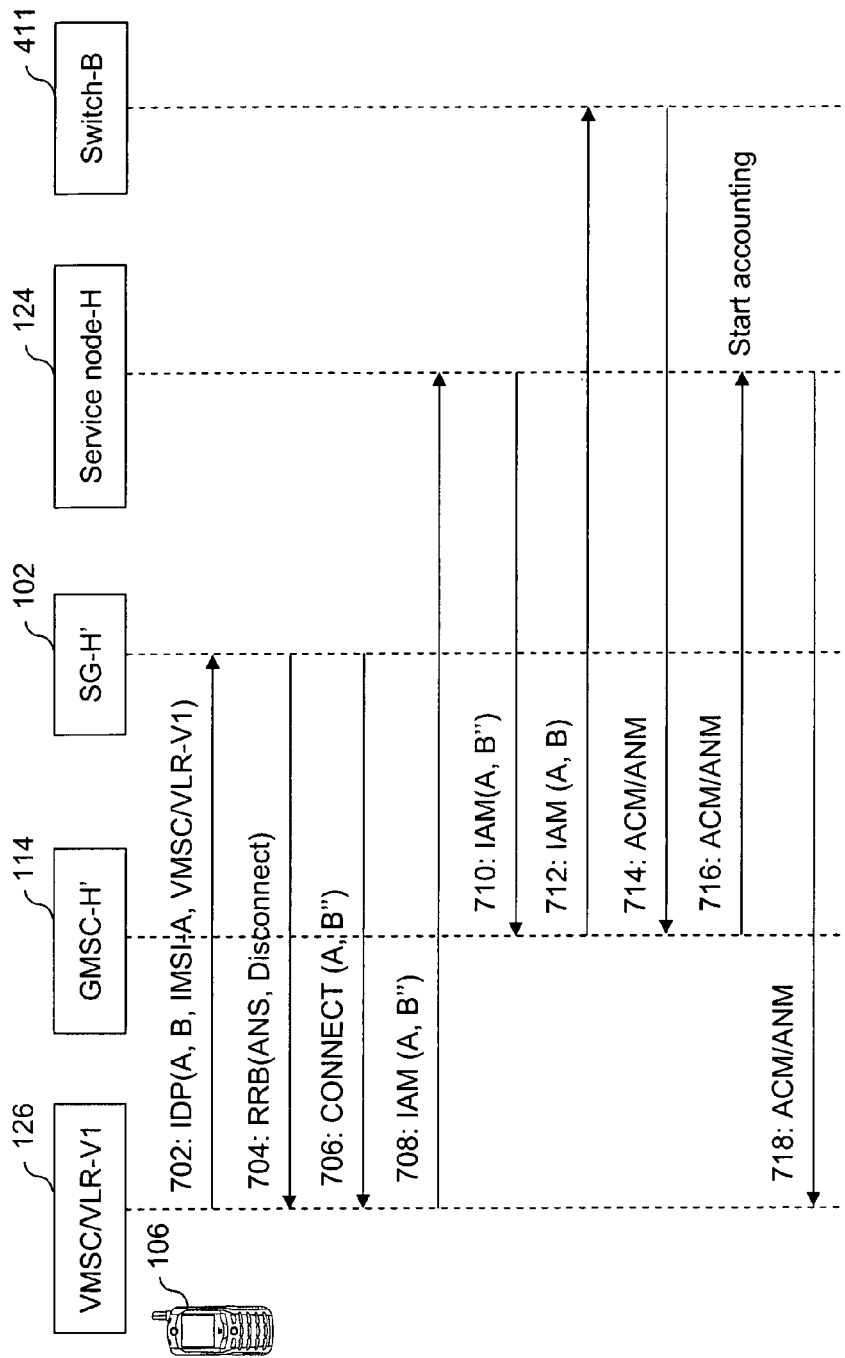
FIGS. 7A and 7B represent a flow diagram for enabling MO call of the prepaid subscriber in the VPMN in case of service node based solution with Intelligent Network (IN) interface between the SG and a Visited Mobile Switching Center (VMSC) associated with the VPMN, in accordance with a fourth embodiment of the present invention.
Figure 7B:
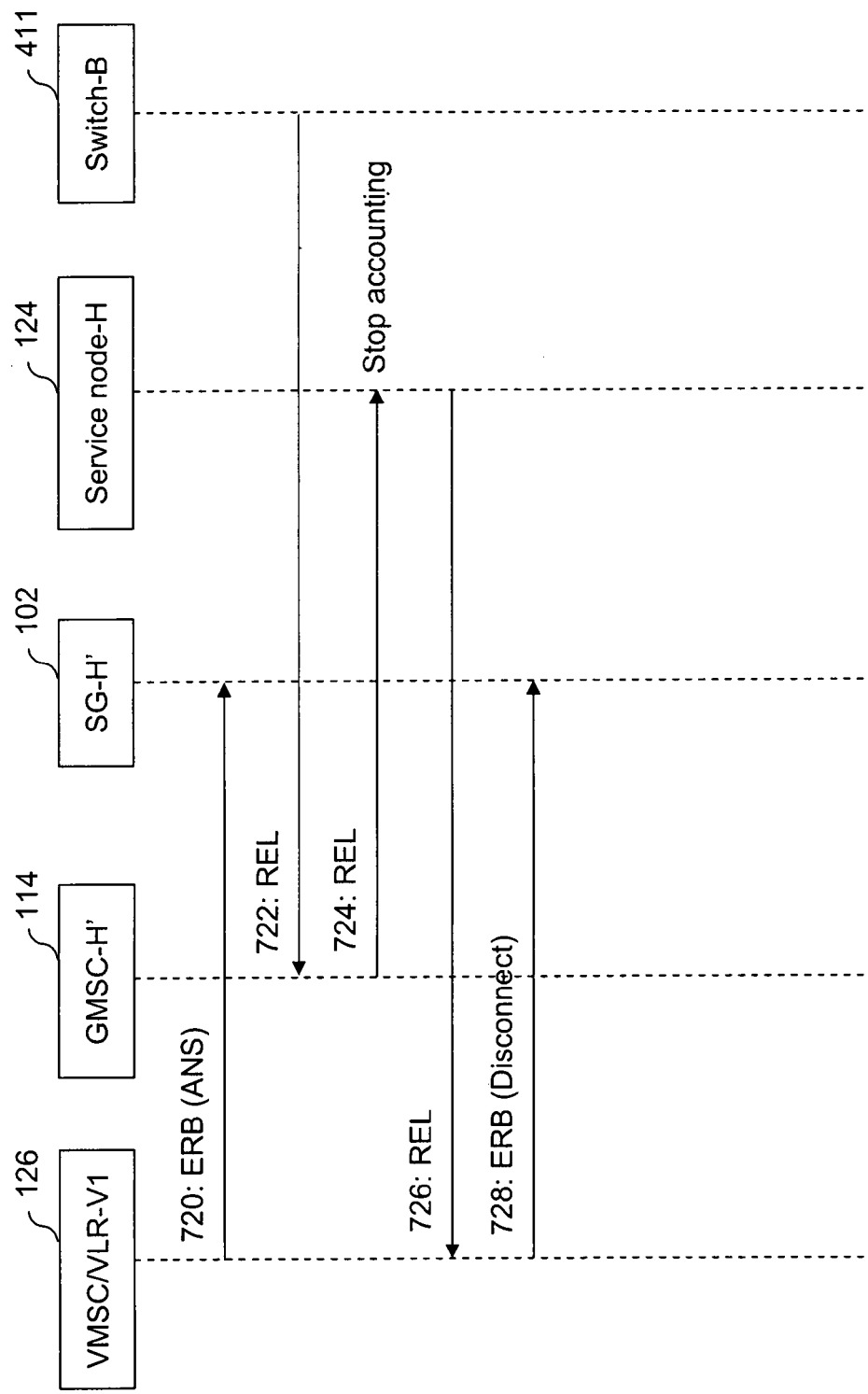

In the preceding embodiments of MO call flows, we have assumed ISUP interfaces between VMSC/VLR-V1 126 and GMSC-H' 114. FIGS. 7A and 7B represent a flow diagram for enabling MO call of prepaid subscriber 110 in P-VPMN1 106 in case of service node based solution with IN interface between SG-H' 102 and VMSC/VLR-V1 126, in accordance with a fourth embodiment of the present invention. In this embodiment, P-VPMN1 106 operator deploys the ISUP-IN converter at VMSC/VLR-V1 126. Prepaid subscriber A initiates a call to B at VMSC/VLR-V1 126, and thus at step 702, VMSC/VLR-V1 126 sends an IN call control signal, such as IDP (A, B, IMSI-A, VMSC/VLR-V1) to SG-H' 102 using IN interface between these network elements. SG-H' 102 issues IN RRB on answer and disconnect to VMSC/VLR-V1126, at step 704.

Additionally, at step 706, SG-H' 102 issues an IN CONNECT (A, B") to VMSC/VLR-V1 126. VMSC/VLR-V1 126 converts the IN signaling to ISUP signaling using the ISUP-IN converter. Hence at step 708, VMSC/VLR-V1 126 sends a call control request ISUP IAM (A, B") to service node-H 124, which relays this call control request to GMSC-H' 114 at step 710. The operator of HPMN 104 (or hub 112 operator) configures GMSC-H' 114 to modify the received call control request IAM (A, B") to IAM (A, B). Hence at step 712, GMSC-H' 114 establishes a call from A to B by sending the call IAM (A, B) to switch-B 411. Thereafter at steps 714 and 716, switch-B 411 sends the ACM/ANM signaling to GMSC-H' 114, which relays this signaling to service node-H 124. Service node-H 124 starts deducting balance from prepaid subscriber A's prepaid account, based on tariff table defined for B". Further at step 718, service node-H 124 relays the ACM/ANM signaling to VMSC/VLR-V1 126. VMSC/VLR-V1 126 again converts the protocol of ISUP ACM/ANM signaling to IN ERB (ANS) signaling using ISUP-IN converter, and sends the converted signaling to SG-H' 102 for CDR reconciliation purpose at step 720.

When a called party disconnects a call, switch-B 411 sends the REL message to GMSC-H' 114, at step 722. GMSC-H' 114 then relays this message to service node-H 124, at step 724. This causes service node-H 124 to stop deduction of balance from prepaid subscriber A's prepaid account. Thereafter, at step 726, service node-H 124 relays the REL message to VMSC/VLR-V1 126. At step 728, VMSC/VLR-V1 126 converts the protocol of ISUP REL signaling to IN ERB signaling on disconnect event, and sends the converted signaling to SG-H' 102. Finally, SG-H' 102 stops accounting for CDR reconciliation purpose.

Figure 8A:
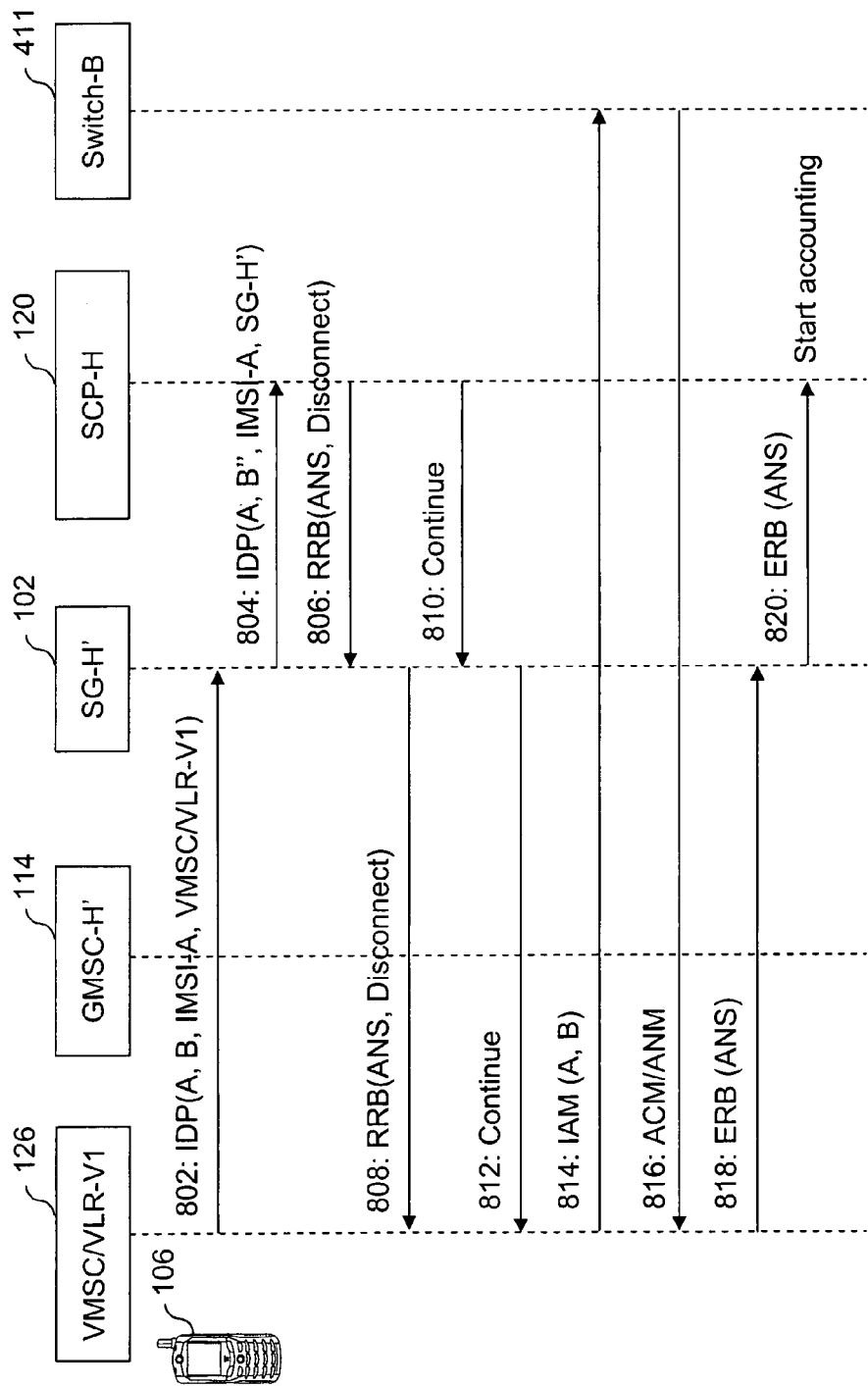
FIGS. 8A and 8B represent a flow diagram for enabling MO call of the prepaid subscriber in the VPMN in case of SCP based solution with IN interface between the SG and the VMSC, in accordance with a fifth embodiment of the present invention.
Figure 8B:
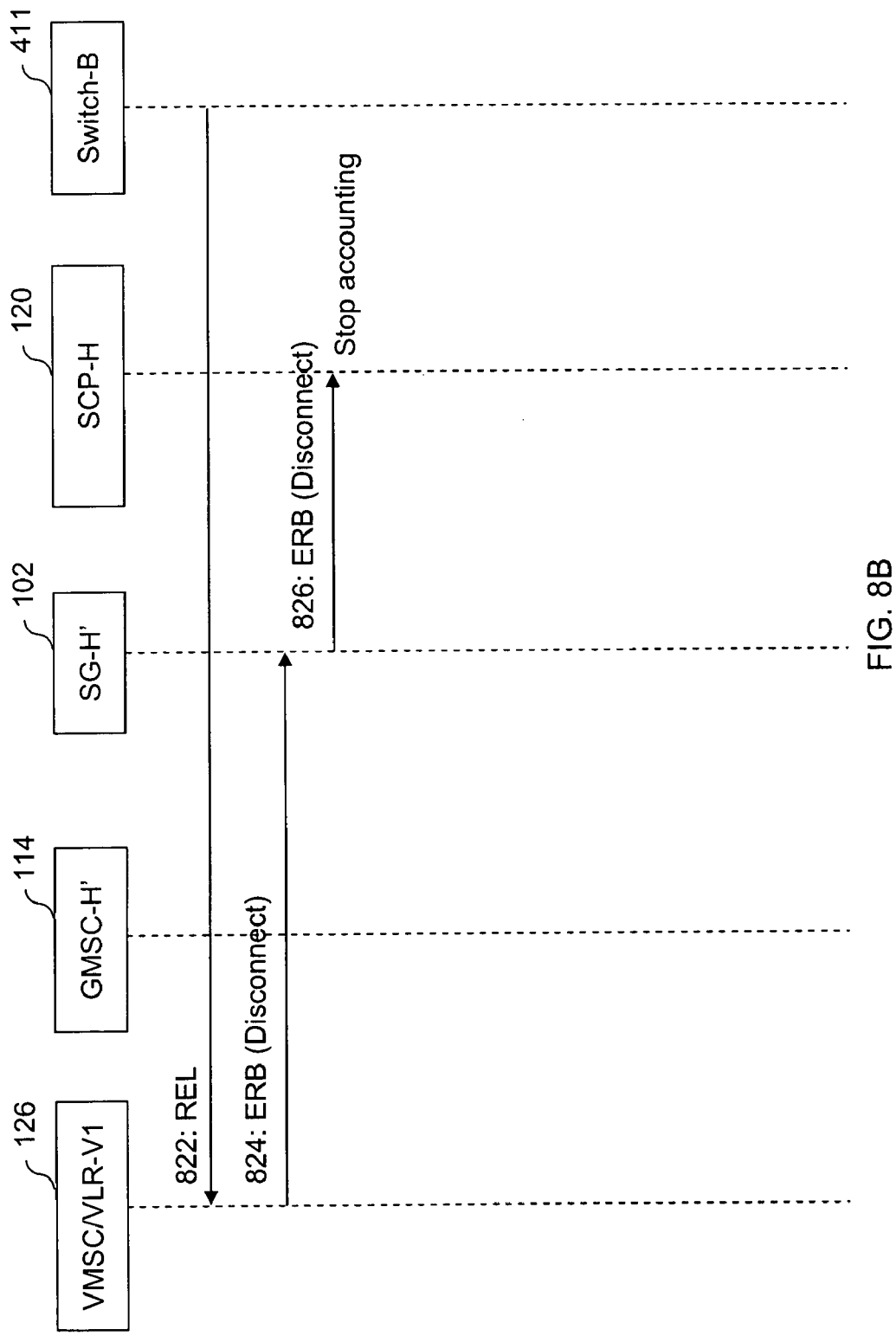

FIGS. 8A and 8B represent a flow diagram for enabling MO call of prepaid subscriber 110 in P-VPMN1 106 in case of SCP based solution with IN interface between SG-H' 102 and VMSC/VLR-V1 126, under yet a further embodiment of the present invention. P-VPMN1 106 operator deploys the ISUP-IN converter at VMSC/VLR-V1 126 as done in FIGS. 7A and 7B. The prepaid subscriber A initiates a call to B at VMSC/VLR-V1 126 and thus at step 802, VMSC/VLR-V1 126 sends an IN call control signal, such as IDP (A, B, IMSI-A, VMSC/VLR-V1) to SG-H' 102 using IN interface.

Thereafter at step 804, SG-H' 102 modifies the format of the received IN signaling to an IN IDP (A, B", IMSI-A, SG-H'), and sends this modified IN signaling to SCP-H 120 corresponding to MSISDN-A.

At step 806, SCP-H 120 issues IN RRB on answer and disconnect to SG-H' 102. SG-H' 102 then relays this RRB signaling to VMSC/VLR-V1 126, at step 808. Further, at step 810, SCP-H 120 issues the Continue message to SG-H' 102. Thereafter, at step 812, SG-H' 102 relays the received message to VMSC/VLR-V1 126. VMSC/VLR-V1 126 converts the protocol of IN signaling to ISUP signaling using the ISUP-IN converter. Hence at step 814, VMSC/VLR-V1 126 sends the call IAM (A, B) to switch-B 411. Thereafter at step 816, switch-B 411 sends the ISUP ACM/ANM signaling to VMSC/VLR-V1 126. At step 818, VMSC/VLR-V1 126 converts the protocol of received ISUP signaling to IN ERB (ANS) signaling using the ISUP-IN converter, and then sends the modified signaling to SG-H' 102. SG-H' 102 starts accounting for CDR reconciliation. SG-H' 102 then relays the received ERB (ANS) signaling to SCP-H 120, at step 820. SCP-H 120 starts deducting balance from prepaid subscriber A's prepaid account, based on tariff table defined for B".

When B party disconnects the ongoing call, at step 822, switch-B 411 sends the ISUP REL message to VMSC/VLR-V1 126. VMSC/VLR-V1 126 then converts the protocol of received ISUP message to IN ERB (Disconnect) message, and sends this IN message to SG-H' 102, at step 824. SG-H' 102 stops accounting for CDR reconciliation. Finally at step 826, SG-H' 102 relays the ERB (Disconnect) message to SCP-H 120. This causes SCP-H 120 to stop the deduction of balance from prepaid subscriber A's prepaid account.

Usually, in many countries, MT calls to prepaid subscribers are not charged when prepaid subscribers are at HPMN network. In accordance with an embodiment of the present invention, when SG-H' 102 fakes at HLR-H 116 that prepaid subscriber 110's is in HPMN 104 (while actually prepaid subscriber 110 is roaming in P-VPMN1 106), there is usually no interface to PPS-H 118 for MT calls to prepaid subscriber 110. Hence in order to support prepaid roaming and manage billing correctly, HPMN 104 operator needs to recover the cost of terminating an MT call to prepaid subscriber 110's number when he is roaming in P-VPMN1 106.

Also, in some countries, MT calls to prepaid subscribers are charged at a flat rate independent of the prepaid subscribers' location within the HPMN network. However, in accordance with an embodiment of the present invention, in order to provide roaming services to prepaid subscribers, HPMN 104 operator needs to correctly charge prepaid subscribers for MT calls to their numbers when they are roaming in P-VPMN1 106, based on the roaming location in P-VPMN1 106.

Similar to MO calls, various embodiments of the present invention provide service-node-based and SCP-based solutions to handle outbound prepaid subscribers and charge MT calls to these subscribers based on their roaming location. Even the MT call flows (like MO call) are totally transparent to PPS-H 118, i.e., there is neither any direct interface with PPS-H 118 nor any changes required in PPS-H 118 other than configuration changes in tariff tables of PPS-H 118.

Figure 9A:
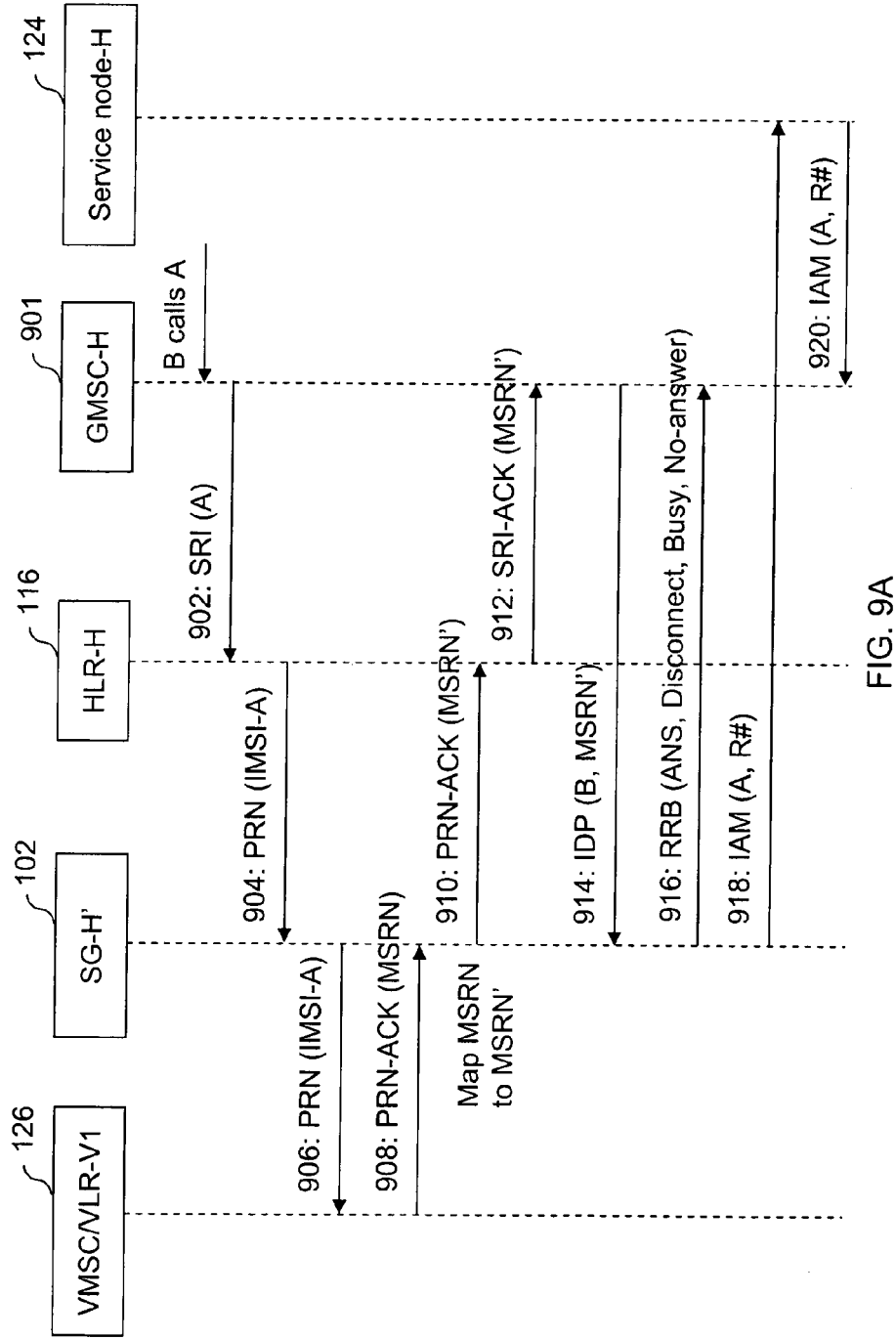
FIGS. 9A, 9B, and 9C represent a flow diagram for handling Mobile Terminated (MT) call to the prepaid subscriber in the VPMN, in case of service node based solution and when there is an IN/ISUP interface between a Gateway Mobile Switching Center (GMSC) associated with the HPMN and the SG, in accordance with a first embodiment of the present invention.
Figure 9B:
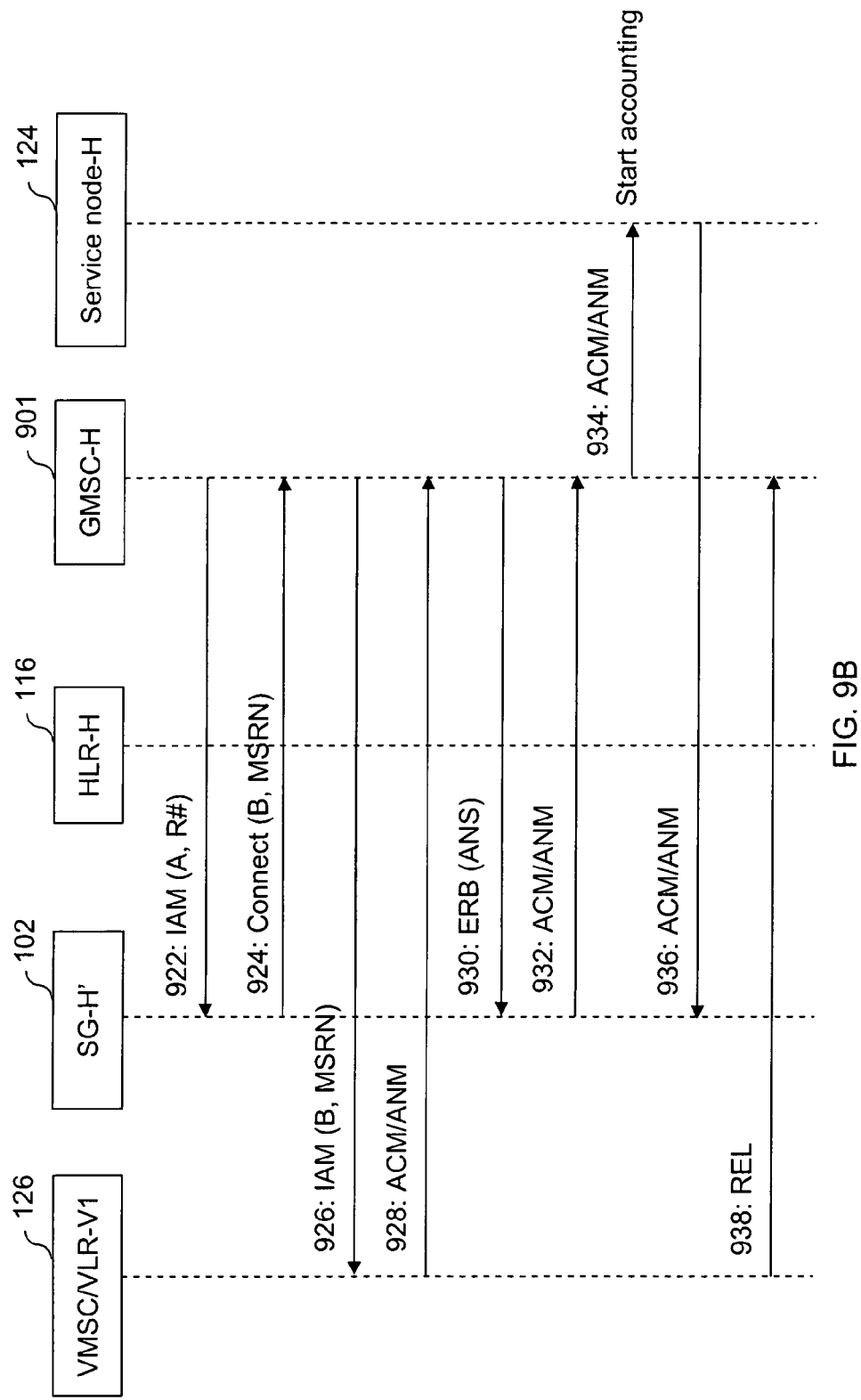
Figure 9C:
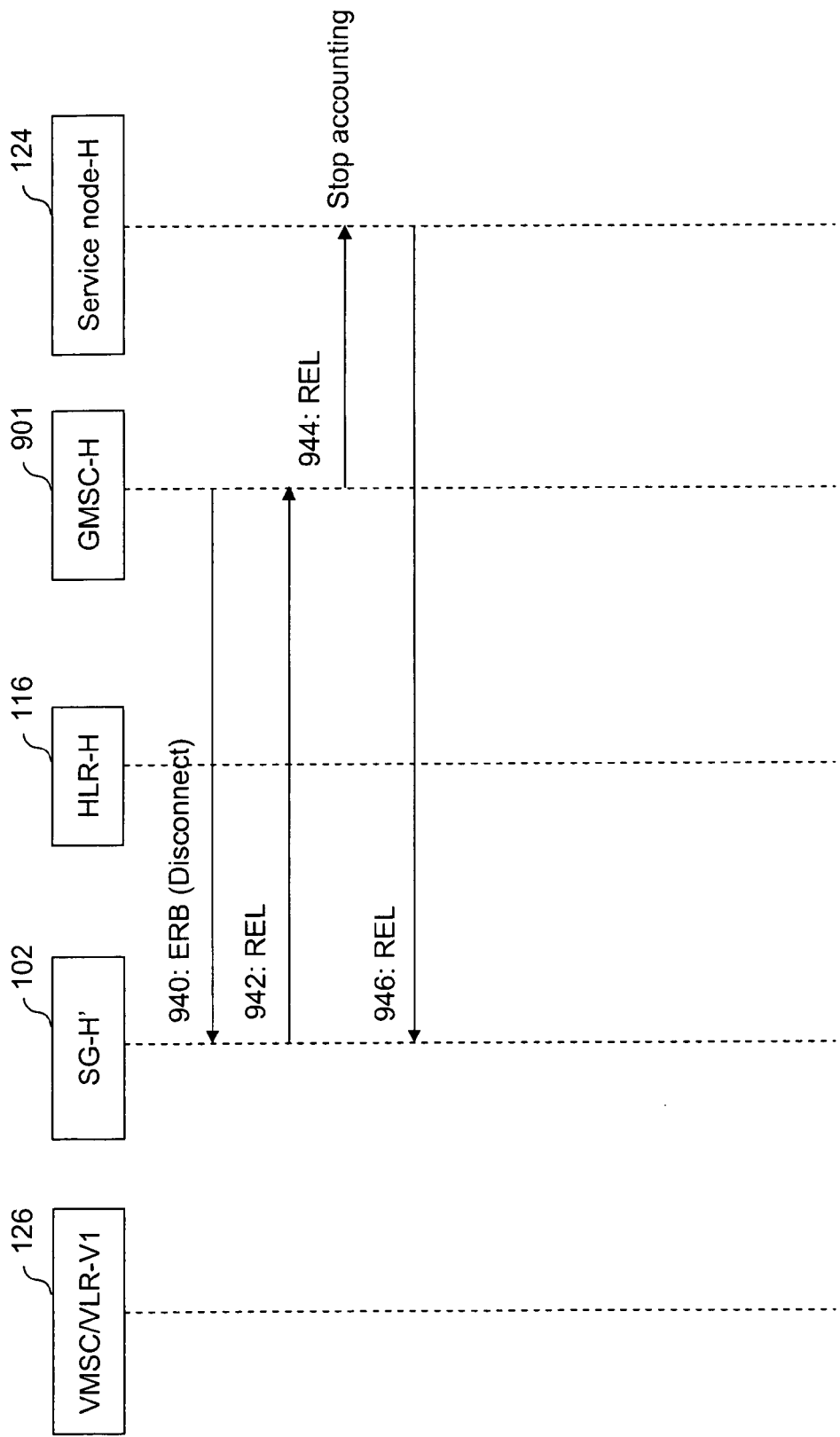

Various possible scenarios for MT call to prepaid subscriber 110 in P-VPMN1 106 are now described. FIGS. 9A, 9B, and 9C represent a flow diagram for handling MT call to prepaid subscriber 110 in P-VPMN1 106, in the case of a service-node-based solution and when SG-H' 102 has both an IN and an ISUP interface (hereinafter interchangeably referred to as IN/ISUP interface) with a GMSC-H 901, in accordance with an embodiment of the present invention. B (i.e., the calling party in case of MT calls) makes a call to prepaid subscriber A, hence, at step 902 GMSC-H 901 sends a routing request, such as a Send Routing Information (SRI) query on prepaid subscriber A to HLR-H 116. Thereafter, at steps 904 and 906, HLR-H 116 issues a roaming number request, such as a Provide Roaming Number (PRN) on the IMSI-A to VMSC/VLR-V1 126 via SG-H' 102, since SG-H' is the VLR location of prepaid subscriber A at HLR-H 116. At step 908, VMSC/VLR-V1 126 returns a roaming number, such as a Mobile Station Roaming Number (MSRN) in an acknowledgement message, such as a PRN-ACK to SG-H' 102.

Further at step 910, SG-H' 102 modifies the MSRN to a new roaming number, such as an MSRN', and issues PRN-ACK with the MSRN' to HLR-H 116. In an embodiment of the present invention, SG-H' 102 stores a mapping of MSRN and MSRN'. In one embodiment of the present invention, the MSRN' is a number of special range. In yet another embodiment of the present invention, the MSRN' is a special prefixed number. Thereafter, at step 912, HLR-H 116 returns an SRI-ACK with MSRN' to GMSC-H 901.

In an embodiment of the present invention, when GMSC-H 901 interfaces with SG-H' 102 via the IN interface, GMSC-H 901 is armed with an IN trigger (e.g., Detection Point (DP) 3). Hence at step 914, GMSC-H 901 establishes a call from B to MSRN' by sending an IN IDP (B, MSRN') signaling to SG-H' 102. It will be apparent to a person skilled in the art that HPMN 104 operator may also use a terminating trigger (e.g., DP12 or CAMEL T-CSI); however, DP3 is a preferred trigger due to its cost advantage over DP12. In another embodiment of the present invention, when GMSC-H 901 interfaces with SG-H' 102 via the ISUP interface, GMSC-H 901 sends an ISUP signaling (including loopback) on the MSRN' to SG-H' 102.

Upon receiving IDP (B, MSRN') signaling, SG-H' 102 issues an RRB (ANS, Disconnect, Busy, No-answer) to GMSC-H 901, at step 916. Since there is either no MT call charging at all or no MT call charging based on prepaid subscriber A's location, SG-H' 102 makes a separate fake MO call (hereinafter interchangeably referred to as first fake call) on subscriber A's number behalf so to charge prepaid subscriber A according to his roaming location, in accordance with an embodiment of the present invention. Hence at step 918, SG-H' 102 establishes the fake ISUP call from prepaid subscriber A's number to a second special number, such as R# corresponding to prepaid subscriber 110's actual location in P-VPMN1 106, towards service node-H 124. In an embodiment of the present invention, HPMN 104 operator configures service node-H 124 to define tariff for prepaid subscriber 110's MT call, based on R#. Thus service node-H 124 can charge prepaid subscriber A's prepaid account based on R#. Different R# can be used to define different roaming tariffs for different networks or zones in the networks.

At steps 920 and 922, service node-H 124 relays ISUP IAM (A, R#) to SG-H' 102 via GMSC-H 901. Next, at step 924, SG-H' 102 issues an IN Connect (B, MSRN) signaling to GMSC-H 901 (in order to complete the MT call from B to A on A's MSRN). GMSC-H 901 converts the protocol of received IN signaling to ISUP IAM (B, MSRN) signaling, and issues the converted signaling to VMSC/VLR-V1 126, at step 926. In an embodiment of the present invention, HPMN 104 operator uses the ISUP-IN converter to perform this conversion. Further at step 928, GMSC-H 901 receives the ISUP ACM/ANM signaling from VMSC/VLR-V1 126. Thereafter, GMSC-H 901 converts the protocol of received ISUP signaling to IN ERB (ANS), and sends the converted signaling to SG-H' 102, at step 930. Thereafter, at steps 932 and 934, SG-H' 102 issues the ISUP ACM/ANM signaling to service node-H 124, via GMSC-H 901 for the first fake call. At step 936, service node-H 124 issues the ISUP ACM/ANM signaling back to SG-H' 102 and starts accounting and deducting balance from prepaid subscriber A's prepaid account, based on tariff table defined for R#.

Once the call is established between A and B, here are three cases for releasing the ongoing MT call:
1. The called party's switch (i.e., VMSC/VLR-V1 126) releases the ongoing call due to disconnect by prepaid subscriber A.
2. Service node-H 124 (or SCP-H 120) releases the ongoing call because balance of called party (i.e., prepaid subscriber A in this case) is insufficient to continue the ongoing call.
3. GMSC-H 901 releases the ongoing call because the calling party (i.e., B party) disconnects the call.

Hence at step 938, VMSC/VLR-V1 126 sends the ISUP REL message to GMSC-H 901. GMSC-H 901 then converts the protocol of received ISUP signaling message to IN ERB (Disconnect) signaling, and then sends this converted IN signaling to SG-H' 102, at step 940. SG-H' 102 stops accounting for CDR reconciliation purpose upon receiving this signaling. Further at steps 942 and 944, SG-H' 102 issues the REL message to service node-H 124 via GMSC-H 901. This causes service node-H 124 to stop the deduction of balance from prepaid subscriber A's prepaid account. Finally, at step 946, service node-H 124 issues the ISUP REL message back to SG-H' 102.

Alternatively, in case GMSC-H 901 and SG-H' 102 has only ISUP interface with each other, then all IN signaling messages exchanged between GMSC-H 901 and SG-H' 102 in FIGS. 9A, 9B, and 9C are replaced with corresponding ISUP signaling messages. For example, IN signaling messages, such as IDP (B, MSRN') and ERB (Disconnect) are replaced with corresponding ISUP signaling messages, such as IAM (B, MSRN') and REL, respectively. Rest of the call flow for MT call to prepaid subscriber A is same as that explained in FIGS. 9A, 9B, and 9C.

Figure 10A:
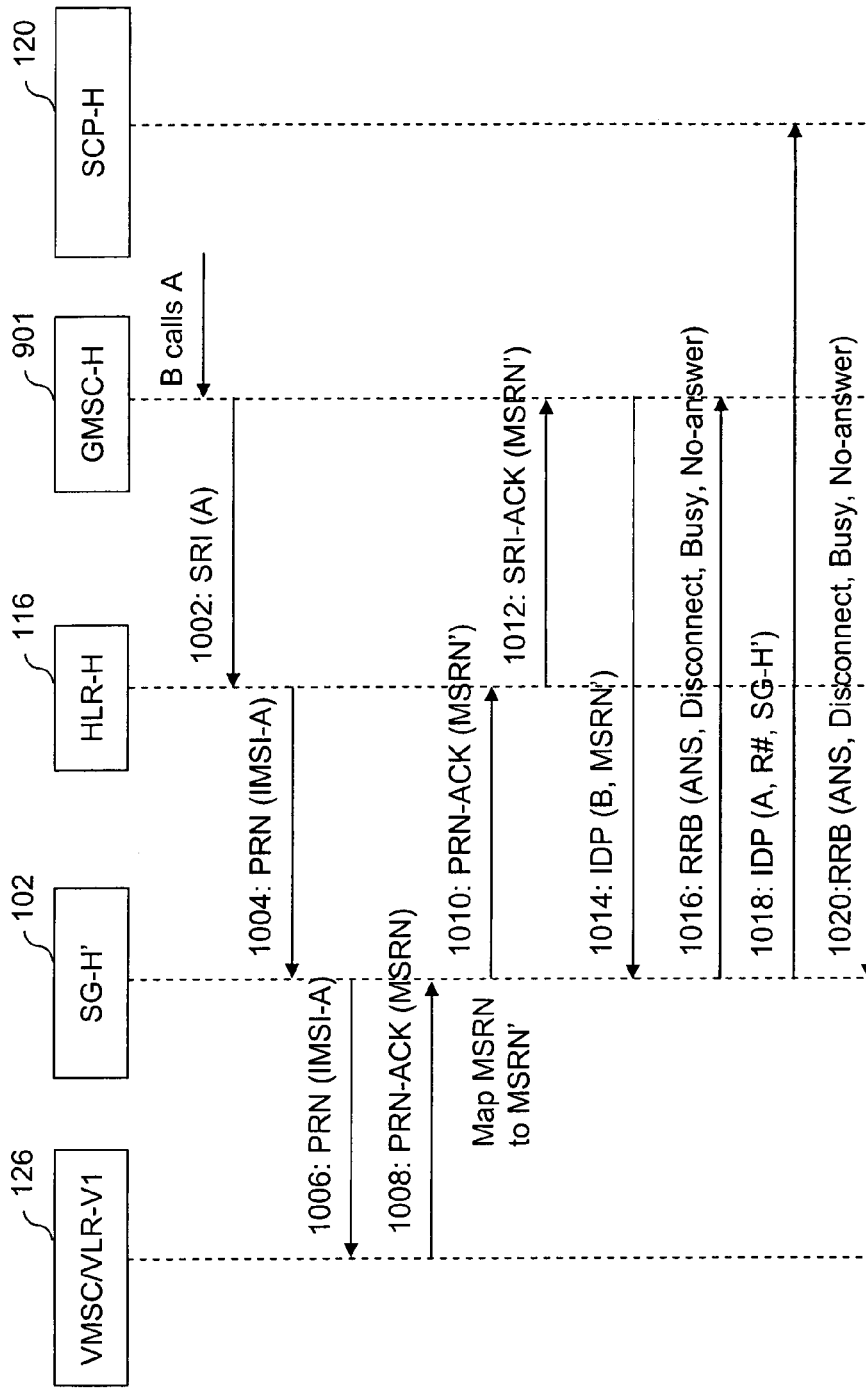
FIGS. 10A and 10B represent a flow diagram for handling MT call to the prepaid subscriber in the VPMN, in case of SCP based solution and when there is an IN/ISUP interface between the HPMN GMSC and the SG, in accordance with a second embodiment of the present invention.
Figure 10B:
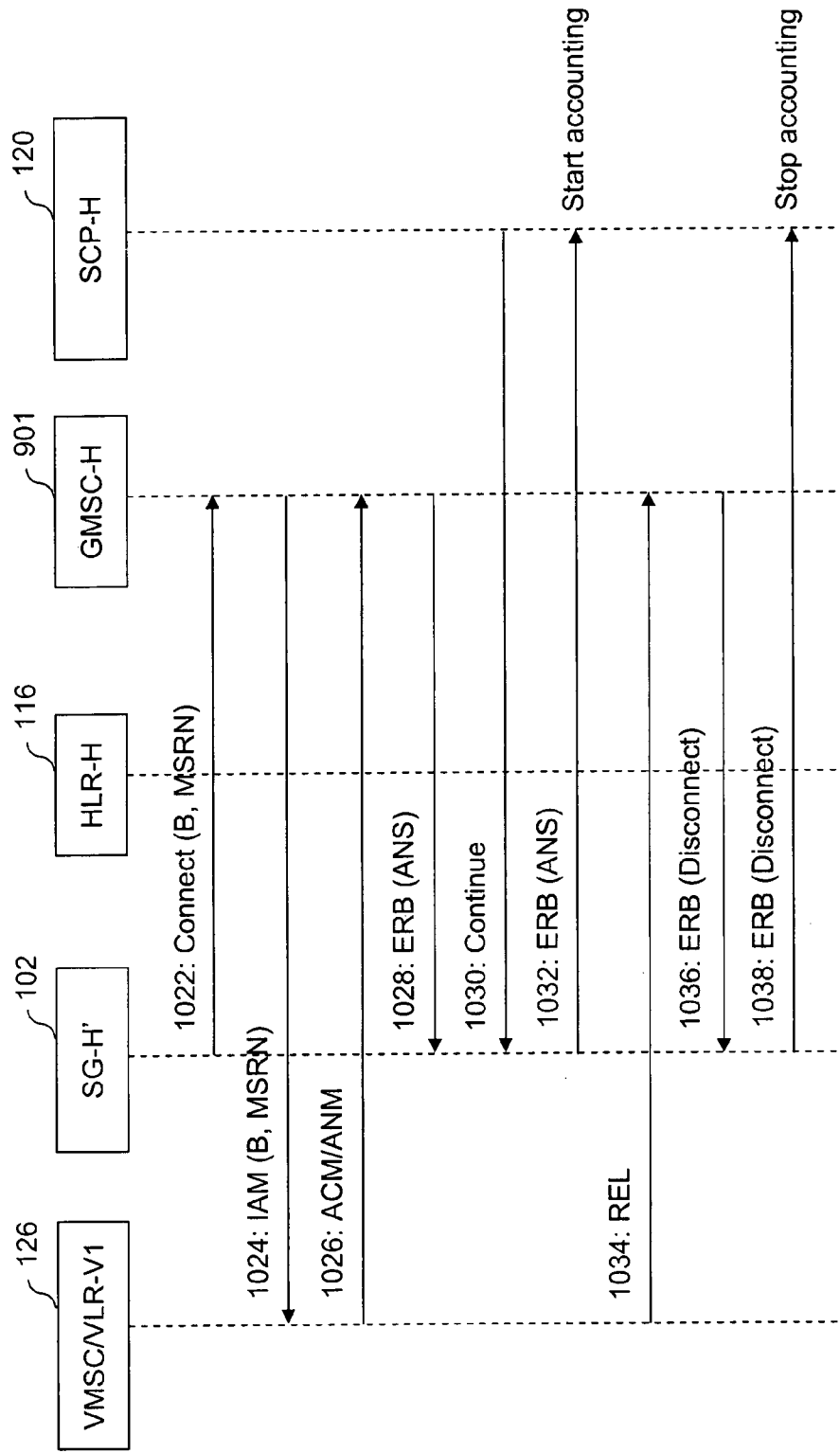

FIGS. 10A and 10B represent a flow diagram for handling MT call to prepaid subscriber 110 in P-VPMN1 106, in case of SCP based solution and when there is IN/ISUP interface between GMSC-H 901 and SG-H' 102, in accordance with a second embodiment of the present invention. Steps 1002 to 1016 are same as steps 902 to 916 that describes obtaining of MSRN from VMSC/VLR-V1 126, mapping of MSRN with MSRN' at SG-H' 102, and sending of IN call request from B to MSRN'. However, at step 1018, SG-H' 102 establishes the first fake IN IDP call (instead of ISUP IN call at step 918) from prepaid subscriber A to R#, towards SCP-H 120 (instead of service node-H 124). In an embodiment of the present invention, HPMN 104 operator configures SCP-H 120 to define tariff for prepaid subscriber 110's MT call, based on R#. Thereafter, at step 1020, SCP-H 120 issues RRB (ANS, Disconnect, Busy, No-answer) to SG-H' 102 for the first fake call. Further, steps 1022 to 1028 are same as steps 924 to 930 that describe establishing call from B to MSRN, and receiving ISUP ACM/ANM message, which is protocol converted to IN ERB (ANS) message. Upon receiving IN ERB (ANS) message from GMSC-H 901, SG-H' 102 starts accounting for the CDR reconciliation purpose.

Additionally, at step 1030, SCP-H 120 sends the Continue message to SG-H' 102. Hence, at step 1032, SG-H' 102 returns IN ERB (ANS) message to SCP-H 120 for the first fake call. SCP-H 120 starts deducting balance from prepaid subscriber A's prepaid account, based on tariff table defined for R#. One of the three cases where the switch in P-VPMN1 106 or HPMN 104 disconnects the ongoing MT call to prepaid subscriber A are even applicable in this embodiment (also described earlier in conjunction with FIGS. 9A to 9C). At step 1034, VMSC/VLR-V1 126 sends the REL message to GMSC-H 901 to disconnect the ongoing call. Thereafter, at step 1036, GMSC-H 901 converts the protocol of ISUP REL message to IN ERB (Disconnect) message and then sends the converted IN message to SG-H' 102. This causes SG-H' 102 to stop accounting for the CDR reconciliation. Finally, at step 1038, SG-H' 102 issues the IN ERB (Disconnect) message to SCP-H 120. This causes SCP-H 120 to stop the deduction of balance from prepaid subscriber A's prepaid account.

Alternatively, in case GMSC-H 901 and SG-H' 102 has only ISUP interface with each other, then all IN signaling messages exchanged between GMSC-H 901 and SG-H' 102 in FIGS. 10A and 10B are replaced with corresponding ISUP signaling messages. For example, IN signaling messages, such as IDP (B, MSRN'), ERB (ANS), and ERB (Disconnect) are replaced with corresponding ISUP signaling messages, such as IAM (B, MSRN'), ACM/ANM, and REL, respectively. Rest of the call flow for MT call to prepaid subscriber A follows FIGS. 10A and 10B, where MSRN is changed to MSRN', fake call is established from SG-H' 102 to service node-H 124, call IAM (B, MSRN) is established from GMSC-H 901 to VMSC/VLR-V1 126, and finally the ongoing call is disconnected by VMSC/VLR-V1 126.

Furthermore, as described earlier, apart from standard calls (i.e., MO call and MT call), prepaid subscriber 110 is also provided with additional VASs. In some countries, when prepaid subscribers are at HPMN 104, late call forwarding is disabled to avoid tromboning. It will be apparent to a person skilled in the art that tromboning is a process in which traffic originating from an initial point, follows a route into a network and then goes to a destination point that is close to the initial point, thus causing unnecessary signaling overhead of routing through the entire network. For example, a standard SIP call follows the tromboning process.

Alternatively, in other countries, late call forwarding is allowed at HPMN 104. In an embodiment of the present invention, HPMN 104 operator enables the late call forwarding for MT calls to prepaid subscriber 110 in P-VPMN1 106. In order to do so, SG-H' 102 disables the call forwarding during the registration process, by removing call forwarding parameter from the subscriber profile information when the ISD message (along with the subscriber profile information) is received at SG-H' 102. SG-H' 102 stores the call forwarding parameter in case optimal routing for late call forwarding (e.g., to voicemail) is supported, in accordance with an embodiment of the present invention.

Figure 11A:
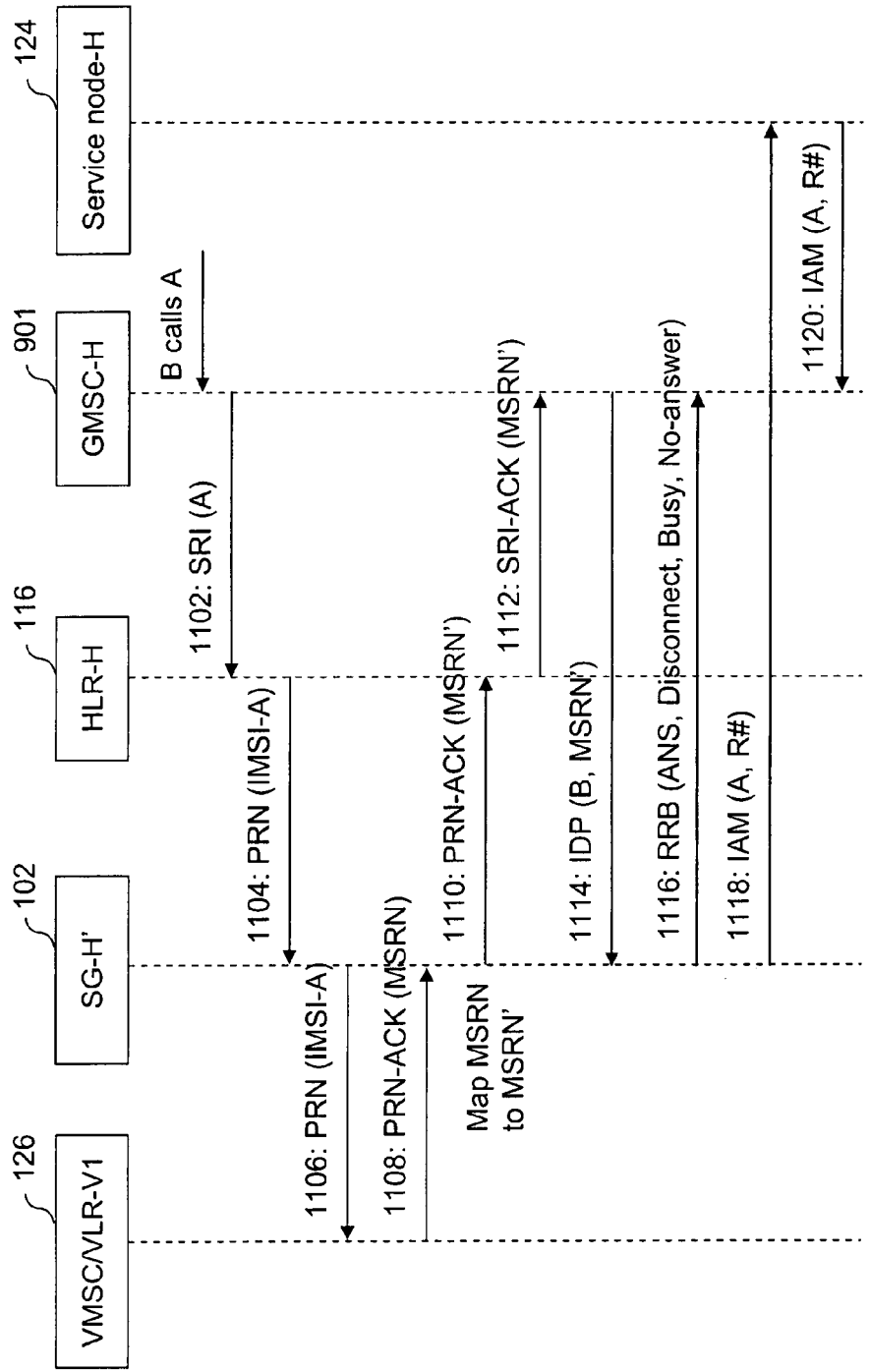
FIGS. 11A, 11B, and 11C represent a flow diagram for enabling late call forwarding and optimally routing the MT call to the prepaid subscriber in the VPMN, in case of service node based solution, in accordance with a first embodiment of the present invention.
Figure 11B:
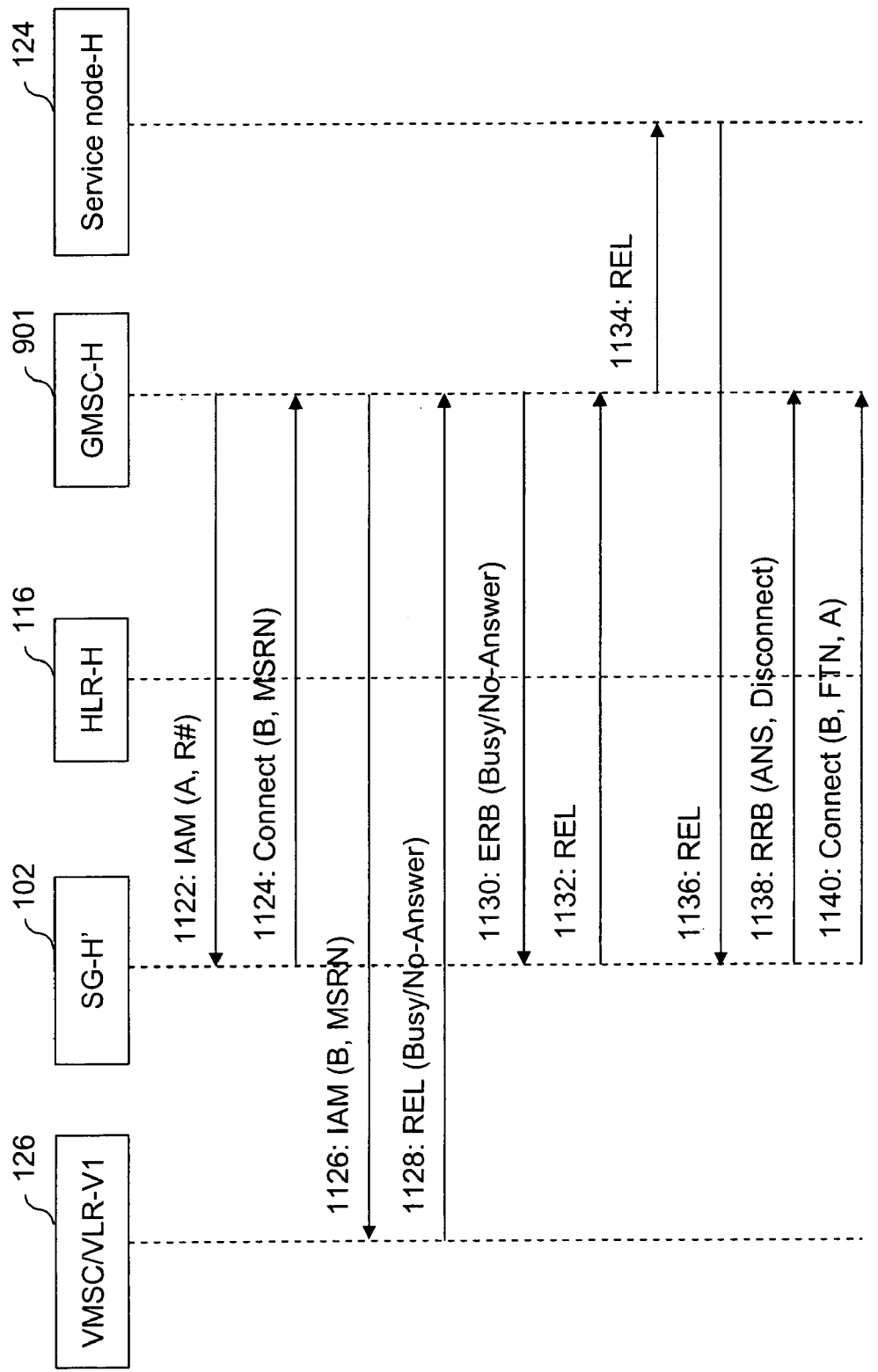
Figure 11C:
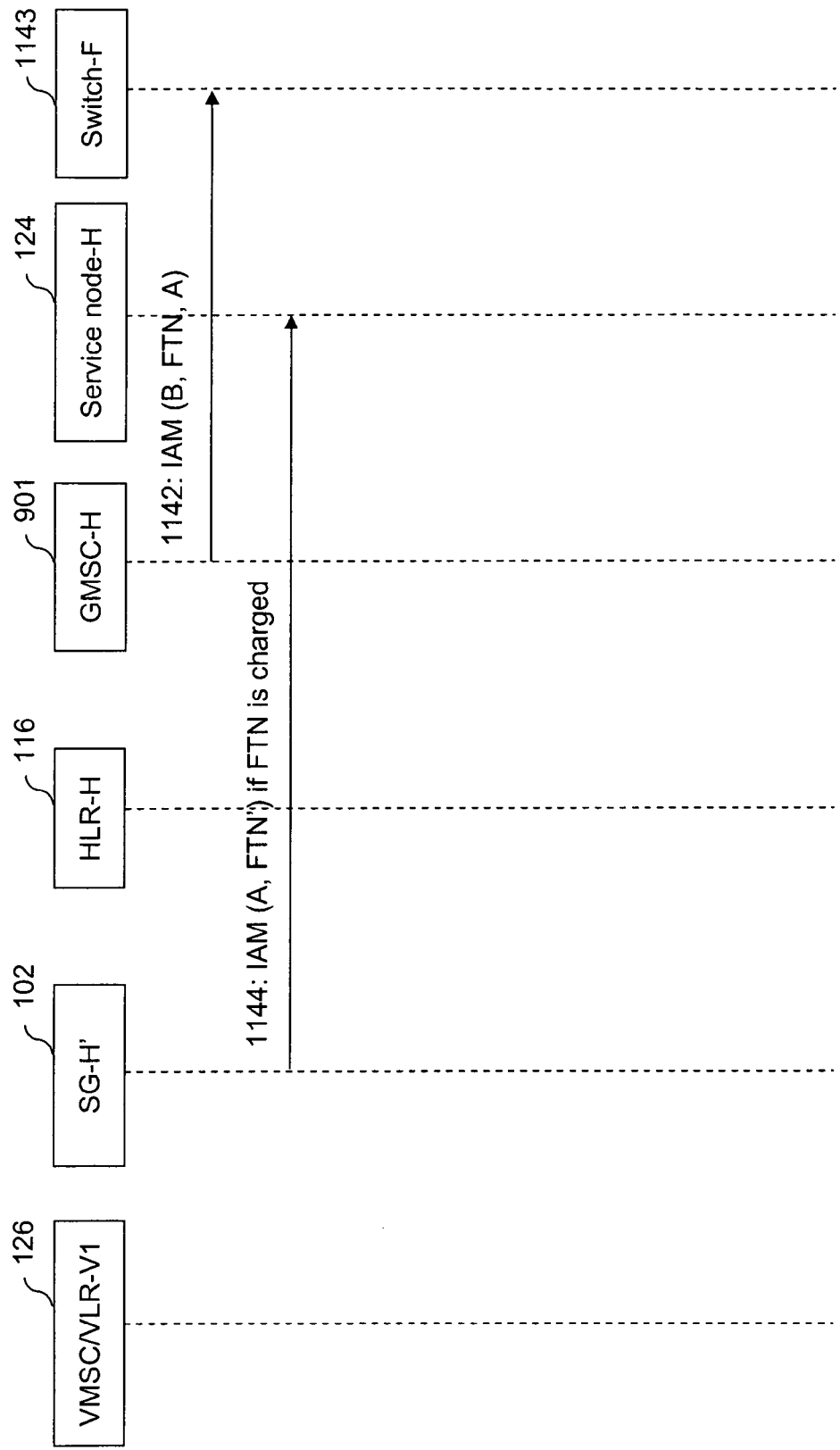

In another embodiment of the present invention, HPMN 104 operator enables late call forwarding for prepaid subscriber 110 (when it is already disabled) by adding late call forwarding parameter in the received ISD message, and then optimally routes prepaid subscriber 110's traffic without causing tromboning. FIGS. 11A, 11B, and 11C represent a flow diagram for enabling late call forwarding and optimally routing the MT call to prepaid subscriber 110 in P-VPMN1 106, in case of service node based solution, in accordance with a first embodiment of the present invention. In this case, SG-H' 102 has both the IN and ISUP interface with GMSC-H 901. Steps 1102 to 1126 are same as steps 902 to 926 that describes obtaining of MSRN from VMSC/VLR-V1 126, mapping of MSRN with MSRN' at SG-H' 102, establishing the first fake call from SG-H' 102 to service node-H 124 for billing purpose, and then establishing the call IAM (B, MSRN) from GMSC-H 901 to VMSC/VLR-V1 126. Since late call forwarding is earlier enabled (or call forwarding disabled) during prepaid subscriber 110's registration process at VMSC/VLR-V1 126, VMSC/VLR-V1 126 sends the ISUP REL message on Busy or No-Answer to GMSC-H 901, at step 1128.

GMSC-H 901 converts protocol of ISUP REL to IN ERB message on Busy or No-Answer (corresponds to a release message to disconnect the first take call), and sends the converted message to SG-H' 102, at step 1130. Hence SG-H' 102 can stop accounting for the CDR reconciliation. Since, the ongoing fake call from A to R# is released, HPMN 104 operator ensures that no balance is deducted from prepaid subscriber A's prepaid account till this point. SG-H' 102 that acts as the master protocol converter, converts the protocol of IN ERB message back to ISUP REL message, and sends this converted message to GMSC-H 901, at step 1132. Thereafter at step 1134, GMSC-H 901 relays the ISUP REL message to service node-H 124. Hence service node-H 124 stops accounting ensuring that no balance is deducted from prepaid subscriber A's prepaid account till this point. Thereafter, at step 1136, service node-H 124 relays the ISUP REL message to SG-H' 102.

SG-H' 102 then issues IN RRB (ANS, DISCONNECT) to GMSC-H 901, at step 1138. Further, SG-H' 102 determines a Forward-To Number (FTN) of prepaid subscriber 110 that is stored at SG-H' 102. Hence at step 1140, SG-H' 102 sends a call request message on prepaid subscriber A's FTN, such as an IN Connect (B, FTN, A) to GMSC-H 901, upon receiving IN RRB (ANS, DISCONNECT) from GMSC-H 901, so as to forward the MT call on prepaid subscriber A's number to the FTN. FTN is a late call forwarding number that corresponds to an ERB (release-cause-event), where cause of release can be either Busy or No-Answer or reject. In an embodiment of the present invention, HPMN 104 operator (or hub 112 operator) configures the default release-cause-event to, e.g. Busy. Further at step 1142, GMSC-H 901 converts the protocol of IN Connect (B, FTN, A) to an ISUP IAM (B, FTN, A) signaling and issues the protocol converted signaling to a switch 1143 for the FTN (hereinafter referred to as switch-F 1143). In an embodiment of the present invention, SG-H' 102 issues a second fake call on a special FTN corresponding to the FTN to service node-H 124, when the late call forwarding is chargeable. The special FTN is referred as FTN' (i.e., FTN with prefix) that service node-H 124 uses to charge prepaid subscriber 110, in accordance with an embodiment of the present invention. Hence at step 1144, SG-H' 102 establishes separate second fake call ISUP IAM (A, FTN') on prepaid subscriber A's number behalf to service node-H 124, so as to charge prepaid subscriber A according to the FTN'. Thereafter, steps 1120 to 1126 are performed, where R# is replaced by FTN' and the MSRN is replaced by the FTN, so as to route the ongoing call to FTN and charge prepaid subscriber A based on tariff table defined for FTN'.

Alternatively, in case GMSC-H 901 and SG-H' 102 have only ISUP interface with each other, then all IN signaling messages exchanged between GMSC-H 901 and SG-H' 102 in FIGS. 11A, 11B, and 11C are replaced with corresponding ISUP signaling messages. For example, IN signaling messages, such as IDP (B, MSRN'), Connect (B, MSRN), Connect (B, FTN, A), and ERB (Busy/No-Answer) are replaced with corresponding ISUP signaling messages, such as IAM (B, MSRN'), IAM (B, MSRN), IAM (B, FTN, A), and REL (Busy/No-Answer), respectively. Rest of the call flow for late call forwarding to the FTN is same as that explained earlier in conjunction with FIGS. 11A, 11B, and 11C.

Figure 12A:
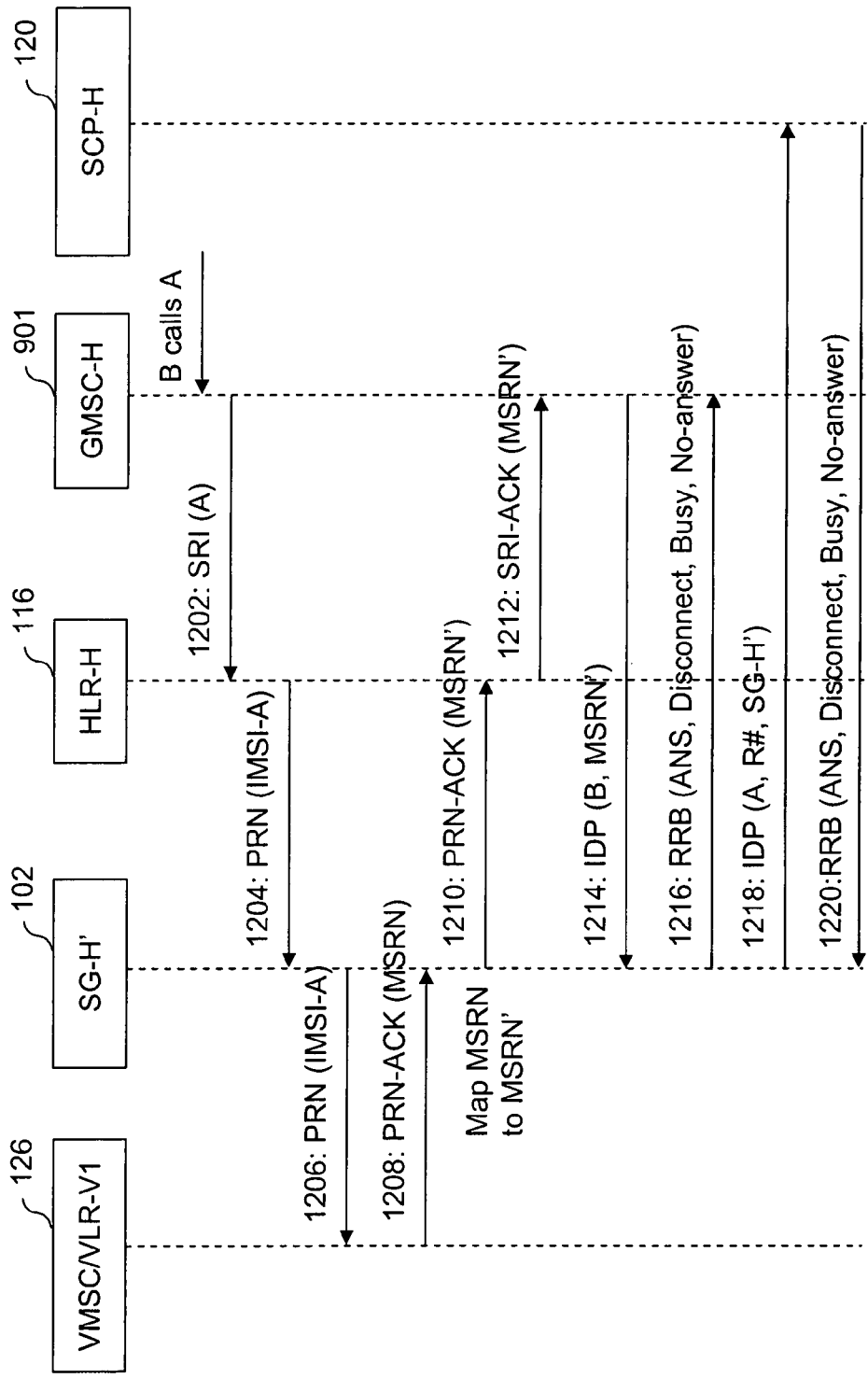
FIGS. 12A and 12B represent a flow diagram for enabling late call forwarding and optimally routing the MT call to the prepaid subscriber in the VPMN, in case of SCP based solution, in accordance with a second embodiment of the present invention.
Figure 12B:
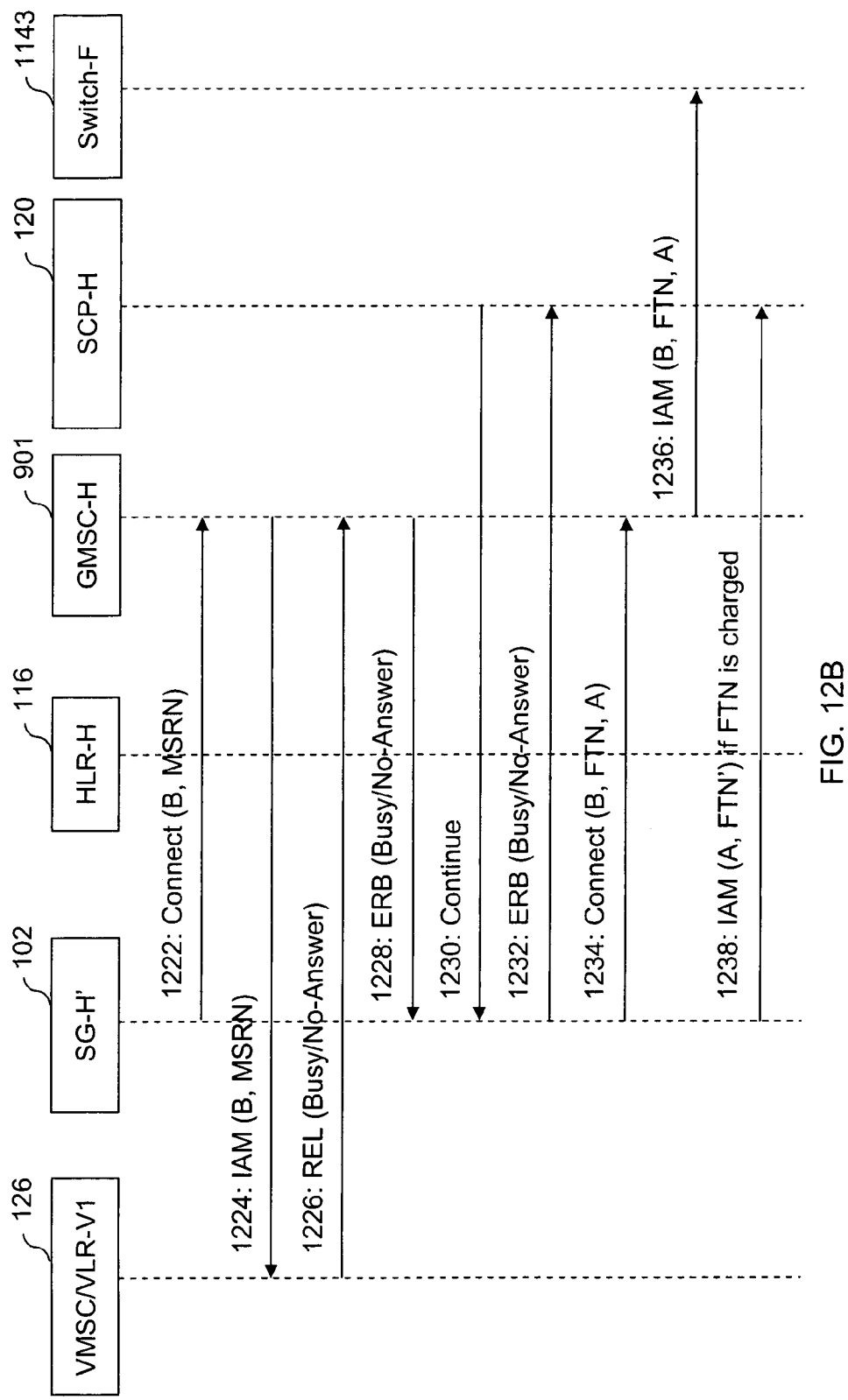

FIGS. 12A and 12B represent a flow diagram for enabling late call forwarding and optimally routing the MT call to prepaid subscriber 110 in P-VPMN1 106, in case of SCP based solution, in accordance with a second embodiment of the present invention. In this case, SG-H' 102 has both ISUP and IN interface with GMSC-H 901. Steps 1202 to 1224 are same as steps 1002 to 1024 that describes obtaining of MSRN from VMSC/VLR-V1 126, mapping of MSRN with MSRN' at SG-H' 102, charging prepaid subscriber A by establishing the first fake call from SG-H' 102 to SCP-H 120, and then establishing the call IAM (B, MSRN) from GMSC-H 901 to VMSC/VLR-V1 126. Since late call forwarding is earlier enabled (or call forwarding disabled) during prepaid subscriber 110's registration process at VMSC/VLR-V1 126, VMSC/VLR-V1 126 sends the ISUP REL message on Busy or No-Answer to GMSC-H 901, at step 1226.

GMSC-H 901 converts the protocol of ISUP REL to IN ERB message on Busy or No-Answer, and then sends the protocol converted message to SG-H' 102, at step 1228. Since the ongoing fake call from A to R# is released, HPMN 104 operator should ensure that no balance is deducted from prepaid subscriber A's prepaid account till this point. Thereafter, at step 1230, SCP-H 120 issues the IN Continue message to SG-H' 102. SG-H' 102 then issues the IN ERB message on Busy or No. Answer to SCP-H 120, at step 1232. HPMN 104 operator should ensure that no balance is deducted from prepaid subscriber A's prepaid account till this point. Further, SG-H' 102 determines the FTN of prepaid subscriber 110 that is stored at SG-H' 102. Steps 1234 to 1238 are same as steps 1140 to 1144, other than involvement of SCP-H 120 (instead of service node-H 124). Thereafter, steps 1218 to 1224 are performed, where R# is replaced by FTN' and the MSRN is replaced by the FTN, so as to route the ongoing call to FTN and charge prepaid subscriber A based on tariff table defined for FTN'.

Alternatively, in case GMSC-H 901 and SG-H' 102 have only ISUP interface with each other, then all IN signaling messages exchanged between GMSC-H 901 and SG-H' 102 in FIGS. 12A and 12B are replaced with corresponding ISUP signaling messages. For example, IN signaling messages, such as IDP (B, MSRN'), ERB (Busy/No-Answer), and Connect (B, FTN, A) are replaced with corresponding ISUP signaling messages, such as IAM (B, MSRN'), REL (Busy/No-Answer), and IAM (B, FTN, A), respectively. Rest of the call flow for late call forwarding to the FTN is same as that explained earlier in conjunction with FIGS. 12A and 12B.

Apart from MO call, MT call, and late call forwarding service, HPMN 104 operator also provides MO SMS service to prepaid subscriber 110 in P-VPMN1 106. In many countries such as China and Taiwan, MO SMS by prepaid subscribers at HPMN 104 are charged the same irrespective of the subscribers' location in HPMN 104. This presents a problem for charging MO SMS by prepaid outbound roamers at roaming rate as HPMN 104 operator need to pay P-VPMN1 106 operator at roaming rate for the MO SMS which can be much higher than HPMN 104's local rate. Thus in order to handle billing effectively, HPMN 104 operator in accordance with an embodiment of the present invention, configures an SMSC-H 1301 to define tariff for prepaid subscriber 110's MO SMS, based on B".

Figure 13:
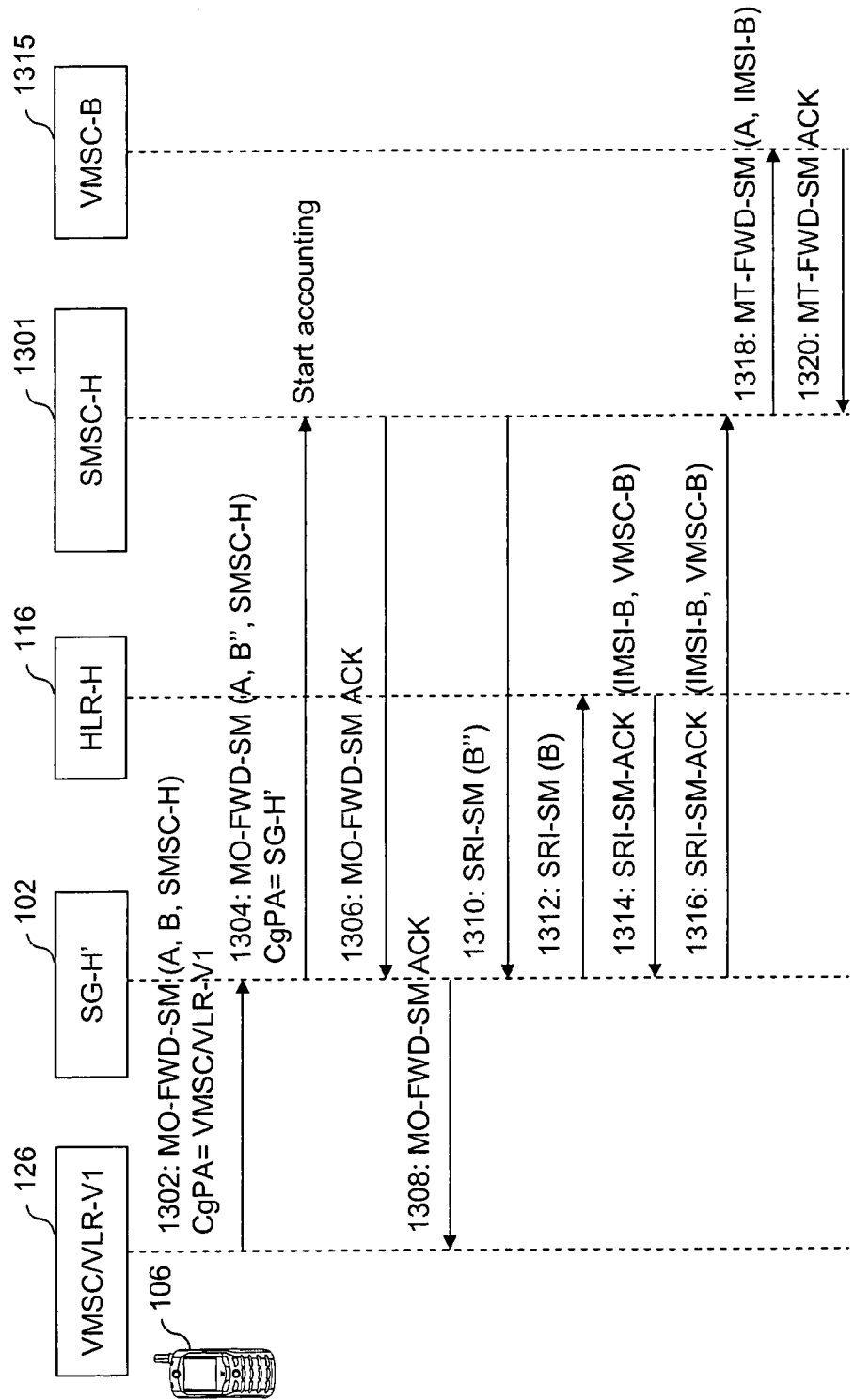
FIG. 13 represents a flow diagram for enabling MO Short Message Service (SMS) and handling billing of the prepaid subscriber in the VPMN, in accordance with an embodiment of the present invention.

FIG. 13 represents a flow diagram for enabling MO SMS and handling billing of prepaid subscriber 110 in P-VPMN1 106, in accordance with an embodiment of the present invention. The prepaid subscriber A sends a SMS to B at P-VPMN1 126, and thus VMSC/VLR-V1 126 issues a Mobile-Originated-Forward-SMS (SMSC-H), i.e., MO-FWD-SM signaling message towards an SMSC-H 1301. This signaling message is directed to SG-H' 102, since all SCCP signaling messages of prepaid subscriber 110 in P-VPMN1 106 are routed to SG-H' 102, at step 1302. SG-H' 102 modifies the SCCP CgPA in the signaling message to SG-H' 102, and also replaces the B number to the B" number. Hence at step 1304, SG-H' 102 relays the modified signaling message to SMSC-H 1301. SMSC-H 1301 charges prepaid subscriber A's prepaid account at a roaming tariff based on the prefix of the B" number. Different networks or zones in these networks can use different prefixes for charging prepaid subscribers from HPMN 104. SMSC-H 1301 returns an acknowledgement message, such as an MO-FWD-SM-ACK message back to SG-H' 102, at step 1306. SG-H' 102 then relays the received acknowledgement message to VMSC/VLR-V 126, at step 1308.

Thereafter, SMSC-H 1301 attempts to deliver the SMS by A to B". Hence at step 1310, SMSC-H 1301 sends a Send Routing Information for Short Message on B", i.e., SRI-SM (B") to SG-H' 102. In an embodiment of the present invention, HPMN 104 operator configures SMSC-H 1301 to direct SCCP signaling with CdPA as B" to SG-H' 102. In other words, SG-H' 102 acts as a virtual HLR for prefixed numbers (i.e., B"). Thereafter, at step 1312, SG-H' 102 obtains B from B" by stripping off the prefix from B", and then sends an SRI-SM (B) to HLR-H 116. In an embodiment of the present invention, HPMN operator 104 configures SG-H' 102 to store a mapping of B and B". Also, it will be apparent to a person skilled in the art that in case HLR of called party B is different (e.g., HLR-X) from HLR-H 116, SG-H' 102 sends the SRI-SM (B) to HLR-X (instead of HLR-H 116). Furthermore, at step 1314, HLR-H 116 returns an SRI-SM-ACK message with an IMSI of B (hereinafter referred to as IMSI-B) and a current VMSC 1315 address of B (hereinafter referred to as VMSC-B 1315) to SG-H' 102. SG-H' 102 relays the received message to SMSC-H 1301, at step 1316. SMSC-H 1310 can then deliver the SMS to VMSC-B 1315. Hence at step 1318, SMSC-H 1301 sends an MT-FWD-SM (A, IMSI-B) to VMSC-B 1315. Finally at step 1320, VMSC-B 1315 returns an MT-FWD-SM-ACK to SMSC-H 120 to confirm delivery of SMS by prepaid subscriber A to B.

In some countries, the MO SMS by prepaid subscribers at HPMN 104 is charged based on the location of the prepaid subscribers. In this way, even though HLR-H 116 is faked that prepaid subscriber 110 is in HPMN 104, roaming in different zones within HPMN 104 can have different tariffs as compared to local rates charged to prepaid subscriber 110 when prepaid subscriber 110 is in HPMN 104 subscription location (i.e., the zone/network region where prepaid subscriber 110 is first subscribed within HPMN 104 for mobile services). In this case, MO SMS by prepaid subscriber 110 in P-VPMN1 106 is charged at a roaming rate based on the address of SG-H' 102 (i.e., SG-H' GT). In an embodiment of the present invention, HPMN 104 operator configures SMSC-H 1301 to define tariff for prepaid subscriber 110's MO SMS, based on the SG-H' GT.

In an embodiment of the present invention, when prepaid subscriber A sends an SMS to B, while roaming in P-VPMN1 106, VMSC/VLR-V1 126 issues a Mobile-Originated-ForwardSMS (A, B, SMSC-H) towards SMSC with CgPA as VMSC/VLR-V1. The MO-FWD-SM signaling is directed to SG-H' 102 since all SCCP signaling messages of prepaid subscriber 110 in P-VPMN1 106 are routed via SG-H' 102 (using one of the various techniques described earlier). SG-H' 102 modifies the SCCP CgPA of the received signaling message to SG-H' GT, and relays the modified signaling message to SMSC-H 1301. SMSC-H 1301 recognizes the message is forwarded by SG-H' 102, and hence bills prepaid subscriber 110 for this message with roaming tariff based on tariff table defined for the SG-H' GT. Different networks or zones in these networks can use different SG-H' GTs. In an embodiment of the present invention, SMSC-H 1301 determines the location of prepaid subscriber 110 by sending an SRI-SM (A) to HLR-H 116, in order to locate SG-H' 102. SMSC-H 1301 returns MO-FWD-SM-ACK message back to SG-H' 102. SG-H' 102 relays the received acknowledgement message to VMSC/VLR-V 126. In this case, SG-H' 102 does not modify SCCP CgPA (i.e. SMSC-H) to SG-H' GT. SMSC-H 1301 then later delivers the SMS by A to B in an MT-SMS signal flow, which is explained later in the context of the present invention.

Prepaid subscribers while roaming in P-VPMN1 106 can also receive SMS. Since MT SMS is free for prepaid subscribers irrespective of whether they are roaming or not, no interface is required with service node-H 124 or SCP-H 120. In an embodiment of the present invention, when an SMS is received at an originating SMSC (hereinafter referred to as SMSC-O), SMSC-O sends a routing request on A, such as SRI-SM (A) to HLR-H 116. It will be apparent to a person skilled in the art that SMSC-O corresponds to an SMSC associated with a subscriber 'X', who sends the SMS to prepaid subscriber A. Call flow of MT SMS to prepaid subscriber A follows standard flow for MT SMS except that SG-H' 102 is involved for transactions between SMSC-O and VMSC/VLR-V1 126, and HLR-H 116 and VMSC/VLR-V1 126. HLR-H 116 returns a routing acknowledgement message, such as SRI-SM-ACK with IMSI-A and SG-H' address. SG-H' address is returned because HLR-H 116 is emulated (during registration process) that SG-H' is the VMSC address of prepaid subscriber 110. Thereafter, SMSC-O forwards the SMS (i.e., using MT-FWD-SMS) to VMSC/VLR-V1 126 of prepaid subscriber 110, via SG-H' 102.

Furthermore, since all SCCP and call control signaling messages by prepaid subscribers are tapped at SG-H' 102, HPMN 104 operator can offer various other VASs to its prepaid subscribers roaming in P-VPMN1 106. Following are some of the exemplary VASs and exemplary configurations performed at SG-H' 102:

1. Roaming Quality Monitoring (RQM): This feature is used to monitor (and hence trace) call quality, SMS quality, registration quality, authentication quality, and SCCP signaling quality of prepaid roamers.
2. Real-time usage: Call usage and SMS usage of prepaid roamers can be monitored using this feature.
3. Missed Call Alerts (MCA): This feature allows sending a missed call alert SMS to prepaid roamers in case they do not answer calls to their respective numbers.
4. Restricted dialing: This feature restricts the prepaid roamer from calling on certain numbers.
5. Postpaid roaming support: This feature allows postpaid roamers in P-VPMN1 106 to benefit from the special roaming rates of P-VPMN1 106 operator when they are roaming within the ecosystem; although they can still register on other non-partner VPMNs outside the ecosystem without benefiting from P-VPMN1 106 operator's special roaming rates.
6. Postpaid support: This feature allows postpaid roamers (without roaming profile at their HPMN HLR) to roam in, any member of the ecosystem. HPMN 104 operator may impose restricted dialing on some numbers (e.g., only on numbers in P-VPMN1 106 and HPMN 104 country, excluding premium numbers) or restrict roaming to SMS roaming only.
7. Traffic redirection: This feature allows HPMN 104 operator to apply Traffic Redirection (TR) at HPMN 104, in order to redirect outbound prepaid roamers to selected members of the ecosystem.

8. Special member VPMN local number support: This feature provides a local special member VPMN number to prepaid subscriber 110 in the special member VPMN (i.e., a member of the ecosystem) when prepaid subscriber 110's registration is going via SG-H' 102. This allows prepaid roamer 110 to receive calls on the local VPMN number, while they are registered with the special member VPMN.
9. Calling number changes: This feature allows modification of calling party number depending on the called party number.
10. Welcome SMS and registration: This feature allows P-VPMN1 106 operator to send a welcome SMS to prepaid subscribers from HPMN 104 to register at P-VPMN1 106.

Various embodiments of the present invention are described in the context of GSM. It will be apparent to a person skilled in the art that roaming services (described in the present invention) can be applied to American National Standards Institute #41 (ANSI-41) roaming, such as Code Division Multiplexed Access (CDMA) and Time Division Multiplexed Access (TDMA).

It will also be apparent to a person skilled in the art that the prepaid roaming solution can be provided to subscribers using other technologies such as, but not limited to, VoIP, WiFi, 2G, 3G, and inter-standard roaming. For example, a 3G roaming subscriber traveling to a VPMN may like to avail wireless services similar to the ones he receives in his HPMN. To support these variations, SG-H' 102 will have a separate SS7 and network interface corresponding to different VPMN networks. Similarly, SG-H' 102 will have a separate SS7 and network interface corresponding to the HPMN network. It would be obvious to a person skilled in the art that these two interfaces in different directions may not have to be the same technologies. In addition, there could be multiple types of interfaces in both directions.

An exemplary list of the mapping between GSM MAP/CAP and ANSI-41 is described in the table below as a reference.

| GSM MAP/CAP | ANSI-41 |
| --- | --- |
| Location Update/ISD | REGNOT |
| Cancel Location | REGCAN |
| RegisterSS | FEATUREREQUEST |
| InterrogateSS | FEATUREREQUEST |
| SRI-SM | SMSREQ |
| SRI | LOCREQ |
| ForwardSMS | SMSDPP |
| ReadyForSMS | SMSNOTIFICATION |
| AlertServiceCenter | SMSNOTIFICATION |
| ReportSMSDelivery | SMDPP |
| ProvideRoamingNumber | ROUTREQ |
| Initial DP | ORREQ |
| Initial DP | ANLYZD |
| Initial DP | OANSWER |
| Connect/ReleaseCall/Continue/Cancel | CCDIR |
| Reset Timer | RESETTIMER |
| Initial DP | ODISCONNECT |
| Initial DP | TANSWER |
| Initial DP | TDISCONNECT |

A HPMN operator uses one or more variations of the present invention to allow its prepaid outbound roaming subscribers to roam in member networks of the ecosystem. The HPMN operator provides roaming services to its prepaid outbound roamers even when the HPMN has no CAMEL (or IN) support/agreement with any other member network of the ecosystem. Moreover, this is also irrespective of whether the member network (i.e. VPMN) has CAMEL (or IN) capabilities or has a CAMEL (or IN) agreement with the HPMN. The present invention provides these prepaid outbound roamers standard services (like MO/MT calls and SMS) in addition to various other VASs, while roaming in the member network. This attracts more outbound prepaid subscribers to register at the member networks. A member VPMN that caters to prepaid roamers from the HPMN is benefited as these inbound roamers will be locked exclusively with the member VPMN. This increases roaming revenue for VPMN operator and depending on the size of the HPMN (e.g., China), the revenue benefit for the VPMN operator can be significant. In addition to above, the present invention also cuts down the cost of upgrading existing components and installing new components to the existing network eventually leading to maximization of roaming revenues for network operators deploying this solution. Further, the present invention eliminates the need for these prepaid subscribers to require roaming profile at their respective HPMN HLRs. This also reduces logistic requirements and controls fraud while prepaid subscribers are roaming. Moreover, since the HPMN operator controls roaming of its prepaid outbound subscribers in member VPMNs, the HPMN operator can restrict the roaming services for some outbound prepaid subscribers to either SMS roaming only, voice roaming only, or both.

The present invention can take the form of an entirely hardware embodiment, an entirely software embodiment, or an embodiment containing both hardware and software elements. In accordance with an embodiment of the present invention, software, including but not limited to, firmware, resident software, and microcode, implements the invention.

Furthermore, the invention can take the form of a computer program product, accessible from a computer-usable or computer-readable medium providing program code for use by, or in connection with, a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CDROM), compact disk-read/write (CD-R/W) and Digital Versatile Disk (DVD).

A computer usable medium provided herein includes a computer usable program code, which when executed, provides roaming services to a prepaid subscriber of an HPMN. The computer program product further includes a computer usable program code for facilitating by a SG, the prepaid subscriber's registration at a VPMN despite absence of the prepaid subscriber's roaming profile at an HLR associated with the HPMN to roam in the VPMN, wherein the HPMN and the VPMN are included in one or more partner networks. The computer program product further includes a computer usable program code for enabling mobile communication of the prepaid subscriber in the VPMN by the SG so as to provide the roaming services to the prepaid subscriber in the VPMN, the SG converting protocol of all signaling messages, corresponding to the prepaid subscriber in the VPMN, into a format compatible with the HPMN, the protocol conversion is performed when the HPMN and the VPMN support different protocols. The computer program product further includes a computer usable program code for interfacing by the SG, a PPS associated with the HPMN via one of: an SCP, a service node, and an SMSC, all three being associated with the HPMN so as to bill the prepaid subscriber based on pre-defined criteria.

The components of present system described above include any combination of computing components and devices operating together. The components of the present system can also be components or subsystems within a larger computer system or network. The present system components can also be coupled with any number of other components (not shown), such as other buses, controllers, memory devices, and data input/output devices, in any number of combinations. In addition, any number or combination of other processor-based components may be carrying out the functions of the present system.

It should be noted that the various components disclosed herein may be described using computer aided design tools and/or expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof.

Unless the context clearly requires otherwise, throughout the description and the claims, the words "comprise," "comprising," and the like are to be construed in an inclusive sense as opposed to an exclusive or exhaustive sense; that is to say, in a sense of "including, but may not be limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, it covers all of the following interpretations: any of the items in the list, all of the items in the list and any combination of the items in the list.

The above description of illustrated embodiments of the present system is not intended to be exhaustive or to limit the present system to the precise form disclosed. While specific embodiments of, and examples for, the present system are described herein for illustrative purposes, various equivalent modifications are possible within the scope of the present system, as those skilled in the art will recognize. The teachings of the present system provided herein can be applied to other processing systems and methods. They may not be limited to the systems and methods described above.

The elements and acts of the various embodiments described above can be combined to provide further embodiments. These and other changes can be made in light of the above detailed description.

Other Variations

Provided above for the edification of those of ordinary skill in the art, and not as a limitation on the scope of the invention, are detailed illustrations of a scheme for providing wireless services to a prepaid subscriber of an HPMN roaming in a VPMN. Numerous variations and modifications within the spirit of the present invention will of course occur to those of ordinary skill in the art in view of the embodiments that have been disclosed. For example, the present invention is implemented primarily from the point of view of GSM mobile networks as described in the embodiments. However the present invention may also be effectively implemented on GPRS, 3G, CDMA, WCDMA, WiMax etc., or any other network of common carrier telecommunications in which end users are normally configured to operate within a "home" network to which they normally subscribe, but have the capability of also operating on other neighboring networks, which may even be across international borders.

The examples under the system of present invention detailed in the illustrative examples contained herein are described using terms and constructs drawn largely from GSM mobile telephony infrastructure. However use of these examples should not be interpreted as limiting the invention to those media. The system and method can be of use and provided through any type of telecommunications medium, including without limitation: (i) any mobile telephony network including without limitation GSM, 3GSM, 3G, CDMA, WCDMA or GPRS, satellite phones or other mobile telephone networks or systems; (ii) any so-called WiFi apparatus normally used in a home or subscribed network, but also configured for use on a visited or non-home or non-accustomed network, including apparatus not dedicated to telecommunications such as personal computers, Palm-type or Windows Mobile devices; (iii) an entertainment console platform such as Sony Playstation, PSP or other apparatus that are capable of sending and receiving telecommunications over home or non-home networks, or even (iv) fixed-line devices made for receiving communications, but capable of deployment in numerous locations while preserving a persistent subscriber id such as the eye2eye devices from Dlink; or telecommunications equipment meant for voice over IP communications such as those provided by Vonage or Packet8.

In describing certain embodiments of the system under the present invention, this specification follows the path of a telecommunications call, from a calling party to a called party. For the avoidance of doubt, such a call can be a normal voice call, in which the subscriber telecommunications equipment is also capable of visual, audiovisual or motion-picture display. Alternatively, those devices or calls can be for text, video, pictures or other communicated data.

In the foregoing specification, specific embodiments of the present invention have been described. However one of ordinary skill in the art will appreciate that various modifications and changes can be made without departing from the scope of the present invention as set forth in the claims below. Accordingly, the specification and the figures are to be regarded in an illustrative rather than a restrictive sense, and all such modifications are intended to be included within the scope of present invention. The benefits, advantages, solutions to problems, and any element(s) that may cause any benefit, advantage, or solution to occur, or to become more pronounced, are not to be construed as a critical, required, or essential feature or element of any or all of the claims.

Technical References (Each of which is Incorporated in its Entirety Herein)

GSM 902 on MAP specification
Digital cellular telecommunications system (Phase 2+)
Mobile Application Part (MAP) Specification
(3GPP TS 09.02 version 7.9.0 Release 1998)
GSM 340 on SMS
Digital cellular telecommunications system (Phase 2+)
Technical realization of the Short Message Service (SMS)
(GSM 03.40 version 7.4.0 Release 1998)
GSM 378 on CAMEL,
GSM 978 on CAMEL Application Protocol,
GSM 379 on CAMEL Support of Optimal Routing (SOR), GSM 318 on CAMEL Basic Call Handling ITU-T Recommendation Q.1214 (1995), Distributed functional plane for intelligent network CS-1, ITU-T Recommendation Q.1218 (1995), Interface Recommendation for intelligent network CS-1, ITU-T Recommendation Q.762 (1999), Signaling system No. 7—ISDN user part general functions of messages and signals, ITU-T Recommendation Q.763 (1999), Signaling system No. 7—ISDN user part formats and codes, ITU-T Recommendation Q.764 (1999), Signaling system No. 7—ISDN user part signaling procedures, ITU-T Recommendation Q.765 (1998), Signaling system No. 7—Application transport mechanism, ITU-T Recommendation Q.766 (1993), Performance objectives in the integrated services digital network application, ITU-T Recommendation Q.769.1 (1999), Signaling system No. 7—ISDN user part enhancements for the support of Number Portability

APPENDIX

| Acronym | Description |
| --- | --- |
| 3G | Third Generation of mobile |
| 3GPP | Third Generation Partnership Project |
| ACM | ISUP Address Completion Message |
| ANM | ISUP Answer Message |
| ANSI-41 | American National Standards Institute #41 |
| CAMEL | Customized Applications for Mobile network Enhanced Logic |
| CAP | Camel Application Part |
| CDMA | Code Division Multiplexed Access |
| CDR | Call Detail Record |
| CdPA | Called Party Address |
| CgPA | Calling Party Address |
| CSI | CAMEL Subscription Information |
| DP | Detection Point |
| DPC | Destination Point Code |
| ERB | Event Report Basic call state model |
| FTN | Forward-To Number |
| GMSC | Gateway MSC |
| GPRS | General Packet Radio System |
| GSM | Global System for Mobile communications |
| GT | Global Title |
| HLR | Home Location Register |
| HLR-H | HPMN HLR |
| HPMN | Home Public Mobile Network |
| IAM | Initial Address Message |
| IDD | International Direct Dial |
| IDP | Initial DP |
| IMSI | International Mobile Subscriber Identity |
| IN | Intelligent Network |
| IS-41 | Interim Standard-41 |
| ISD | MAP Insert Subscriber Data |
| ISTP | International STP |
| ISUP | ISDN User Part |
| LUP | MAP Location Update |
| MAP | Mobile Application Part |
| MO | Mobile Originated |
| MSC | Mobile Switching Center |
| MSISDN | Mobile Station International Subscriber Directory Number |
| MSRN | Mobile Station Roaming Number |
| MT | Mobile Terminated |
| MVNO | Mobile Virtual Network Operator |
| OPC | Origination Point Code |
| PPS | PrePaid System |
| PRN | MAP Provide Roaming Number |
| RRB | Request Report Basic call state model |
| REL | ISUP Release message |
| SCCP | Signaling Connection Control part |
| SCP | Signaling Control Point |
| SG | Signal Gateway |
| SMS | Short Message Service |
| SMSC | Short Message Service Center |
| SMSC-H | HPMN SMSC |

APPENDIX-continued

| Acronym | Description |
| --- | --- |
| SPC | Signaling Point Code |
| SRI | MAP Send Routing Information |
| SRI-SM | MAP Send Routing Information For Short Message |
| SS7 | Signaling System #7 |
| SSN | Sub System Number |
| SSP | Service Switching Point |
| STP | Signaling Transfer Point |
| USSD | Unstructured Supplementary Service Data |
| VAS | Value Added Service |
| VLR | Visited Location Register |
| VLR-V | VPMN VLR |
| VMSC | Visited Mobile Switching Center |
| VMSC-V | VPMN VMSC |
| VPMN | Visited Public Mobile Network |

I claim:

1. A method for providing a prepaid subscriber of a Home Public Mobile Network (HPMN) with roaming services in a Visited Public Mobile Network (VPMN), the HPMN and the VPMN being partner networks, the HPMN having an associated Home Location Register (HLR) for storing subscriber profiles and an associated Prepaid System, each of the HPMN and the VPMN supporting a protocol of signaling messages, the method comprising:

facilitating, via a Signal Gateway (SG) having an electronic processor, a registration of the prepaid subscriber at the VPMN, wherein the prepaid subscriber does not have a subscriber profile in the HLR to roam in the VPMN, and wherein the registration of the prepaid subscriber is facilitated by, upon detecting, via a VPMN registration message having a plurality of parameters, a registration attempt of the prepaid subscriber at the VPMN, modifying one or more of the plurality of parameters in the VPMN registration message, prior to sending the VPMN registration message to the HPMN;

enabling, via the SG, mobile communications of the prepaid subscriber in the VPMN, thereby providing roaming services to the prepaid subscriber in the VPMN, wherein a protocol of signaling messages corresponding to the prepaid subscriber in the VPMN is converted via the SG into a protocol compatible with the protocol of signaling messages supported by the HPMN, when the protocols of signaling messages supported by the HPMN and the VPMN are different from each other;

billing the prepaid subscriber based on pre-defined criteria via the SG; and imitating Intelligent Network (IN) support of the VPMN at the HPMN, when the HPMN has IN support, and the VPMN is unable to support the IN protocol or the IN agreement;

wherein the SG interfaces with the PPS via one selected from a group consisting of a Service Control Point (SCP) associated with the HPMN, a service node associated with the HPMN, and a Short Message Service Center (SMSC) associated with the HPMN; and wherein the SG is associated with one selected from a group consisting of the HPMN, a Mobile Virtual Network Operator (MVNO) associated with the HPMN, and a hub operator.

2. The method of claim 1, the prepaid subscriber having an International Mobile Subscriber Identity (IMSI), the method further comprising:

prior to facilitating the registration of the prepaid subscriber, comparing, at the SG, the IMSI of the prepaid subscriber against at least one list of IMSIs selected from a group consisting of blacklist IMSIs, white list IMSIs, and a list of IMSI ranges.

3. The method of claim 1, the SG having a Gateway Mobile Switching Center (GMSC) coupled thereto, the VPMN having an associated Visited Mobile Switching Center (VMSC), and the prepaid subscriber having corresponding originating Signaling Connection Control Part (SCCP) messages and originating call control messages;
   wherein the SG receives the originating SCCP messages and the originating call control messages via a dedicated connection between GMSC and the VMSC.

4. The method of claim 1, the VPMN having an associated Visited Location Register (VLR) and an associated Signaling Transfer Point (STP), the prepaid subscriber having a number, corresponding originating Signaling Connection Control Part (SCCP) messages, and corresponding originating call control messages;
   wherein the originating call control messages are directed to the SG by configuring the STP associated with the VPMN to add a prefix corresponding to the SG to one selected from a group consisting of the prepaid subscriber's number and a called party number; and
   wherein the originating SCCP messages are directed to the SG via a mode selected from a group consisting of configuring the STP to add the prefix to the originating SCCP messages, and performing International Mobile Subscriber Identity (IMSI) analysis at the VLR.

5. The method of claim 1, the HPMN transmitting an update message containing the prepaid subscriber's profile;
   wherein the prepaid subscriber's mobile communication is enabled via a mode selected from a group consisting of removing a call barring parameter, removing CAMEL Subscription Information (CSI), adding a service key, and adding a late call forwarding parameter in the prepaid subscriber's profile, prior to transmitting the update message to the VPMN.

6. The method of claim 1 further comprising:
   storing, at the SG, one selected from a group consisting of the prepaid subscriber's profile, a call status, a Short Message Service (SMS) status, a late call forwarding status, a late call forwarding number, an SMS forwarding number, and a CAMEL Subscription Information (CSI).

7. The method of claim 1, wherein the protocol conversion is performed for at least one selected from a group consisting of different ISDN User Part (ISUP) versions, an ISUP version and an IN variant, a Customized Application for Mobile Enhanced Logic (CAMEL) version and a non-CAMEL version, and different IN variants.

8. The method of claim 1, further comprising:
   defining a tariff in one selected from a group consisting of the SCP, the service node, and the SMSC, the tariff relating to a Mobile Originated (MO) call and a MO Short Message Service (SMS) of the prepaid subscriber from the VPMN.

9. The method of claim 1, the HPMN having an associated Service Switching Point (SSP) for enabling a Mobile Originated (MO) call of the prepaid subscriber in the VPMN and for billing the prepaid subscriber for the MO call, when the HPMN has IN support and the VPMN is unable to support one selected from a group consisting of the IN protocol and the IN agreement.

10. A method for providing a prepaid subscriber of a Home Public Mobile Network (HPMN) with roaming services in a Visited Public Mobile Network (VPMN), the HPMN and the VPMN being partner networks, the HPMN having an associated Home Location Register (HLR) for storing subscriber profiles and an associated Prepaid System, each of the HPMN and the VPMN supporting a protocol of signaling messages, the method comprising:
   receiving, at a Signal Gateway (SG) having an electronic processor, a registration message having a plurality of parameters, from the prepaid subscriber;
   prior to sending the registration message to the HPMN, modifying, via the SG, one or more of the plurality of parameters in the registration message, wherein the prepaid subscriber does not have a subscriber profile in the HLR;
   enabling, via the SG, mobile communications of the prepaid subscriber in the VPMN, thereby providing roaming services to the prepaid subscriber in the VPMN, wherein a protocol of signaling messages corresponding to the prepaid subscriber in the VPMN is converted via the SG into a protocol compatible with the protocol of signaling messages supported by the HPMN, when the protocols of signaling messages supported by the HPMN and the VPMN are different from each other;
   billing the prepaid subscriber based on pre-defined criteria via the SG; and
   imitating Intelligent Network (IN) support of the VPMN at the HPMN, when the HPMN has IN support, and the VPMN is unable to support the IN protocol or the IN agreement;
   wherein the SG interfaces with the PPS via one selected from a group consisting of a Service Control Point (SCP) associated with the HPMN, a service node associated with the HPMN, and a Short Message Service Center (SMSC) associated with the HPMN; and
   wherein the SG is associated with one selected from a group consisting of the HPMN, a Mobile Virtual Network Operator (MVNO) associated with the HPMN, and a hub operator.

11. A system for providing a prepaid subscriber of a Home Public Mobile Network (HPMN) with roaming services in a Visited Public Mobile Network (VPMN), the HPMN and the VPMN being partner networks, the HPMN having an associated Home Location Register (HLR) for storing subscriber profiles and an associated Prepaid System, each of the HPMN and the VPMN supporting a protocol of signaling messages, the system comprising:
   a facilitator for facilitating, via a Signal Gateway (SG), a registration of the prepaid subscriber at the VPMN, wherein the prepaid subscriber does not have a subscriber profile in the HLR to roam in the VPMN, wherein the registration of the prepaid subscriber is facilitated by upon detecting, via a VPMN registration message having a plurality of parameters, a registration attempt of the prepaid subscriber at the VPMN, modifying one or more of the plurality of parameters in the VPMN registration message, prior to sending the VPMN registration message to the HPMN;
   an enabler for enabling, via the SG, mobile communications of the prepaid subscriber in the VPMN, thereby providing roaming services to the prepaid subscriber in the VPMN, wherein a protocol of signaling messages corresponding to the prepaid subscriber in the VPMN is converted via the SG into a protocol compatible with the protocol of signaling messages supported by the HPMN, when the protocols of signaling messages supported by the HPMN and the VPMN are different from each other;
   a billing module for billing the prepaid subscriber based on pre-defined criteria via the SG; and
   an imitating module for imitating Intelligent Network (IN) support of the VPMN at the HPMN, when the HPMN has IN support, and the VPMN is unable to support the IN protocol or the IN agreement;
   wherein the SG interfaces with the PPS via one selected from a group consisting of a Service Control Point (SCP) associated with the HPMN, a service node associated with the HPMN, and a Short Message Service Center (SMSC) associated with the HPMN; and wherein the SG is associated with one selected from a group consisting of the HPMN, a Mobile Virtual Network Operator (MVNO) associated with the HPMN, and a hub operator.

12. A computer program product comprising a tangible, non-transitory computer usable medium having control logic stored thereon for causing a computer to provide a prepaid subscriber of a Home Public Mobile Network (HPMN) with roaming services in a Visited Public Mobile Network (VPMN), the HPMN and the VPMN being partner networks, the HPMN having an associated Home Location Register (HLR) for storing subscriber profiles and an associated Prepaid System, each of the HPMN and the VPMN supporting a protocol of signaling messages, the control logic comprising:

computer useable program code means for facilitating, via a Signal Gateway (SG), a registration of the prepaid subscriber at the VPMN, wherein the prepaid subscriber does not have a subscriber profile in the HLR to roam in the VPMN, wherein the registration of the prepaid subscriber is facilitated by, upon detecting, via a VPMN registration message having a plurality of parameters, a registration attempt of the prepaid subscriber at the VPMN, modifying one or more of the plurality of parameters in the VPMN registration message, prior to sending the VPMN registration message to the HPMN;

computer useable program code means for enabling, via the SG, mobile communications of the prepaid subscriber in the VPMN, thereby providing roaming services to the prepaid subscriber in the VPMN, wherein a protocol of signaling messages corresponding to the prepaid subscriber in the VPMN is converted via the SG into a protocol compatible with the protocol of signaling messages supported by the HPMN, when the protocols of signaling messages supported by the HPMN and the VPMN are different from each other;

computer useable program code means for billing the prepaid subscriber based on pre-defined criteria via the SG; and computer useable program code means for imitating Intelligent Network (IN) support of the VPMN at the HPMN, when the HPMN has IN support, and the VPMN is unable to support the IN protocol or the IN agreement;

wherein the SG interfaces with the PPS via one selected from a group consisting of a Service Control Point (SCP) associated with the HPMN, a service node associated with the HPMN, and a Short Message Service Center (SMSC) associated with the HPMN; and wherein the SG is associated with one selected from a group consisting of the HPMN, a Mobile Virtual Network Operator (MVNO) associated with the HPMN, and a hub operator.

13. A method for providing a prepaid subscriber of a Home Public Mobile Network (HPMN) with roaming services in a Visited Public Mobile Network (VPMN), the HPMN and the VPMN being partner networks, the HPMN having an associated Home Location Register (HLR) for storing subscriber profiles and an associated Prepaid System, each of the HPMN and the VPMN supporting a protocol of signaling messages, the method comprising:

receiving, at the HPMN, a modified registration message having a plurality of parameters, one or more of the plurality of parameters having been modified upon detecting a registration attempt of the prepaid subscriber at the VPMN; and imitating Intelligent Network (IN) support of the VPMN at the HPMN, when the HPMN has IN support, and the VPMN is unable to support the IN protocol or the IN agreement;

wherein a registration of the prepaid subscriber at the VPMN is facilitated via an electronic processor, the prepaid subscriber not having a subscriber profile in the HLR to roam in the VPMN;

wherein mobile communications of the prepaid subscriber in the VPMN are enabled and a protocol of signaling messages corresponding to the prepaid subscriber in the VPMN is converted into a protocol compatible with the protocol of signaling messages supported by the HPMN, when the protocols of signaling messages supported by the HPMN and the VPMN are different from each other;

wherein the prepaid subscriber is billed based on pre-defined criteria;

wherein the SG interfaces with the PPS via one selected from a group consisting of a Service Control Point (SCP) associated with the HPMN, a service node associated with the HPMN, and a Short Message Service Center (SMSC) associated with the HPMN; and wherein the SG is associated with one selected from a group consisting of the HPMN, a Mobile Virtual Network Operator (MVNO) associated with the HPMN, and a hub operator.

14. The method of claim 13, further comprising:

transmitting an update message containing the prepaid subscriber's profile;

wherein the prepaid subscriber's mobile communication is enabled via a mode selected from a group consisting of removing a call barring parameter, removing CAMEL Subscription Information (CSI), adding a service key, and adding a late call forwarding parameter in the prepaid subscriber's profile, prior to transmitting the update message.

15. The method of claim 13, further comprising:

storing one selected from a group consisting of the prepaid subscriber's profile, a call status, a Short Message Service (SMS) status, a late call forwarding status, a late call forwarding number, an SMS forwarding number, and a CAMEL Subscription Information (CSI).

16. A system for providing a prepaid subscriber of a Home Public Mobile Network (HPMN) with roaming services in a Visited Public Mobile Network (VPMN), the HPMN and the VPMN being partner networks, the HPMN having an associated Home Location Register (HLR) for storing subscriber profiles and an associated Prepaid System, each of the HPMN and the VPMN supporting a protocol of signaling messages, the system comprising:

a receiver for receiving, at the HPMN, a modified registration message having a plurality of parameters, one or more of the plurality of parameters having been modified upon detecting a registration attempt of the prepaid subscriber at the VPMN; and an imitator for imitating IN support of the VPMN at the HPMN, when the HPMN has IN support, and the VPMN is unable to support the IN protocol or the IN agreement;

wherein a registration of the prepaid subscriber at the VPMN is facilitated, the prepaid subscriber not having a subscriber profile in the HLR to roam in the VPMN;

wherein mobile communications of the prepaid subscriber in the VPMN are enabled and a protocol of signaling messages corresponding to the prepaid subscriber in the VPMN is converted into a protocol compatible with the protocol of signaling messages supported by the HPMN, when the protocols of signaling messages supported by the HPMN and the VPMN are different from each other;

wherein the prepaid subscriber is billed based on pre-defined criteria;

wherein the SG interfaces with the PPS via one selected from a group consisting of a Service Control Point (SCP) associated with the HPMN, a service node associated with the HPMN, and a Short Message Service Center (SMSC) associated with the HPMN; and wherein the SG is associated with one selected from a group consisting of the HPMN, a Mobile Virtual Network Operator (MVNO) associated with the HPMN, and a hub operator.

17. The system of claim 16, further comprising:

a transmitter for transmitting an update message containing the prepaid subscriber's profile;

wherein the prepaid subscriber's mobile communication is enabled via a mode selected from a group consisting of removing a call barring parameter, removing CAMEL Subscription Information (CSI), adding a service key, and adding a late call forwarding parameter in the prepaid subscriber's profile, prior to transmitting the update message.

18. The system of claim 16 further comprising:

a memory for storing one selected from a group consisting of the prepaid subscriber's profile, a call status, a Short Message Service (SMS) status, a late call forwarding status, a late call forwarding number, an SMS forwarding number, and a CAMEL Subscription Information (CSI).

19. A method for providing a prepaid subscriber of a Home Public Mobile Network (HPMN) with roaming services in a Visited Public Mobile Network (VPMN), the HPMN and the VPMN being partner networks, the HPMN having an associated Home Location Register (HLR) for storing subscriber profiles and an associated Prepaid System, each of the HPMN and the VPMN supporting a protocol of signaling messages, the method comprising:

facilitating, via a Signal Gateway (SG) having an electronic processor, a registration of the prepaid subscriber at the VPMN, wherein the prepaid subscriber does not have a subscriber profile in the HLR to roam in the VPMN;

enabling, via the SG, mobile communications of the prepaid subscriber in the VPMN, thereby providing roaming services to the prepaid subscriber in the VPMN, wherein a protocol of signaling messages corresponding to the prepaid subscriber in the VPMN is converted via the SG into a protocol compatible with the protocol of signaling messages supported by the HPMN, when the protocols of signaling messages supported by the HPMN and the VPMN are different from each other; and billing the prepaid subscriber based on pre-defined criteria via the SG;

wherein the SG interfaces with the PPS via one selected from a group consisting of a Service Control Point (SCP) associated with the HPMN, a service node associated with the HPMN, and a Short Message Service Center (SMSC) associated with the HPMN;

wherein the SG is associated with one selected from a group consisting of the HPMN, a Mobile Virtual Network Operator (MVNO) associated with the HPMN, and a hub operator;

wherein at least one of the HPMN and the VPMN is unable to support an Intelligent Network (IN) protocol or an IN agreement;

wherein the SG has a Gateway Mobile Switching Center (GMSC) coupled thereto, the VPMN has an associated Visited Mobile Switching Center (VMSC), and the prepaid subscriber has corresponding originating Signaling Connection Control Part (SCCP) messages and originating call control messages; and wherein the SG receives the originating SCCP messages and the originating call control messages via a dedicated connection between GMSC and the VMSC.

20. A method for providing a prepaid subscriber of a Home Public Mobile Network (HPMN) with roaming services in a Visited Public Mobile Network (VPMN), the HPMN and the VPMN being partner networks, the HPMN having an associated Home Location Register (HLR) for storing subscriber profiles and an associated Prepaid System, each of the HPMN and the VPMN supporting a protocol of signaling messages, the method comprising:

facilitating, via a Signal Gateway (SG) having an electronic processor, a registration of the prepaid subscriber at the VPMN, wherein the prepaid subscriber does not have a subscriber profile in the HLR to roam in the VPMN;

enabling, via the SG, mobile communications of the prepaid subscriber in the VPMN, thereby providing roaming services to the prepaid subscriber in the VPMN, wherein a protocol of signaling messages corresponding to the prepaid subscriber in the VPMN is converted via the SG into a protocol compatible with the protocol of signaling messages supported by the HPMN, when the protocols of signaling messages supported by the HPMN and the VPMN are different from each other; and billing the prepaid subscriber based on pre-defined criteria via the SG;

wherein the SG interfaces with the PPS via one selected from a group consisting of a Service Control Point (SCP) associated with the HPMN, a service node associated with the HPMN, and a Short Message Service Center (SMSC) associated with the HPMN;

wherein the SG is associated with one selected from a group consisting of the HPMN, a Mobile Virtual Network Operator (MVNO) associated with the HPMN, and a hub operator;

wherein at least one of the HPMN and the VPMN is unable to support an Intelligent Network (IN) protocol or an IN agreement;

wherein the VPMN has an associated Visited Location Register (VLR) and an associated Signaling Transfer Point (STP), the prepaid subscriber has a number, corresponding originating Signaling Connection Control Part (SCCP) messages, and corresponding originating call control messages;

wherein the originating call control messages are directed to the SG by configuring the STP associated with the VPMN to add a prefix corresponding to the SG to one selected from a group consisting of the prepaid subscriber's number and a called party number; and wherein the originating SCCP messages are directed to the SG via a mode selected from a group consisting of configuring the STP to add the prefix to the originating SCCP messages, and performing International Mobile Subscriber Identity (IMSI) analysis at the VLR.

21. A method for providing a prepaid subscriber of a Home Public Mobile Network (HPMN) with roaming services in a Visited Public Mobile Network (VPMN), the HPMN and the VPMN being partner networks, the HPMN having an associated Home Location Register (HLR) for storing subscriber profiles and an associated Prepaid System, each of the HPMN and the VPMN supporting a protocol of signaling messages, the method comprising:

facilitating, via a Signal Gateway (SG) having an electronic processor, a registration of the prepaid subscriber at the VPMN, wherein the prepaid subscriber does not have a subscriber profile in the HLR to roam in the VPMN;

enabling, via the SG, mobile communications of the prepaid subscriber in the VPMN, thereby providing roaming services to the prepaid subscriber in the VPMN, wherein a protocol of signaling messages corresponding to the prepaid subscriber in the VPMN is converted via the SG into a protocol compatible with the protocol of signaling messages supported by the HPMN, when the protocols of signaling messages supported by the HPMN and the VPMN are different from each other; and billing the prepaid subscriber based on pre-defined criteria via the SG;

wherein the SG interfaces with the PPS via one selected from a group consisting of a Service Control Point (SCP) associated with the HPMN, a service node associated with the HPMN, and a Short Message Service Center (SMSC) associated with the HPMN;

wherein the SG is associated with one selected from a group consisting of the HPMN, a Mobile Virtual Network Operator (MVNO) associated with the HPMN, and a hub operator; and wherein the HPMN has an associated Service Switching Point (SSP) for enabling a Mobile Originated (MO) call of the prepaid subscriber in the VPMN and for billing the prepaid subscriber for the MO call, when the HPMN has Intelligent Network (IN) support and the VPMN is unable to support one selected from a group consisting of the IN protocol and the IN agreement.

22. A method for providing a prepaid subscriber of a Home Public Mobile Network (HPMN) with roaming services in a Visited Public Mobile Network (VPMN), the HPMN and the VPMN being partner networks, the HPMN having an associated Home Location Register (HLR) for storing subscriber profiles and an associated Prepaid System, each of the HPMN and the VPMN supporting a protocol of signaling messages, the method comprising:

receiving, at the HPMN, a modified registration message having a plurality of parameters, one or more of the plurality of parameters having been modified upon detecting a registration attempt of the prepaid subscriber at the VPMN; and transmitting an update message containing the prepaid subscriber's profile;

wherein the prepaid subscriber's mobile communication is enabled via a mode selected from a group consisting of removing a call barring parameter, removing CAMEL Subscription Information (CSI), adding a service key, and adding a late call forwarding parameter in the prepaid subscriber's profile, prior to transmitting the update message;

wherein a registration of the prepaid subscriber at the VPMN is facilitated via an electronic processor, the prepaid subscriber not having a subscriber profile in the HLR to roam in the VPMN;

wherein mobile communications of the prepaid subscriber in the VPMN are enabled and a protocol of signaling messages corresponding to the prepaid subscriber in the VPMN is converted into a protocol compatible with the protocol of signaling messages supported by the HPMN, when the protocols of signaling messages supported by the HPMN and the VPMN are different from each other;

wherein the prepaid subscriber is billed based on pre-defined criteria;

wherein the SG interfaces with the PPS via one selected from a group consisting of a Service Control Point (SCP) associated with the HPMN, a service node associated with the HPMN, and a Short Message Service Center (SMSC) associated with the HPMN;

wherein the SG is associated with one selected from a group consisting of the HPMN, a Mobile Virtual Network Operator (MVNO) associated with the HPMN, and a hub operator; and wherein at least one of the HPMN and the VPMN is unable to support an Intelligent Network (IN) protocol or an IN agreement.

23. A system for providing a prepaid subscriber of a Home Public Mobile Network (HPMN) with roaming services in a Visited Public Mobile Network (VPMN), the HPMN and the VPMN being partner networks, the HPMN having an associated Home Location Register (HLR) for storing subscriber profiles and an associated Prepaid System, each of the HPMN and the VPMN supporting a protocol of signaling messages, the system comprising:

a receiver for receiving, at the HPMN, a modified registration message having a plurality of parameters, one or more of the plurality of parameters having been modified upon detecting a registration attempt of the prepaid subscriber at the VPMN; and a transmitter for transmitting an update message containing the prepaid subscriber's profile;

wherein the prepaid subscriber's mobile communication is enabled via a mode selected from a group consisting of removing a call barring parameter, removing CAMEL Subscription Information (CSI), adding a service key, and adding a late call forwarding parameter in the prepaid subscriber's profile, prior to transmitting the update message;

wherein a registration of the prepaid subscriber at the VPMN is facilitated, the prepaid subscriber not having a subscriber profile in the HLR to roam in the VPMN;

wherein mobile communications of the prepaid subscriber in the VPMN are enabled and a protocol of signaling messages corresponding to the prepaid subscriber in the VPMN is converted into a protocol compatible with the protocol of signaling messages supported by the HPMN, when the protocols of signaling messages supported by the HPMN and the VPMN are different from each other;

wherein the prepaid subscriber is billed based on pre-defined criteria;

wherein the SG interfaces with the PPS via one selected from a group consisting of a Service Control Point (SCP) associated with the HPMN, a service node associated with the HPMN, and a Short Message Service Center (SMSC) associated with the HPMN;

wherein the SG is associated with one selected from a group consisting of the HPMN, a Mobile Virtual Network Operator (MVNO) associated with the HPMN, and a hub operator; and wherein at least one of the HPMN and the VPMN is unable to support an Intelligent Network (IN) protocol or an IN agreement.

* * * * *